US012810857B2

(12) United States Patent
Ito et al.

(10) Patent No.: US 12,810,857 B2
(45) Date of Patent: Nov. 24, 2026

(54) SPEECH RECOGNITION APPARATUS, SPEECH RECOGNITION METHOD, SPEECH RECOGNITION PROGRAM, AND IMAGING APPARATUS

(71) Applicant: NIKON CORPORATION, Tokyo (JP)

(72) Inventors: Yasunori Ito, Tokyo (JP); Seiji Takano, Yokohama (JP); Yusuke Takuma, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 225 days.

(21) Appl. No.: 18/579,532

(22) PCT Filed: Jul. 12, 2022

(86) PCT No.: PCT/JP2022/027441

§ 371 (c)(1),
(2) Date: Jan. 16, 2024

(87) PCT Pub. No.: WO2023/286775

PCT Pub. Date: Jan. 19, 2023

(65) Prior Publication Data

US 2024/0331693 A1 Oct. 3, 2024

(30) Foreign Application Priority Data

Jul. 13, 2021 (JP) ................................ 2021-116000

(51) Int. Cl.

*G10L 15/22* (2006.01)
*G10L 15/28* (2013.01)
*H04N 23/60* (2023.01)

(52) U.S. Cl.

CPC .............. *G10L 15/22* (2013.01); *G10L 15/28* (2013.01); *H04N 23/60* (2023.01)

(58) Field of Classification Search

None
See application file for complete search history.

(56) References Cited

U.S. PATENT DOCUMENTS 8,848,082 B2 * 9/2014 Yamamoto ........... H04N 23/667 348/333.01
10,885,910 B1 * 1/2021 Antos ..................... G06F 3/167
(Continued)

FOREIGN PATENT DOCUMENTS

CN 108922528 A 11/2018
JP 2002-099296 A 4/2002
(Continued)

OTHER PUBLICATIONS

Dec. 10, 2024 Office Action issued in Japanese Patent Application No. 2023-534819.
(Continued)

*Primary Examiner* — Jonathan C Kim
(74) *Attorney, Agent, or Firm* — Oliff PLC

(57) ABSTRACT

A speech recognition apparatus includes an acquisition portion that is configured to acquire state information regarding at least one of a movable portion in a target device operated according to an input speech or a connected device connected to the target device; a recognition control portion that is configured to set a control content for recognizing the speech based on the state information acquired by the acquisition portion and to recognize the speech; and an output portion that is configured to output a command signal for operating the target device to the target device according to a recognition result of the recognition control portion.

23 Claims, 22 Drawing Sheets

(56) References Cited

U.S. PATENT DOCUMENTS

| | | | | |
|---|---|---|---|---|
| 2007/0086764 | A1* | 4/2007 | Konicek | H04N 1/00209 348/E5.042 |
| 2007/0200912 | A1* | 8/2007 | Hung | G10L 15/24 704/E15.041 |
| 2008/0036869 | A1* | 2/2008 | Gustafsson | H04N 23/66 348/222.1 |
| 2010/0134677 | A1* | 6/2010 | Yamamoto | H04N 23/63 348/333.01 |
| 2012/0084086 | A1* | 4/2012 | Gilbert | G10L 15/26 704/235 |
| 2013/0176467 | A1* | 7/2013 | Lin | H04N 23/631 348/294 |
| 2016/0182800 | A1* | 6/2016 | Kaneko | H04N 23/66 348/211.4 |
| 2019/0306401 | A1* | 10/2019 | Toriumi | G10L 15/22 |
| 2020/0005793 | A1 | 1/2020 | Wu | |
| 2020/0322540 | A1* | 10/2020 | Tsujimoto | H04N 23/695 |
| 2020/0329202 | A1* | 10/2020 | Toriumi | G10L 25/51 |
| 2021/0249016 | A1* | 8/2021 | Foerster | G10L 15/02 |
| 2022/0053228 | A1* | 2/2022 | Kameoka | G06F 3/167 |
| 2022/0101861 | A1* | 3/2022 | Antos | G10L 15/1815 |
| 2024/0331693 | A1* | 10/2024 | Ito | H04N 23/60 |

FOREIGN PATENT DOCUMENTS

| | | | |
|---|---|---|---|
| JP | 2004-301893 | A | 10/2004 |
| JP | 2007-017839 | A | 1/2007 |
| JP | 2008-145676 | A | 6/2008 |
| JP | 2010-145906 | A | 7/2010 |
| JP | 2013-078008 | A | 4/2013 |
| JP | 2014-149457 | A | 8/2014 |
| JP | 2014-175867 | A | 9/2014 |
| JP | 2015-026102 | A | 2/2015 |
| JP | 2018-201194 | A | 12/2018 |
| JP | 2020-003774 | A | 1/2020 |
| JP | 2020-177106 | A | 10/2020 |

OTHER PUBLICATIONS

Sep. 27, 2022 International Search Report issued in International Patent Application No. PCT/JP2022/027441.

* cited by examiner

FIG.6A

| F-NUMBER | SINGLE FOCUS LENS | ELECTRIC ZOOM LENS A | ELECTRIC ZOOM LENS B |
|---|---|---|---|
| F1.0 | — | — | — |
| F1.2 | — | — | ○ |
| F1.4 | — | — | ○ |
| F1.6 | — | — | ○ |
| F1.8 | ○ | — | ○ |
| F2.0 | ○ | — | ○ |
| F2.2 | ○ | — | ○ |
| F2.5 | ○ | — | ○ |
| F2.8 | ○ | — | ○ |
| F3.2 | ○ | — | ○ |
| F3.5 | ○ | — | ○ |
| F4.0 | ○ | ○ | ○ |
| F4.5 | ○ | ○ | ○ |
| F5.0 | ○ | ○ | ○ |
| ... | ○ | ○ | ○ |

FIG.6B

| FOCAL LENGTH | SINGLE FOCUS LENS | ELECTRIC ZOOM LENS A | ELECTRIC ZOOM LENS B |
|---|---|---|---|
| 16mm | — | — | — |
| 20mm | — | — | — |
| 24mm | — | ○ | ○ |
| 28mm | — | ○ | ○ |
| 35mm | — | ○ | ○ |
| 40mm | — | ○ | ○ |
| 50mm | — | ○ | ○ |
| 58mm | — | ○ | ○ |
| 70mm | — | ○ | ○ |
| 85mm | — | — | ○ |
| 90mm | — | — | ○ |
| 105mm | — | — | ○ |
| 120mm | — | — | ○ |
| 140mm | — | — | — |
| ... | — | — | — |

FIG.7

| WORDS | OUTPUT TARGET | OPERATION (OPERATION SIGNAL) |
|---|---|---|
| BRIGHT/TO BRIGHTEN | EXPOSURE VALUE | INCREASING EXPOSURE VALUE |
| DARK/TO DARKEN | EXPOSURE VALUE | DECREASING EXPOSURE VALUE |
| SHOOT/TO SHOOT | SHUTTER | SHOOTING STILL IMAGE AFTER ADJUSTING FOCUS |
| RECORD/START | MOVING IMAGE SHOOTING | STARTING MOVING IMAGE SHOOTING |
| STOP/END | MOVING IMAGE SHOOTING | TERMINATING MOVING IMAGE SHOOTING |
| F1.8 | F-NUMBER | CHANGING F-NUMBER TO 1.8 |
| F2.8 | F-NUMBER | CHANGING F-NUMBER TO 2.8 |
| 35mm | FOCAL LENGTH | CHANGING FOCAL LENGTH TO 35 mm |
| ⋮ | ⋮ | ⋮ |

FIG.22

| SPEECH RECOGNITION INFORMATION SIGNAL | RECOGNITION SPECIFYING PORTION SIGNAL | NUMBER OF TEXT SIGNALS TO BE INPUT |
|---|---|---|
| MICROPHONE 14 | SPEECH RECOGNITION PORTION 23c | 1 |
| MICROPHONE 14 | EXTERNAL SPEECH RECOGNITION PORTION 202c | 1 |
| MICROPHONE 14 | BOTH (PERFORMANCES ARE UNCOMPARABLE) | 2 |
| EXTERNAL MICROPHONE 19 | SPEECH RECOGNITION PORTION 23c | 1 |
| EXTERNAL MICROPHONE 19 | EXTERNAL SPEECH RECOGNITION PORTION 202c | 1 |
| EXTERNAL MICROPHONE 19 | BOTH (PERFORMANCES ARE UNCOMPARABLE) | 2 |
| BOTH | SPEECH RECOGNITION PORTION 23c | 2 |
| BOTH | EXTERNAL SPEECH RECOGNITION PORTION 202c | 2 |
| BOTH | BOTH (PERFORMANCES ARE SAME) | 2 |
| BOTH | BOTH (PERFORMANCES ARE UNCOMPARABLE) | 4 |

SPEECH RECOGNITION APPARATUS, SPEECH RECOGNITION METHOD, SPEECH RECOGNITION PROGRAM, AND IMAGING APPARATUS

CROSS-REFERENCE TO RELATED APPLICATIONS

The present application claims priority based on Japanese Patent Application No. 2021-116000 filed on Jul. 13, 2021, to the Japan Patent Office, the entire disclosure of which is entirely incorporated herein by reference.

TECHNICAL FIELD

The present invention relates to a speech recognition apparatus, a speech recognition method, a speech recognition program, and an imaging apparatus.

BACKGROUND

Information indicating a state of an electronic device (digital camera) as a speech operation target is acquired, a phrase corresponding to the information is determined as a candidate phrase, and a specific phrase is detected from speech data. The specific phrase is specified to be one of the candidate phrases to determine the phrase as a recognized phrase. The state of the digital camera indicates a state in which a shooting mode, a display mode, and various parameters are set, that is, a control state (see Patent Literature 1: JP 2014-149457 A).

However, in the technology disclosed in Patent Literature 1 described above, when state information of a movable portion provided in the electronic device as the speech operation target or a connected device is changed, the accuracy of speech recognition may be deteriorated.

SUMMARY

According to a first aspect, a speech recognition apparatus includes an acquisition portion, a recognition control portion, and an output portion. The acquisition portion acquires state information regarding at least one of a movable portion provided in a target device operated according to an input speech or a connected device connected to the target device. The recognition control portion sets a control content for recognizing a speech based on the state information acquired by the acquisition portion, and recognizes the speech. The output portion outputs, to the target device, a command signal for operating the target device according to the recognition result of the recognition control portion. According to a second aspect, a speech recognition method includes acquisition processing, recognition control processing, and output processing. In the acquisition processing, state information regarding at least one of a movable portion provided in a target device operated according to an input speech or a connected device connected to the target device is acquired. In the recognition control processing, when a speech is input, a control content for recognizing the speech is set based on the state information acquired by the acquisition processing, and the speech is recognized. In the output processing, a command signal for operating the target device according to the recognition result of the recognition control processing is output to the target device. According to a third aspect, a non-transitory storage medium storing a speech recognition program causes a computer to execute acquisition processing, recognition control processing, and output processing. In the acquisition processing, state information regarding at least one of a movable portion provided in a target device operated according to an input speech or a connected device connected to the target device is acquired. In the recognition control processing, when a speech is input, a control content for recognizing the speech is set based on the state information acquired by the acquisition processing, and the speech is recognized. In the output processing, a command signal for operating the target device according to the recognition result of the recognition control processing is output to the target device.

BRIEF DESCRIPTION OF DRAWINGS

FIG. 6A is a diagram illustrating an "F-number" of a word dictionary of a lens stored in a storage portion of the imaging apparatus according to the first embodiment.

FIG. 6B is a diagram illustrating a "focal length" of the word dictionary of the lens stored in the storage portion of the imaging apparatus according to the first embodiment.

FIG. 7 is a diagram illustrating a command list stored in the storage portion of the imaging apparatus according to the first embodiment.

FIG. 22 is a diagram illustrating a list of the number of text signals in the result adjustment portion according to the fifth embodiment.

DETAILED DESCRIPTION

Figure 1:
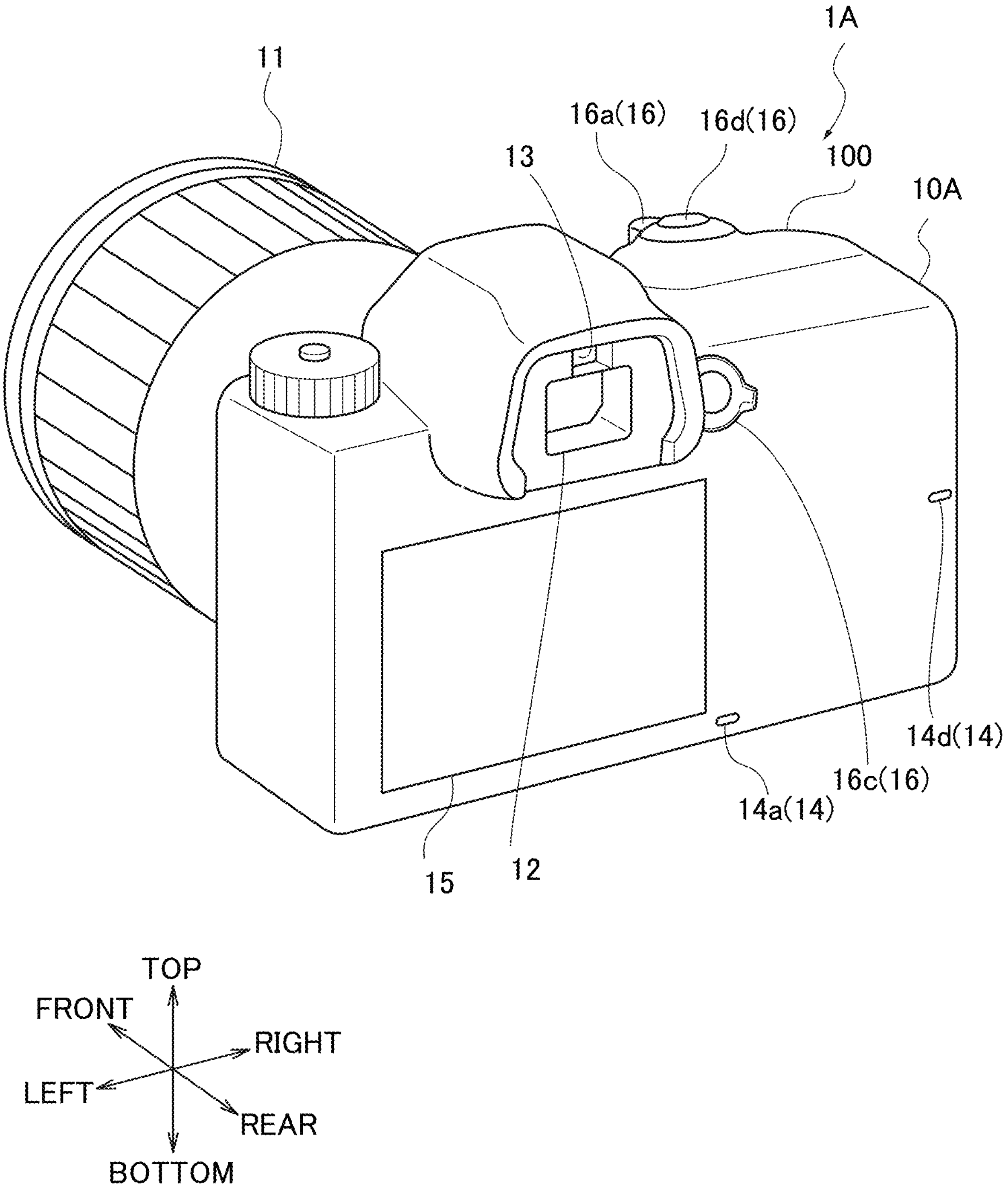
FIG. 1 is a rear perspective view of an imaging apparatus including a speech recognition apparatus according to a first embodiment.
Figure 2:
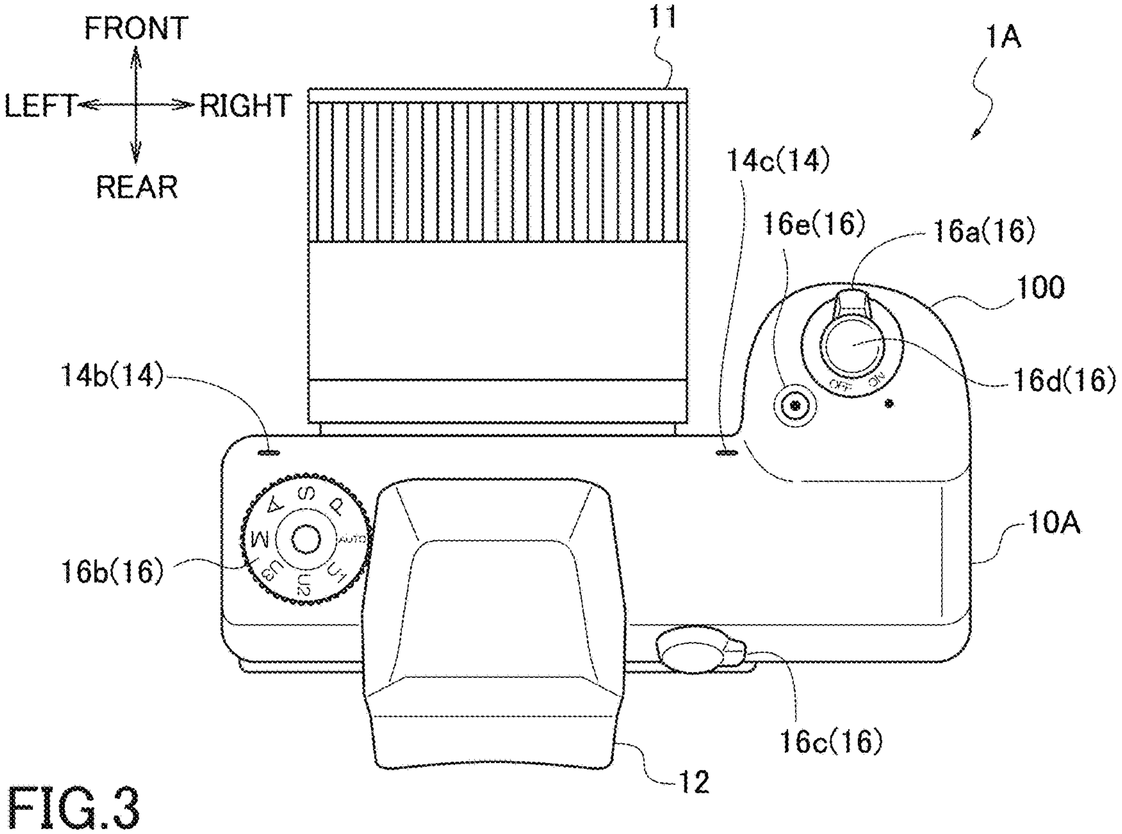
FIG. 2 is a plan view of the imaging apparatus including the speech recognition apparatus according to the first embodiment.
Figure 3:
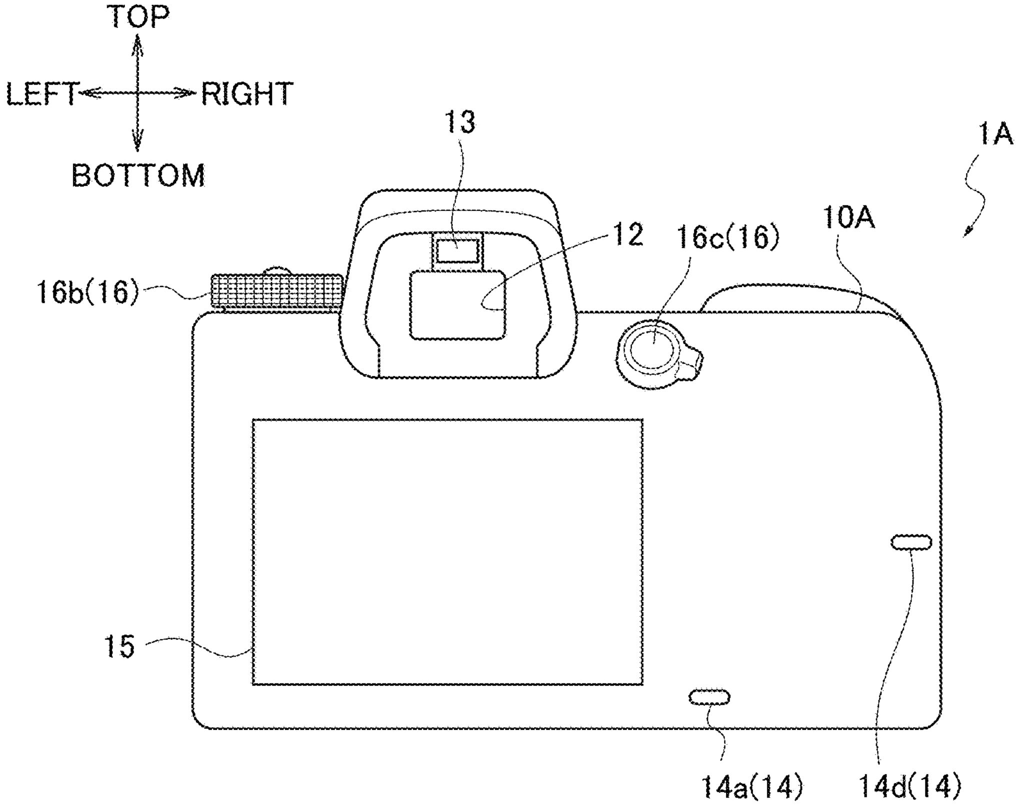
FIG. 3 is a rear view of the imaging apparatus including the speech recognition apparatus according to the first embodiment.

Hereinafter, an imaging apparatus (a target device such as a digital camera) to which a speech recognition apparatus, a speech recognition method, a speech recognition program, and an imaging apparatus according to each embodiment are applied will be described with reference to the drawings. In the following description, a movable portion includes a plurality of members (constituent elements), and a single member (one constituent element) is a movable member.

First Embodiment

An imaging apparatus 1A will be described with reference to FIGS. 1 to 7.

As illustrated in FIGS. 1 to 4, an apparatus body 10A (body and housing) of the imaging apparatus 1A includes an imaging optical system 11 (image forming optical system), a finder 12, an eye sensor 13, microphones 14 (input portions and built-in microphones), and a display 15 (display). The apparatus body 10A includes, as the microphones 14, a first microphone 14*a* (input portion), a second microphone 14*b* (input portion), a third microphone 14*c* (input portion), and a fourth microphone 14*d* (input portion). A grip portion 100 is integrally formed on the right side of the apparatus body 10A. Further, the apparatus body 10A includes, as operation portions 16, a power switch 16*a*, a shooting mode dial 16*b*, a still image/moving image switching lever 16*c*, a shutter button 16*d*, a moving image shooting button 16*e*, and the like. The apparatus body 10A further includes a controller or control unit 20. The apparatus body 10A further includes various actuators and the like (not illustrated). Note that, in the following description, the first to fourth microphones 14*a* to 14*d* will also be referred to as "microphone 14" unless otherwise distinguished.

The imaging optical system 11 includes a lens 11*a* and the like, and is disposed on a front surface of the apparatus body 10A and on a left side of the grip portion 100. The lens 11*a* is a movable portion and is an interchangeable or replaceable lens. The imaging optical system 11 includes, as the lens 11*a*, a single focus lens, an electric zoom lens (zoom lens), a retractable lens, or the like. The "retractable lens" is capable of being housed by decreasing a length in a front-rear direction, and the length of the retractable lens in the front-rear direction is adjusted mainly by expanding and contracting a lens barrel portion of the lens. The retractable lens cannot shoot an image or can shoot an image but cannot focus in a housed state in which the lens is housed. The lens 11*a* is a retractable lens and may be an electric zoom lens. The lens 11*a* includes a lens control unit (not illustrated). When the lens 11*a* is replaced, state information (information) of the lens 11*a* attached to the apparatus body 10A is transmitted to the apparatus body 10A as a state information signal by communication between the lens control unit and the control unit 20. The state information of the lens 11*a* is product information such as a model number, a type, an F-number (diaphragm value), a focal length (mm) in the case of a zoom lens, and whether or not the lens is a retractable lens. Note that the lens 11*a* may be a non-replaceable lens as a movable portion provided integrally with the apparatus body 10A. The imaging optical system 11 forms a subject image on an imaging element (for example, a CMOS image sensor) (not illustrated). "CMOS" stands for "complementary metal oxide semiconductor".

The finder 12 is disposed, for example, on the rear side of the apparatus body 10A and above the imaging optical system 11 and the display 15. The finder 12 is, for example, a known electronic viewfinder (EVF), and to check a subject with an image displayed on a finder display provided in the finder 12. Note that "EVF" stands for "electronic view finder". The eye sensor 13 is a sensor that detects whether or not a user is looking into the finder 12. The eye sensor 13 is disposed around a portion where the user looks into the finder 12. For example, in the present embodiment, the eye sensor 13 is disposed on the upper side of the finder 12. When the user looks into the finder 12, the eye sensor 13 detects an eye contact state in which the user's eye is in contact with the finder 12. When the user does not look into the finder 12, the eye sensor 13 detects an eye separation state in which the user's eye is separated from the finder 12.

As the microphones 14, the first to fourth microphones 14*a* to 14*d* are used to reproduce sounds in all directions (three dimensions) of the imaging apparatus 1A. For a sound technology, Ambisonics is applied as a three-dimensional sound format. In recent years, three-dimensional sound is a generic term for a technology of freely changing the direction of a sound used in virtual reality (VR) moving images and reproducing the sound, and is a part of a stereophonic sound technology. Ambisonics includes formats classified into First Order Ambisonics (FOA), High Order Ambisonics (HOA), and the like. Examples of the FOA include AmbiX and FuMa. For example, "AmbiX" is a technology that can reproduce a sound in a specific direction in which a sound source exists at the time of sound reproduction by recording a sound in an omnidirectional space (specifically, a space (sound field) in which a sound wave exists). In addition, it is possible to emphasize or reduce a sound in a specific direction in all directions.

Both a speech uttered by the user and an environmental sound around the user are input to each of the first to fourth microphones 14*a* to 14*d*. Each of the first to fourth microphones 14*a* to 14*d* converts a sound into a sound analog signal of an analog signal. For example, the microphone 14 has non-directivity or non-directional characteristics (omni-directivity or omnidirectional characteristics) in which sounds are input with the same sensitivity from all directions. The first to fourth microphones 14*a* to 14*d* have the same microphone sensitivity. Note that the first to fourth microphones 14*a* to 14*d* may have different microphone sensitivities, and adjustment due to the difference in sensitivity may be performed by a sound processing portion 23*a*, a speech extraction portion 23*b*, or the like described below. The microphone sensitivity is set to a sensitivity at which a speech uttered by the user can be input, and is set to a sensitivity at which an environmental sound in a predetermined range around the imaging apparatus 1A can be input.

Here, the "environmental sound" is a sound including music or the like played on a street in addition to daily sounds such as a street noise and a sound of nature. In a case where the subject is a living thing, the environmental sound also includes a sound made by the living thing (for example, a speech of a human, a cry of an animal, or a flapping of an insect).

The first microphone 14*a* is disposed in the rear surface of the apparatus body 10A on the right side of the display 15 and below the imaging optical system 11 and the display 15.

The second microphone 14*b* and the third microphone 14*c* are disposed on the same plane. The second microphone 14*b* and the third microphone 14*c* are disposed on an upper surface of the apparatus body 10A, one of which is disposed on the right side of the imaging optical system 11 and the other of which is disposed on the left side of the system.

The fourth microphone 14*d* is disposed in the rear surface of the apparatus body 10A at the right end (a grip portion 100 side) of the apparatus body 10A. The fourth microphone 14*d* is disposed on the same plane as the first microphone 14*a*.

A positional relationship between the first to fourth microphones 14*a* to 14*d* will be described. Assuming that the first to fourth microphones 14*a* to 14*d* are points, the first to fourth microphones 14*a* to 14*d* are arranged at positions where a triangular pyramid can be formed when the four points are connected by line segments.

The display 15 displays an image supplied from the control unit 20. The display 15 is, for example, a liquid crystal display and has a touch panel function. The display 15 is provided on the rear surface of the apparatus body 10A. The display 15 can display an image being shot, a function menu image of the imaging apparatus 1A, a setting information image of the imaging apparatus 1A, a shot image, and the like. Various functions of the imaging apparatus 1A can be set by a touch operation on the display 15.

The operation portion 16 includes a button, a switch, or the like related to shooting or the like. The operation portion 16 can also include a touch operation on the display 15. The power switch 16*a* switches ON and OFF of a power supply of the imaging apparatus 1A. The shooting mode dial 16*b* changes a shooting mode. Note that the shooting mode includes an automatic mode in which the imaging apparatus 1A automatically configures various settings, a user setting mode in which a function frequently used by the user is registered in advance, and the like. The still image/moving image switching lever 16*c* performs switching between still image shooting and moving image shooting. The shutter button 16*d* can be half-pressed to focus, and can be fully-pressed to shoot a still image. When the moving image shooting button 16*e* is pressed before moving image shooting, the moving image shooting is started, and when the moving image shooting button 16*e* is pressed during the moving image shooting, the moving image shooting is terminated.

Figure 4:
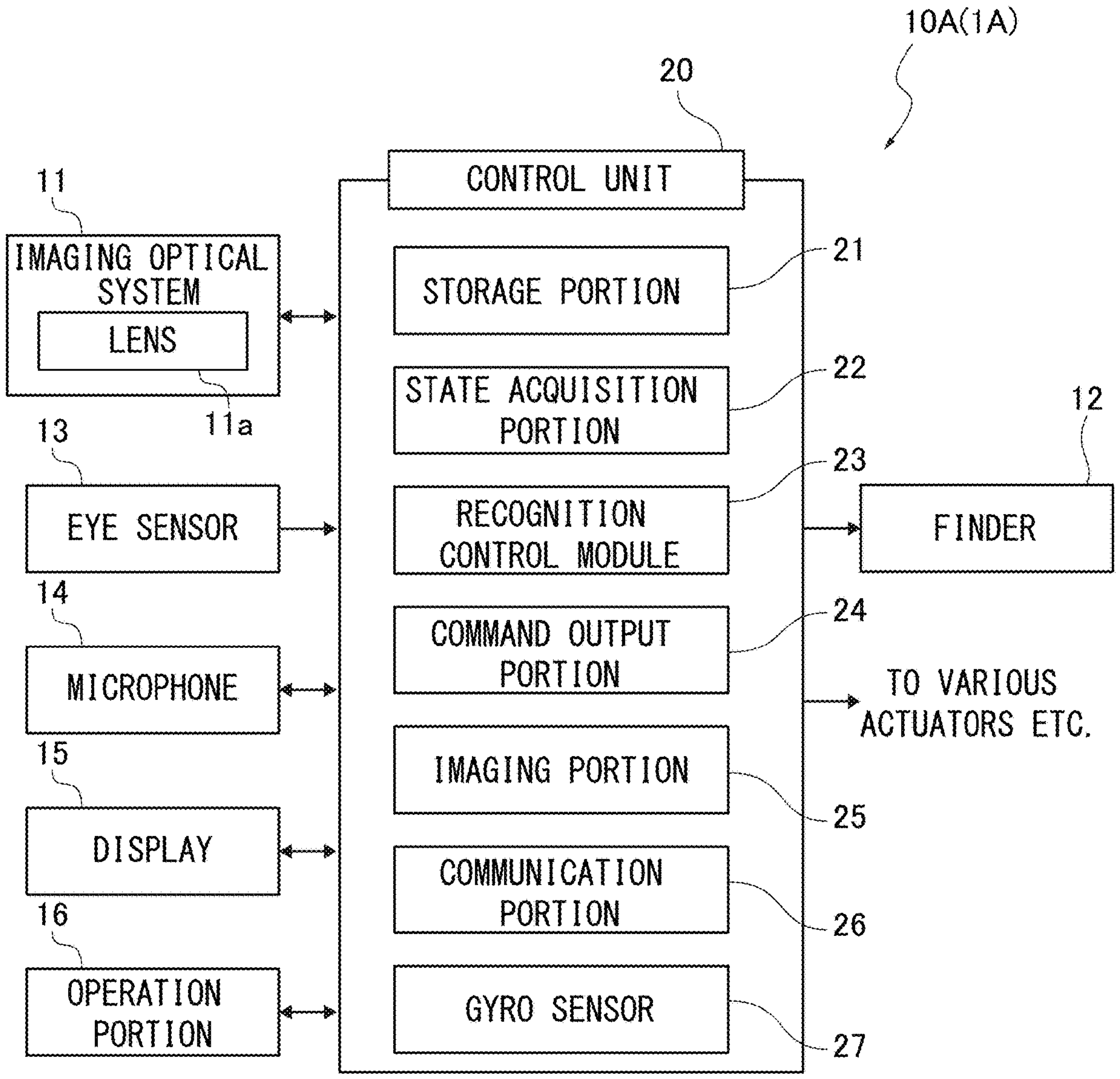
FIG. 4 is a block configuration diagram of a control unit of the imaging apparatus according to the first embodiment.

Hereinafter, a block configuration of the control unit 20 will be described with reference to FIG. 4.

The control unit 20 (computer) includes a storage portion 21, a state acquisition portion 22 (acquisition portion), a recognition control module 23 (recognition control portion), a command output portion 24, an imaging portion 25, a communication portion 26, and a gyro sensor 27 (inclination sensor).

The control unit 20 includes an arithmetic element such as a central processing unit (CPU), and a control program (not illustrated) stored in the storage portion 21 is read at the time of activation and executed in the control unit 20. As a result, the control unit 20 controls the entire imaging apparatus 1A including the lens 11*a*, the finder 12, the microphones 14, the display 15, the operation portions 16, the state acquisition portion 22, the recognition control module 23, the command output portion 24, the imaging portion 25, and the communication portion 26. The control unit 20 operates the imaging apparatus 1A provided with at least one of the movable portion or the connected device by recognizing a speech uttered by the user. In other words, the control unit 20 operates the imaging apparatus 1A provided with at least one of the movable portion or the connected device according to an input speech. Various signals such as the state information signal of the lens 11*a*, a detection signal (detection result) of the eye sensor 13, the sound analog signal of the microphone 14, and an angle signal (inclination information) of the gyro sensor 27 are input to the control unit 20. Various signals such as setting signals for various functions of the imaging apparatus 1A input by a touch operation on the display 15 and operation signals from the operation portions 16 are input to the control unit 20 via an input interface (not illustrated). The control unit 20 controls the entire imaging apparatus 1A based on the input various signals. Note that "CPU" stands for "central processing".

For example, in a case where the detection signal of the eye sensor 13 indicates the eye contact state, the control unit 20 automatically turns off the power supply of the display 15 and automatically turns on a power supply for the finder display via a display controller (not illustrated). In a case where the detection signal of the eye sensor 13 indicates the eye separation state, the control unit 20 automatically turns on the power supply of the display 15 and automatically turns off the power supply for the finder display via the display controller (not illustrated).

The storage portion 21 includes a mass storage medium (for example, a flash memory or a hard disk drive) and a semiconductor storage medium such as ROM or RAM. The storage portion 21 stores the above-described control program, and also temporarily stores various signals (various sensor signals, state information signals, and the like) and various data required at the time of a control operation of the control unit 20. Uncompressed RAW audio data (live audio data) input from the microphone 14 is temporarily stored in the RAM of the storage portion 21. The storage portion 21 also stores various data such as image data and video data output from the imaging portion 25. Note that "ROM" stands for "read-only memory", and "RAM" stands for "random access memory".

The state acquisition portion 22 acquires various signals and outputs the signals to the storage portion 21 and the recognition control module 23. In the present embodiment, the state information signal is a signal of the state information related to the lens 11*a*.

The recognition control module 23 executes processing such as conversion of the sound analog signal input from the microphone 14, recognition of a speech uttered by the user, or output of a recognized text signal (recognition result). The recognition control module 23 outputs the text signal to the command output portion 24. Details of the recognition control module 23 are described below.

The command output portion 24 executes the processing of outputting an operation signal (command signal) according to the text signal from the recognition control module 23. Details of the command output portion 24 are described below.

In the imaging portion 25, the imaging element (not illustrated) captures the subject image formed by the imaging optical system 11 and generates an image signal. Various types of image processing (for example, noise removal processing and compression processing) are performed on the generated image signal to generate image data (still image). The generated image data is stored in the storage portion 21. In the case of the moving image shooting, video data is generated from a plurality of consecutive pieces of image data, and the generated video data is stored in the storage portion 21.

The communication portion 26 communicates with an external device in a wired or wireless manner.

The gyro sensor 27 is a known sensor that detects the inclination of the apparatus body 10A, that is, an angle (posture), an angular velocity, and an angular acceleration of the apparatus body 10A.

Figure 5:
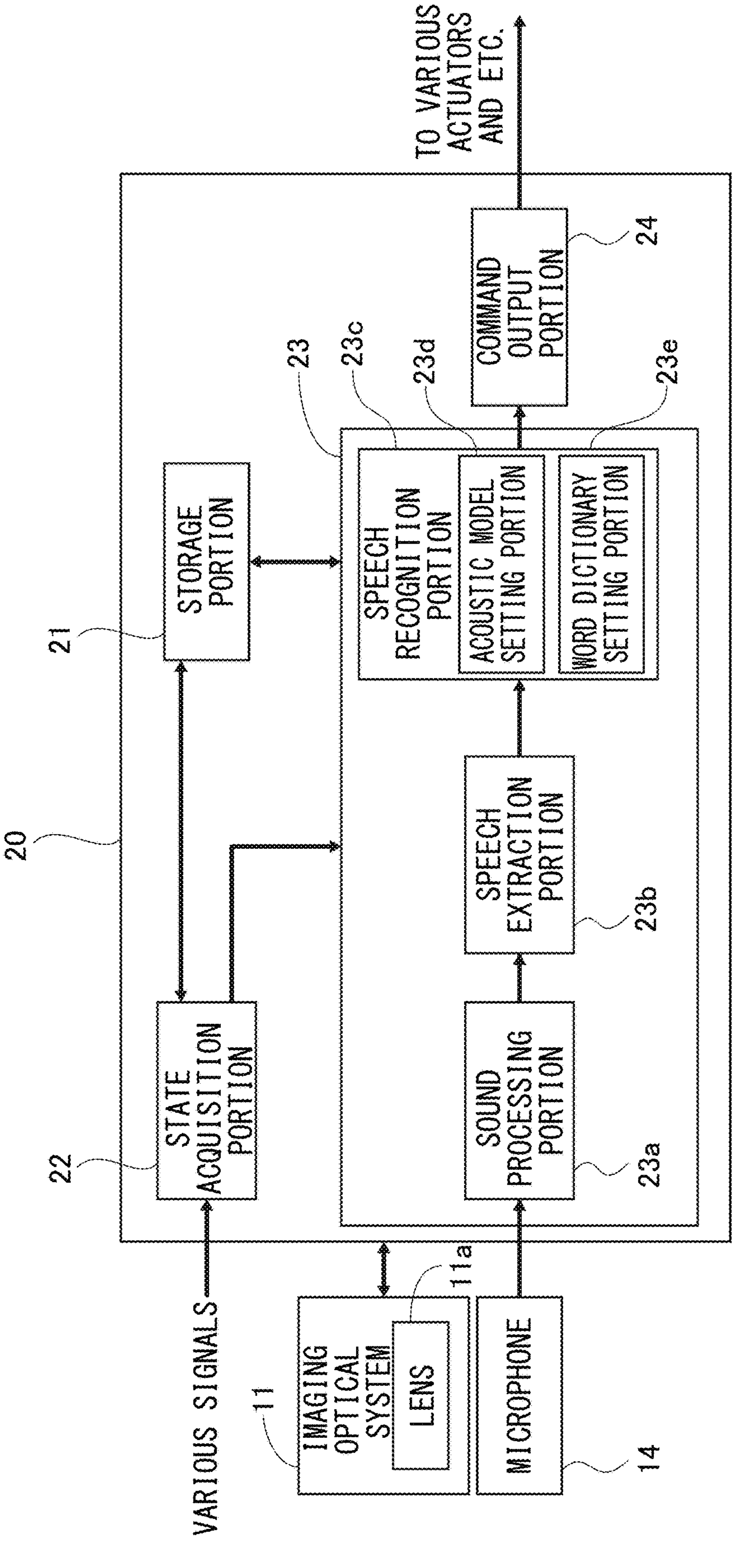
FIG. 5 is a block configuration diagram of the control unit and a recognition control module of the imaging apparatus according to the first embodiment.

Hereinafter, block configurations of the control unit 20 and the recognition control module 23 will be described with reference to FIG. 5. The command output portion 24 will also be described.

The recognition control module 23 sets a control content for speech recognition based on the state information signal, and performs speech recognition (recognition control processing). The recognition control module 23 includes a sound processing portion 23*a*, a speech extraction portion 23*b*, and a speech recognition portion 23*c* (recognition portion). The speech recognition portion 23*c* includes an acoustic model setting portion 23*d* and a word dictionary setting portion 23*e*. Note that, in the example illustrated in FIG. 5, the imaging apparatus 1A of the present embodiment includes the lens 11*a*, the microphones 14, the control unit 20, and the recognition control module 23. The control unit 20 functions as the speech recognition apparatus. A program for executing processing in each of the portions 22, 23*a* to 23*e*, and 24 is stored as the control program in the storage portion 21. The control unit 20 reads and executes the program in the RAM to execute processing in each of the portions 22, 23*a* to 23*e*, and 24.

The state acquisition portion 22 acquires various signals and outputs the signals to the storage portion 21 and the recognition control module 23.

The sound processing portion 23*a* executes sound processing such as conversion of the sound analog signal input from the microphone 14 into a sound digital signal (sound digital data or sound) and known noise removal for the sound digital signal. The sound processing portion 23*a* outputs the sound digital signal to the speech extraction portion 23*b*. The sound processing portion 23*a* repeatedly executes the following sound processing while a sound (a plurality of sounds and a plurality of speeches) is being input to the microphone 14. Note that the sound processing is separately executed for sounds input to the respective first to fourth microphones 14*a* to 14*d* In addition, the sound digital signals mean the case where the sound input to each of the first to fourth microphones 14*a* to 14*d* does not specifically distinguish the signals obtained by executing the sound processing.

First, the sound processing portion 23*a* amplifies the sound analog signal. The sound processing portion 23*a* amplifies the sound analog signal by using a preamplifier. The sound processing portion 23*a* outputs the amplified sound analog signal to an analog-digital converter. Here, the reason for amplifying the sound analog signal is that the sound analog signal is weak. The amplification can ensure an SNR or dynamic range by matching the width of a voltage acceptable by the subsequent analog-to-digital converter. Note that "SNR" stands for "signal-to-noise ratio (S/N ratio)".

Next, the sound processing portion 23*a* converts the sound analog signal into the sound digital signal. The sound processing portion 23*a* converts the sound analog signal into the sound digital signal by using the analog-to-digital converter. Then, the sound processing portion 23*a* outputs the sound digital signal subjected to the sound processing to the speech extraction portion 23*b*. Hereinafter, a signal obtained by executing the sound processing for the sound input to the first microphone 14*a* is referred to as a "first microphone sound digital signal (first microphone sound digital data)". A signal obtained by executing the sound processing for the sound input to the second microphone 14*b* is referred to as a "second microphone sound digital signal (second microphone sound digital data)". A signal obtained by executing the sound processing for the sound input to the third microphone 14*c* is referred to as a "third microphone sound digital signal (third microphone sound digital data)". A signal obtained by executing the sound processing for the sound input to the fourth microphone 14*d* is referred to as a "fourth microphone sound digital signal (fourth microphone sound digital data)". The term "sound digital signals" is used herein unless the first to fourth microphone sound digital signals are specifically distinguished.

The speech extraction portion 23*b* sets directivity based on various signals. For example, in a case where the signal input from the eye sensor 13 indicates the eye contact state, the speech extraction portion 23*b* switches the directivity based on the angle signal. Specifically, the directivity is switched depending on whether the angle signal indicates a horizontal position or a vertical position. The "horizontal position" is a state position where the finder 12 is above the imaging optical system 11. The "vertical position" is a state position where the grip portion 100 is above or below the imaging optical system 11. The speech extraction portion 23*b* extracts a speech digital signal (speech digital data or speech) from the sound digital signal input from the sound processing portion 23*a*. The speech extraction portion 23*b* outputs the extracted speech digital signal to the speech recognition portion 23*c*. The speech extraction portion 23*b* repeatedly executes the following speech extraction processing while the sound digital signal is being input from the sound processing portion 23*a*. The speech extraction portion 23*b* estimates the position of the speech (the position of the mouth of the user) from the first to fourth microphone sound digital signals, and extracts the speech digital signal from the sound digital signal based on the position of the speech (extraction by directivity control). As a result, it is possible to extract the speech digital signal that enables speech recognition.

Next, the speech extraction portion 23*b* executes, for the extracted speech digital signal, processing of eliminating a direct current (DC) component, adjusting a frequency characteristic, adjusting a volume, and removing noise for reducing wind noise as described below.

Next, the speech extraction portion 23*b* eliminates a DC component of the sound digital signal. For example, the speech extraction portion 23*b* eliminates the DC component by using a high-pass filter (frequency band limiting filter).

Here, if the DC component is not eliminated, there is a possibility of limiting the amplitude of the sound digital signal due to signal bias, which can result in sound distortion or degradation of the dynamic range.

Next, the speech extraction portion 23*b* adjusts the frequency characteristic of the sound digital signal. For example, the speech extraction portion 23*b* adjusts the frequency characteristic of the sound digital signal by using a band pass filter. The reason for adjusting the frequency characteristic is to remove electrical peak noise and to adjust sound quality. Note that the band pass filter may be an equalizer or a notch filter (band stop filter).

Next, the speech extraction portion 23*b* adjusts the volume of the sound digital signal. For example, the speech extraction portion 23*b* executes volume processing of lowering the sensitivity when a large volume sound is input and increasing the sensitivity when a small volume sound is input by using dynamic range control or auto gain control. Note that the determination of the magnitude of the volume is set in advance based on an experiment, a simulation, or the like. The speech extraction portion 23*b* may further reduce the sensitivity by using a noise gate when only a sound with a low noise level is input to suppress base noise. Note that the base noise is background noise, and is, for example, a driving sound of the imaging apparatus 1A.

Next, the speech extraction portion 23*b* reduces wind noise from the sound digital signal. For example, the speech extraction portion 23*b* executes the processing of analyzing the sound digital signal, identifying and determining input of wind, and reducing wind noise for the sound digital signal. Note that the order in which the DC component elimination, the frequency characteristic adjustment, the volume adjustment, and the wind noise reduction are performed is not limited to the above-described order.

Then, the speech extraction portion 23*b* outputs the noise-removed speech digital signal to the speech recognition portion 23*c*.

The speech recognition portion 23*c* sets the control content for recognizing the speech digital signal input from the speech extraction portion 23*b* based on the state information signal, and recognizes the speech digital signal. The speech recognition portion 23*c* outputs the text signal to the command output portion 24. The speech recognition portion 23*c* repeatedly executes the following speech recognition processing (recognition processing) while the speech digital signal from the speech extraction portion 23*b* and the state information signal are being input. Hereinafter, the acoustic model setting portion 23*d* and the word dictionary setting portion 23*e* will be described.

First, the acoustic model setting portion 23*d* included in the speech recognition portion 23*c* selects an acoustic model suitable for speech recognition from a plurality of acoustic models stored in the storage portion 21 based on various signals. Then, the acoustic model setting portion 23*d* reads the selected acoustic model from the storage portion 21 and sets the acoustic model as an acoustic model for speech recognition. For example, in a case where the detection signal of the eye sensor 13 indicates the eye contact state, since the user utters a speech while being in contact with the apparatus body 10A (a distance between the microphone 14 and the mouth of the user is within several cm), it is assumed that the speech uttered by the user is a whispering speech. In a case where the detection signal of the eye sensor 13 indicates the eye separation state, since the user utters a speech while being away from the apparatus body 10A (the distance between the microphone 14 and the mouth of the user is 10 cm or more), it is assumed that the speech uttered by the user is a normal utterance. Therefore, it is necessary to set an acoustic model suitable for the speech digital signal depending on a whispering speech, a normal utterance, or the like. In addition, it is necessary to set an acoustic model suitable for the characteristic of the microphone 14 to which the speech is input.

Here, the "acoustic model" will be described. The acoustic model is a model for converting a physical "sound" into "phonemes" as a minimum unit of a character. The acoustic model is created by learning features of training or teaching data of unspecified speeches acquired from a large number of speakers. The teaching data is a set of speech data and label data (what word was uttered) of the unspecified speeches acquired from a large number of speakers. The acoustic model is created based on speech frequency characteristics of the unspecified speeches. Since the speech frequency characteristics change depending on, for example, a speech such as a whispering speech or a normal utterance, a plurality of acoustic models are required. For similar reasons, a plurality of pieces of teaching data are also required. The plurality of acoustic models and the plurality of pieces of teaching data are stored in the storage portion 21. Note that the frequency characteristic of the whispering sound has fewer low frequencies (components) than the frequency characteristic of the normal utterance.

In addition, the normal utterance and the whispering sound will be described. The "normal utterance" is a speech whose vowel sound is a voiced sound. The "voiced sound" is a sound accompanied by the vibration of the vocal cords of the user in the speech uttered by the user. The "whispering speech" is a speech obtained by devocalizing at least a part of the normal utterance. The "devocalization" refers to a vowel sound or a consonant sound becoming an unvoiced sound. The "unvoiced sound" is a sound that does not involve the vibration of the vocal cords of the user in the speech uttered by the user. Here, an example of the "normal utterance" and the "whispering speech" will be described. Note that uppercase English letters are assumed to be voiced sounds, and lowercase English letters are assumed to be voiceless sounds. For example, a case where the word "douga (which is a Japanese word meaning moving images)" is uttered will be described. In the normal utterance, the word is pronounced as "DOUGA". In the whispering speech, the word may be pronounced as a mixed form of voiced sounds and unvoiced sounds, such as "DouGa" and "tOUKA", or the word may be completely devocalized and pronounced as, for example, "touka". In addition, even the normal utterance may include an unvoiced sound. For example, "satsuei (which is a Japanese word meaning shooting)" is pronounced as "sAtUEI" in the normal utterance, and is pronounced as "satuei" in the whispering speech. As described above, "satsuei (shooting)" of the whispering speech is pronounced as a speech obtained by devocalizing at least a part of the normal utterance.

Next, the speech recognition portion 23*c* converts the speech digital signal into "phonemes" with a speech recognition engine. Specifically, the speech recognition portion 23*c* converts the speech digital signal into phonemes by using the acoustic model. Note that the speech recognition engine converts the input speech digital signal into text.

Next, the speech recognition portion 23*c* lists word candidates by linking an arrangement order of the phonemes to a word dictionary (pronunciation dictionary) stored in advance. The word dictionary is a dictionary for linking a phoneme converted by the acoustic model to a word. In addition, the word dictionary is stored in the storage portion 21 in advance. The word dictionary setting portion 23*e* in the speech recognition portion 23*c* selects a word suitable for speech recognition from the words in the word dictionary stored in the storage portion 21 based on various signals. Then, the word dictionary setting portion 23*e* reads the selected word from the storage portion 21 and sets the word as a word in the word dictionary for speech recognition. Here, as for the "word" in the word dictionary, for example, one "F-number" corresponds to one word when explained "F-number" referring to FIG. 6A. As a specific example, "F 1.0" corresponds to one word.

Here, the word dictionary setting portion 23*e* sets the control content for recognizing the speech digital signal input from the speech extraction portion 23*b* based on the state information signal. In the present embodiment, the state information signal is a signal of the state information of the lens 11*a*. The state information of the lens 11*a* is changed by replacement of the lens 11*a*. For example, when the lens 11*a* is replaced from an electric zoom lens to a single focus lens, the state information of the lens 11*a* is changed. Then, before and after the replacement, a state of whether or not a settable F-number and focal length have been changed is changed. That is, a change in state information of the lens 11*a* affects the recognition of a speech input to the microphone 14. Therefore, it is necessary to set the control content for speech recognition according to a change in state information of the lens 11*a*. As described above, as the lens 11*a* is changed, the state information such as a settable F-number is different before and after the replacement. In the present embodiment, the control content is the setting of a word in the word dictionary. Then, the word dictionary setting portion 23*e* sets the word in the word dictionary that is the control content to a word corresponding to the state information of the lens 11*a* based on the state information signal. In other words, the word dictionary setting portion 23*e* limits the words in the word dictionary to a range that can be set by the lens 11*a* based on the state information signal. Note that, after the replacement of the lens 11*a*, the state of the entire imaging apparatus 1A is changed.

For example, a settable F-number or focal length is different between a case where the lens 11*a* is a single-focus lens and a case where the lens 11*a* is an electric zoom lens. Since the F-number can be changed in a case of the single focus lens, the word dictionary setting portion 23*e* sets the word in the word dictionary to a word corresponding to the state information of the single focus lens attached to the apparatus body 10A as illustrated in FIGS. 6A and 6B. Note that circled portions in FIGS. 6A and 6B indicate settable ranges of the respective lenses. Note that, since the focal length cannot be changed in a case of the single focus lens, the word dictionary setting portion 23*e* sets a word dictionary including no word related to the focal length Since both the F-number and the focal length can be changed in a case of the electric zoom lens, the word dictionary setting portion 23*e* sets the word in the word dictionary to a word corresponding to the state information of the electric zoom lens attached to the apparatus body 10A. As an example, FIGS. 6A and 6B illustrate settable ranges of an electric zoom lens A and an electric zoom lens B. In addition, in a case of the retractable lens, since shooting cannot be performed in a state in which the lens is housed, the word dictionary setting portion 23*e* sets a word dictionary that does not include the word "shooting". Note that, although some types of retractable lenses can perform shooting even in a housed state but cannot focus, similarly to the above, the word dictionary setting portion 23*e* sets a word dictionary that does not include the word "shooting".

Next, the speech recognition portion 23*c* lists sentence candidates that are to be correct sentences from the word candidates by using a language model. Note that the language model is a word arrangement establishment information model, and can improve accuracy and speed in listing sentence candidates that are to be correct sentences from the word candidates by limiting the arrangement of the words. Examples thereof include "watashi", "wa", "genki", and "desu" (which form the Japanese sentence "I'm doing fine"). In addition, the language model is stored in the storage portion 21 in advance.

Next, the speech recognition portion 23*c* selects a sentence having the highest statistical evaluation value among the sentence candidates. Then, the speech recognition portion 23*c* outputs the selected sentence (recognition result) to the command output portion 24 as the text signal (text data). The "statistical evaluation value" is an evaluation value indicating the accuracy of the recognition result at the time of speech recognition.

Note that, in a case where one word is output from phonemes in the imaging apparatus 1A, the listing of the sentence candidates and the sentence selection may be omitted, and the word (recognition result) output from the phoneme may be output to the command output portion 24 as the text signal (text data). In addition, in some cases, the sound digital signal subjected to the sound processing includes an environmental sound but does not include a speech. In this case, the speech recognition portion 23*c* outputs a non-applicable recognition result in which a speech is not recognized to the command output portion 24 as a non-text signal (a type of text signal) not including a sentence or a word.

The command output portion 24 outputs the operation signal (command signal) according to the text signal input from the speech recognition portion 23*c*. Specifically, the command output portion 24 repeats the following command output processing (output processing) while the text signal is input from the speech recognition portion 23*c*.

First, the command output portion 24 reads a command list of FIG. 7 stored in the storage portion 21. Next, the command output portion 24 determines (identifies) whether or not the text signal matches a word described in a word field of the read command list. In a case where the text signal matches the word, the command output portion 24 outputs an operation of the imaging apparatus 1A described in an operation field of the command list to the imaging apparatus 1A (for example, various actuators (not illustrated)) as the operation signal, and ends the processing. Then, various actuators and the like (not illustrated) are operated according to the input operation signal. On the other hand, in a case where the text signal does not match the word, the command output portion 24 ends the processing without outputting any operation signal. Here, a specific example of the actuators and the like will be described. For example, there are a motor for autofocus adjustment, a motor for shutter operation, a lens zoom motor, and the like. In addition to the actuators, there are the setting of the imaging apparatus 1A, the changing of display by menu search, or the addition of information such as attachment of a tag to a photograph, and the like. Specifically, the attachment of a tag to a photograph is the attachment of a tag (a title or name of the picture) to a taken picture by voice.

Next, an existing speech recognition apparatus will be described.

The speech recognition apparatus acquires information indicating a state of an electronic device (digital camera) as a speech operation target, determines a phrase corresponding to the information as a candidate phrase, and detects a specific phrase from speech data. The specific phrase is specified to be one of the candidate phrases to determine the phrase as a recognized phrase. The state of the digital camera indicates a state in which a shooting mode, a display mode, and various parameters are set, that is, a control state. However, the speech recognition apparatus does not focus on the state information changed by the operation of the movable portion provided in the digital camera or the connected device. Therefore, in the speech recognition apparatus, when the state information is changed by the operation of the movable portion or the connected device, the accuracy of speech recognition may be deteriorated.

Here, in the digital camera, there are relatively many movable portions such as the lens 11*a*, the display 15, and an air-cooling fan (17). Furthermore, in the digital camera, there are relatively many connected devices such as an external microphone (19), a selfie grip, and a battery grip (battery pack).

Therefore, as described above, the applicant has focused on the fact that a change in state information affects recognition of a speech input to the microphone 14, and the accuracy of the speech recognition is improved based on the state information in a case where the user uses a speech recognition function.

Next, the actions and effects of the first embodiment will be described.

First, the actions and effects of the speech recognition control of the imaging apparatus 1A will be described. In the state acquisition portion 22, when various signals are input, the various signals are acquired by the state acquisition portion 22 (acquisition processing). In the sound processing portion 23*a*, when a sound is input to the microphone 14, at the same time as the acquisition processing portion, or before or after the acquisition processing portion, the sound processing portion 23*a* converts the sound analog signal into the sound digital signal (sound processing). Next, in the speech extraction portion 23*b*, when the various signals and the sound digital signal are input, the speech extraction portion 23*b* sets the directivity based on the various signals and extracts the speech digital signal from the sound digital signal (speech extraction processing). Next, the speech extraction portion 23*b* executes noise removal processing for the extracted speech digital signal (speech extraction processing).

Next, in the speech recognition portion 23*c*, when the various signals and the speech digital signal are input, the acoustic model setting portion 23*d* sets the acoustic model (speech recognition processing and acoustic model setting processing). Thereafter, the word dictionary setting portion 23*e* sets the word in the word dictionary that is the control content to a word corresponding to the state information signal based on the state information signal (speech recognition processing and word setting processing). Subsequently, a sentence or a word is recognized by the speech recognition portion 23*c* (speech recognition processing). Next, in the command output portion 24, when the text signal as the recognition result is input, the operation signal is output according to the text signal from the command output portion 24 (command output processing). Then, for example, various actuators and the like are operated according to the input operation signal. In this manner, a speech uttered by the user can be recognized, and the operation signal can be output according to the recognition result. As described above, the recognition control module 23 executes the processing of setting a control content for speech recognition based on the state information signal, and performing speech recognition (recognition control processing).

Next, the actions and effects of the imaging apparatus 1A will be described.

In the present embodiment, the state acquisition portion 22, the recognition control module 23, and the command output portion 24 are provided. The state acquisition portion 22 acquires the state information signal regarding at least one of the movable portion provided in the imaging apparatus 1A operated according to an input speech or the connected device. The recognition control module 23 sets the control content for speech recognition based on the state information signal acquired by the state acquisition portion 22, and performs speech recognition. The command output portion 24 outputs the operation signal for operating the imaging apparatus 1A to the imaging apparatus 1A according to the text signal from the recognition control module 23. Therefore, the accuracy of speech recognition can be improved based on the state information signal (recognition accuracy improvement action). In other words, the accuracy of speech recognition can be improved by reflecting the state information signal.

In the present embodiment, the recognition control module 23 (the speech recognition portion 23*c* and the word dictionary setting portion 23*e*) sets the word in the word dictionary that is the control content to a word corresponding to the state information signal of at least one of the movable portion or the connected device based on the state information signal acquired by the state acquisition portion 22. That is, the setting of the word in the word dictionary improves the accuracy of the linkage of a phoneme to a word. Therefore, erroneous speech recognition is suppressed by setting a word corresponding to the state information signal. Therefore, the accuracy of speech recognition can be improved by setting a word (word setting action).

In the present embodiment, the imaging apparatus 1A includes the speech recognition apparatus. The imaging apparatus 1A includes the imaging optical system 11. That is, the imaging apparatus 1A can have a function capable of recognizing a speech. Therefore, the imaging apparatus 1A can be operated by speech (imaging apparatus operation action).

In the present embodiment, the imaging optical system 11 includes a single focus lens, a zoom lens, or a retractable lens as the lens 11*a*. The recognition control module 23 (the speech recognition portion 23*c* and the word dictionary setting portion 23*e*) sets the word in the word dictionary that is the control content to a word corresponding to the state information signal of the lens 11*a* based on the state information signal acquired by the state acquisition portion 22. Accordingly, it is possible to suppress erroneous recognition of the setting of the lens 11*a* at the time of speech recognition, and thus, the accuracy of speech recognition can be improved (a word setting action for the lens 11*a*).

Second Embodiment

Next, an imaging apparatus 1B according to a second embodiment will be described with reference to FIGS. 8 to 11. A description of the same configuration as that of the first embodiment will be omitted or simplified.

Similarly to the first embodiment, an apparatus body 10B (body and housing) of the imaging apparatus 1B includes an imaging optical system 11 (image forming optical system), a finder 12, an eye sensor 13, microphones 14 (input portions and built-in microphones), and a display 15 (display and movable portion) (see FIGS. 1 to 3 and 8). A grip portion 100 is integrally formed on the right side of the apparatus body 10B. The apparatus body 10B further includes a control unit 20 and various actuators and the like (not illustrated).

Figure 9A:
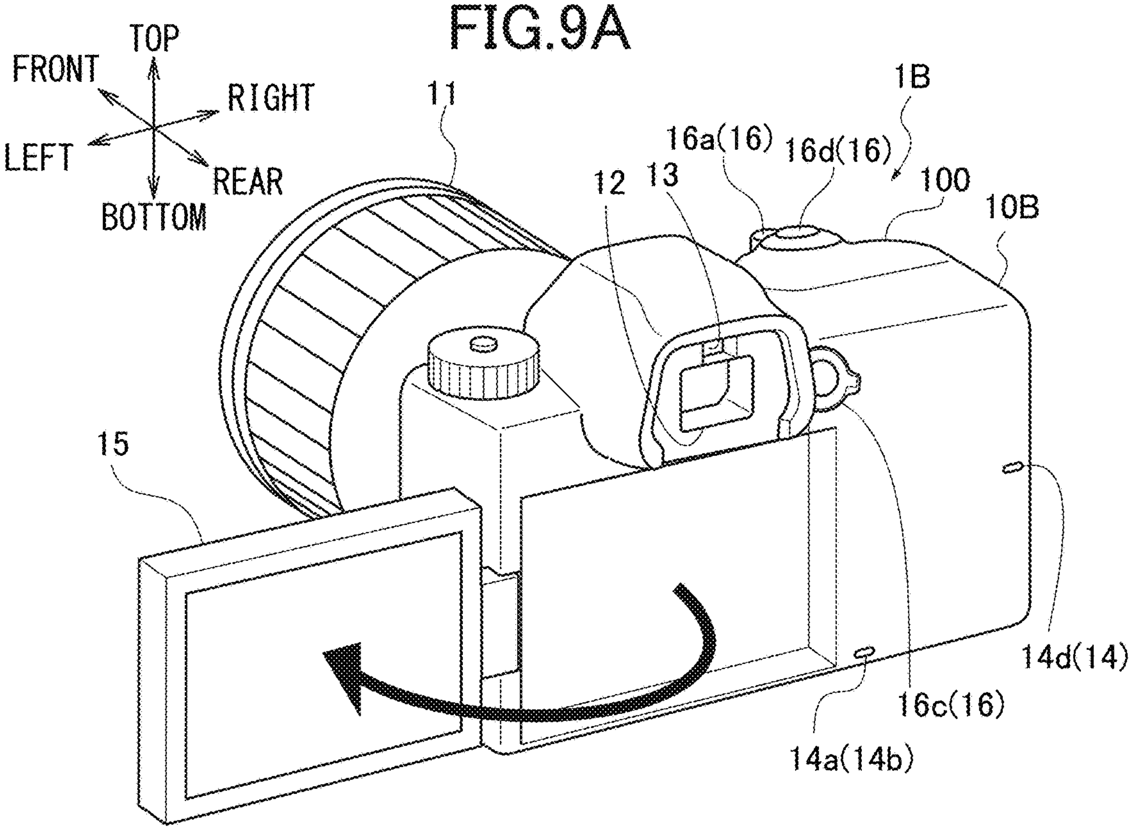
FIG. 9A is a view illustrating a movable state (a state of being opened to the left) of a display of the imaging apparatus according to the second embodiment.
Figure 9B:
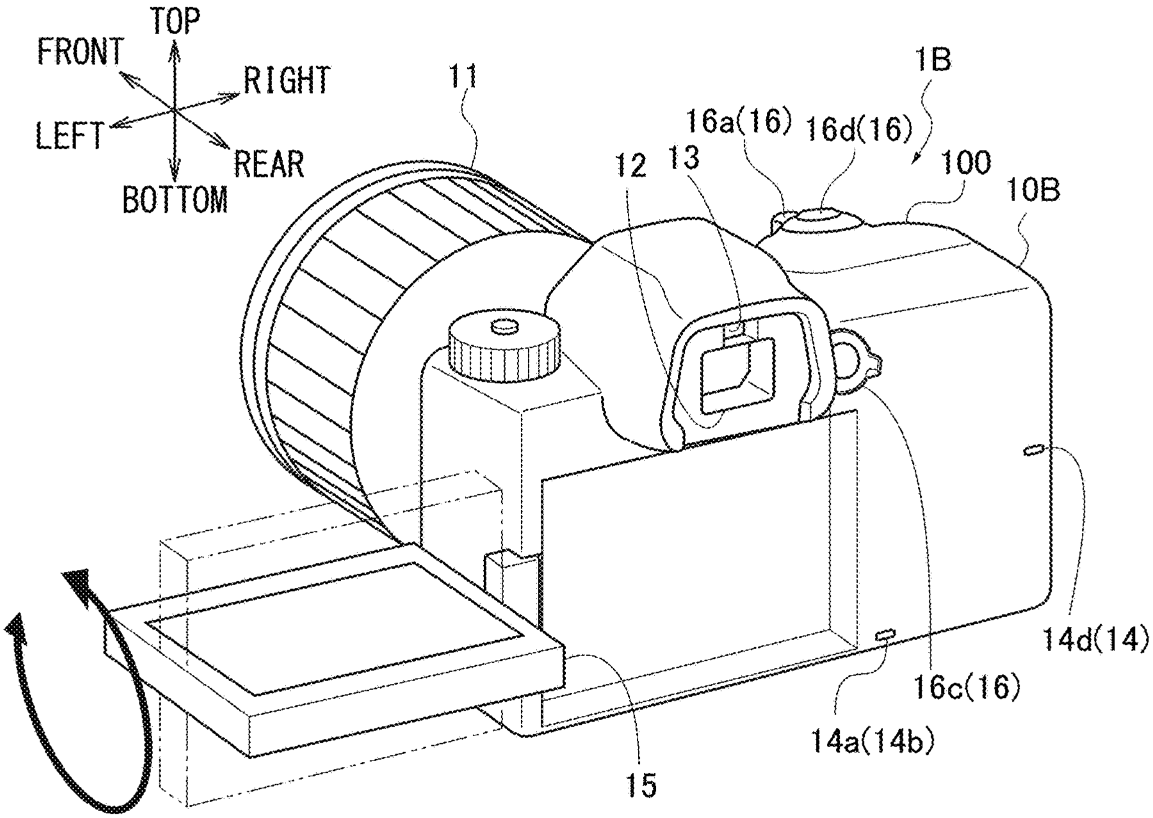
FIG. 9B is a view illustrating a movable state (rotated state) of the display of the imaging apparatus according to the second embodiment.
Figure 10A:
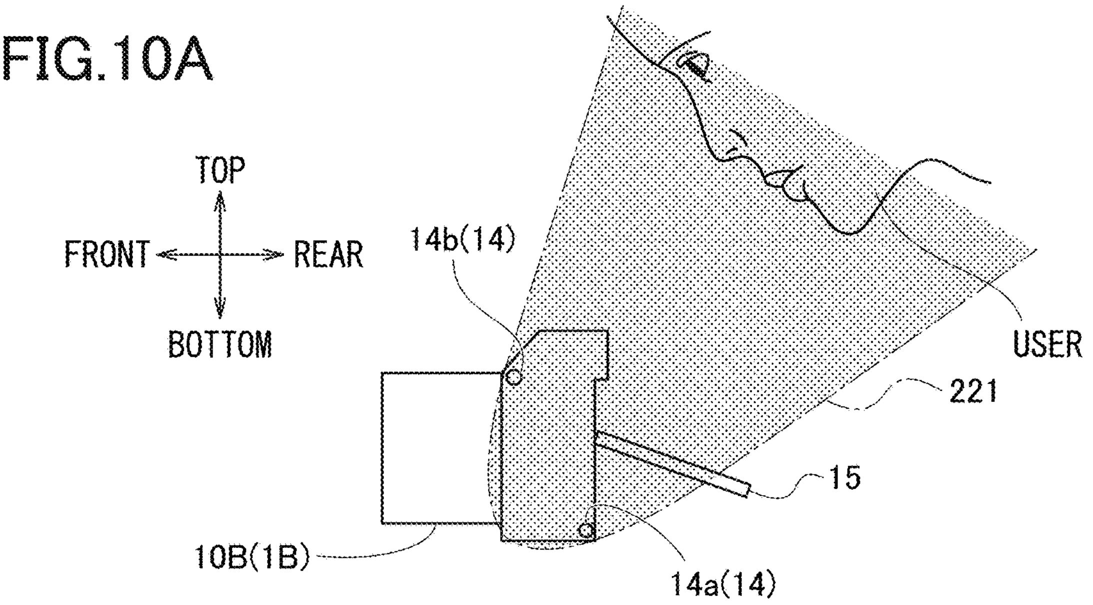
FIG. 10A is an explanatory view illustrating an example of a space of a specific-direction (upper side) speech for a speech extraction portion of the imaging apparatus according to the second embodiment.
Figure 10B:
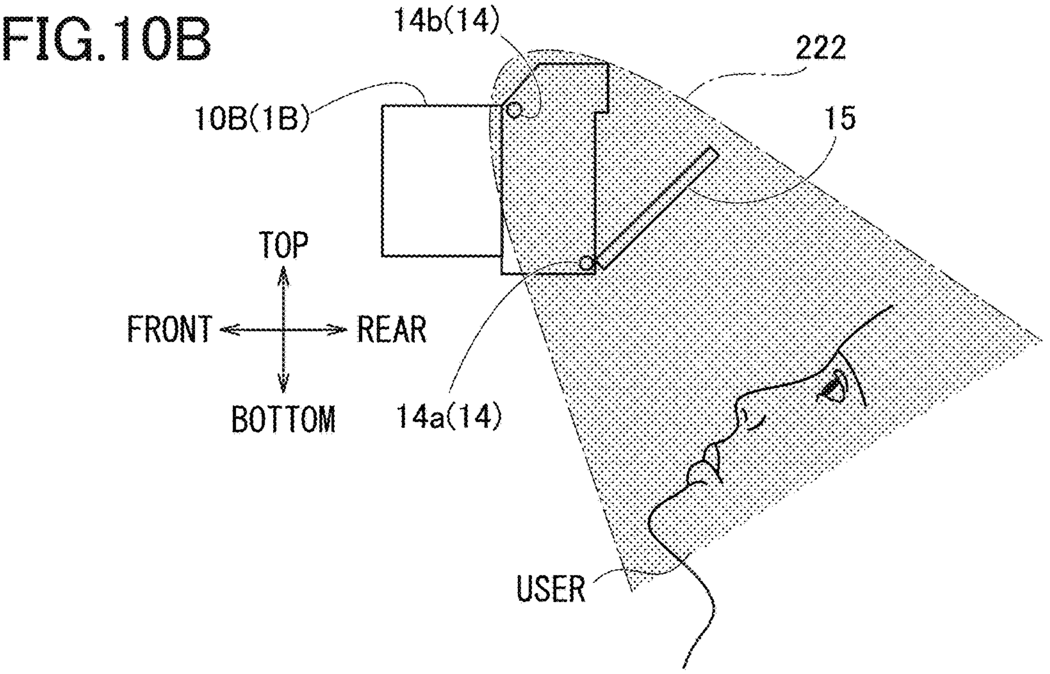
FIG. 10B is an explanatory view illustrating an example of a space of a specific-direction (lower side) speech for the speech extraction portion of the imaging apparatus according to the second embodiment.
Figure 10C:
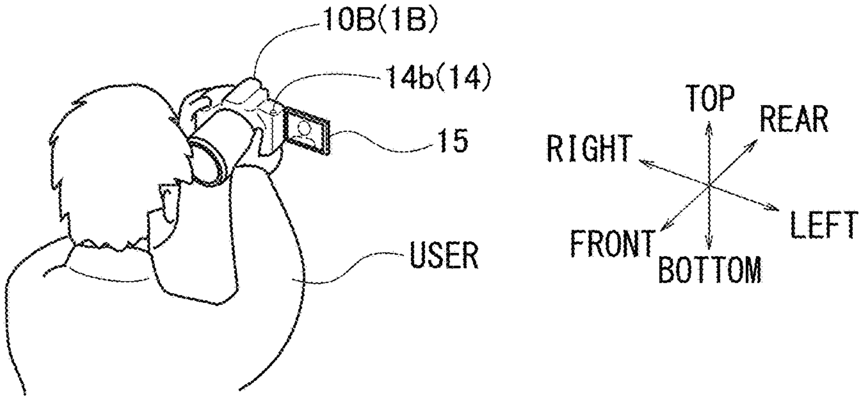
FIG. 10C is an explanatory view for explaining selfies in the speech extraction portion of the imaging apparatus according to the second embodiment.

As illustrated in FIGS. 9A and 9B, the display 15 is of an adjustable-angle type whose screen angle is changeable, unlike the first embodiment. As illustrated in FIG. 9A, the display 15 can be opened toward the left side of the apparatus body 10B. Then, the display 15 in the opened state can be rotated as illustrated in FIG. 9B. For example, a screen of the display 15 is directed upward as illustrated in FIG. 10A when shooting a subject at a position lower than a position of the user's eye in a vertical direction. Accordingly, the user can perform low-angle shooting by viewing the display 15 from above the apparatus body 10B without looking into the finder 12. Furthermore, the screen of the display 15 is directed downward as illustrated in FIG. 10B when shooting a subject at a position higher than the position of the user's eye in the vertical direction or shooting a subject over a person. Accordingly, the user can perform high-angle shooting by viewing the display 15 from below the apparatus body 10B without looking into the finder 12. Furthermore, when taking a picture of oneself (selfie), the screen of the display 15 is directed forward on the apparatus body 10B as illustrated in FIG. 10C. As a result, the user can take a selfie while checking the position of the user displayed on the display 15 without looking into the finder 12.

Figure 8:
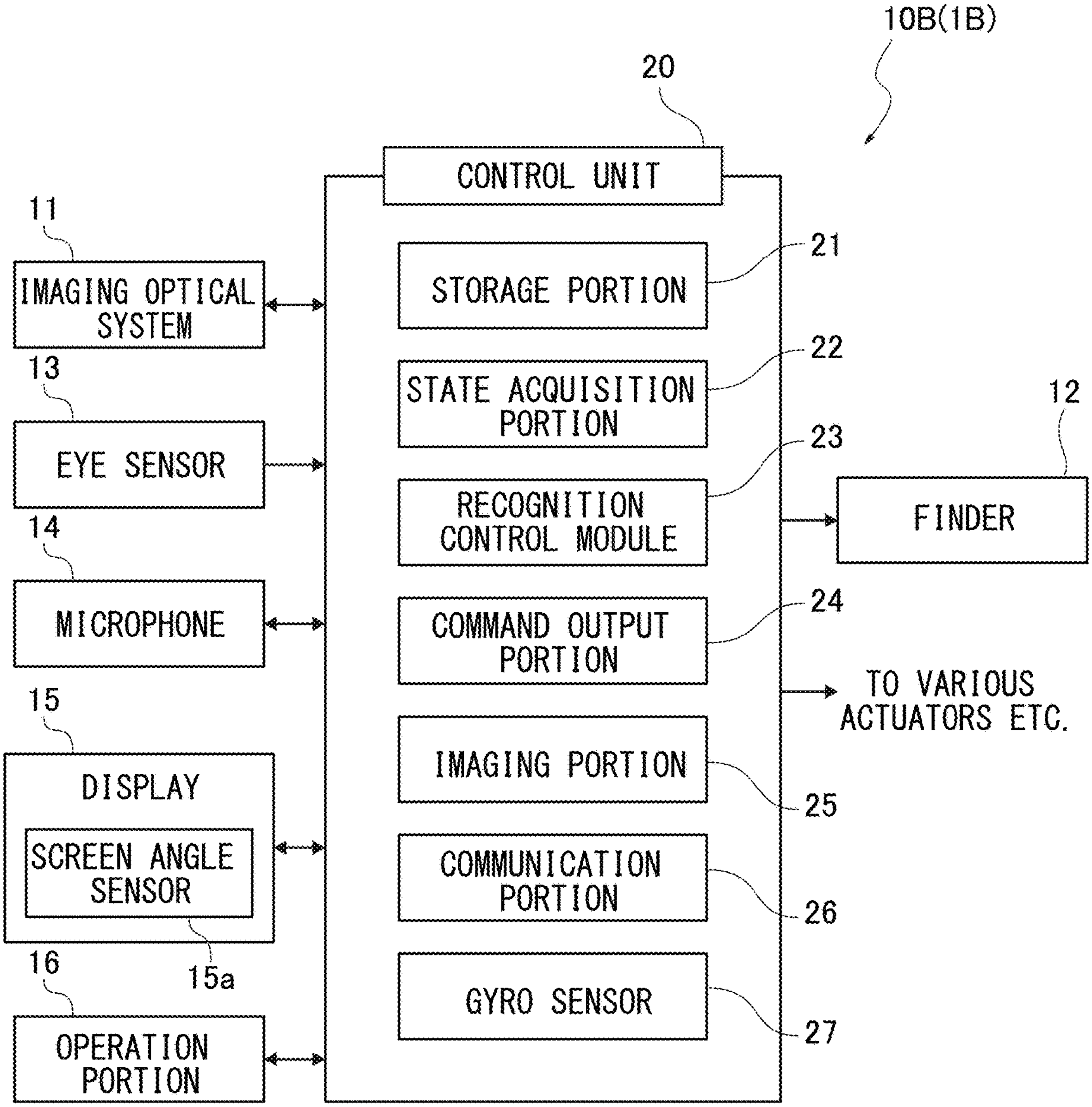
FIG. 8 is a block configuration diagram of a control unit of an imaging apparatus according to a second embodiment.

As illustrated in FIG. 8, the display 15 includes a screen angle sensor 15*a*. The screen angle sensor 15*a* is a sensor that detects a screen angle of the display 15. When the screen angle is detected, the screen angle sensor 15*a* transmits the state information of the display 15 to the control unit 20 as a state information signal by communication with the control unit 20. The state information of the display 15 is the screen angle detected by the screen angle sensor 15*a*. For example, in a case where the apparatus body 10B is at a horizontal position at the time of shooting as illustrated in FIGS. 9A, 9B, and 10A to 10C, the angle of display 15 is as follows. In a housed state (see FIG. 1) and a state in which the display 15 is opened toward the left side as illustrated in FIG. 9A, the angle of the display 15 is "0" degrees. The housed state is a state in which the display 15 is not opened toward the left side, the display 15 is housed in the apparatus body 10B, and the user can view the screen. In a case where the display 15 is in a state illustrated in FIG. 10C, the angle of the display 15 is 180 degrees. In a state where the angle of the display 15 is "0" degrees, a state where the screen faces upward as illustrated in FIG. 10A is defined as a positive angle, and a state where the screen faces downward as illustrated in FIG. 10B is defined as a negative angle. Other configurations of the display 15 are similar to those of the display 15 of the first embodiment.

Hereinafter, a block configuration of the control unit 20 will be described with reference to FIG. 8.

Unlike the first embodiment, various signals such as a detection signal (detection result) of the eye sensor 13, a sound analog signal of the microphone 14, the state information signal (screen angle signal) of the display 15, and an angle signal (inclination information) of a gyro sensor 27 are input to the control unit 20.

The state acquisition portion 22 acquires various signals and outputs the signals to the storage portion 21 and the recognition control module 23. In the present embodiment, the state information signal is a signal of the state information related to the display 15.

Figure 11:
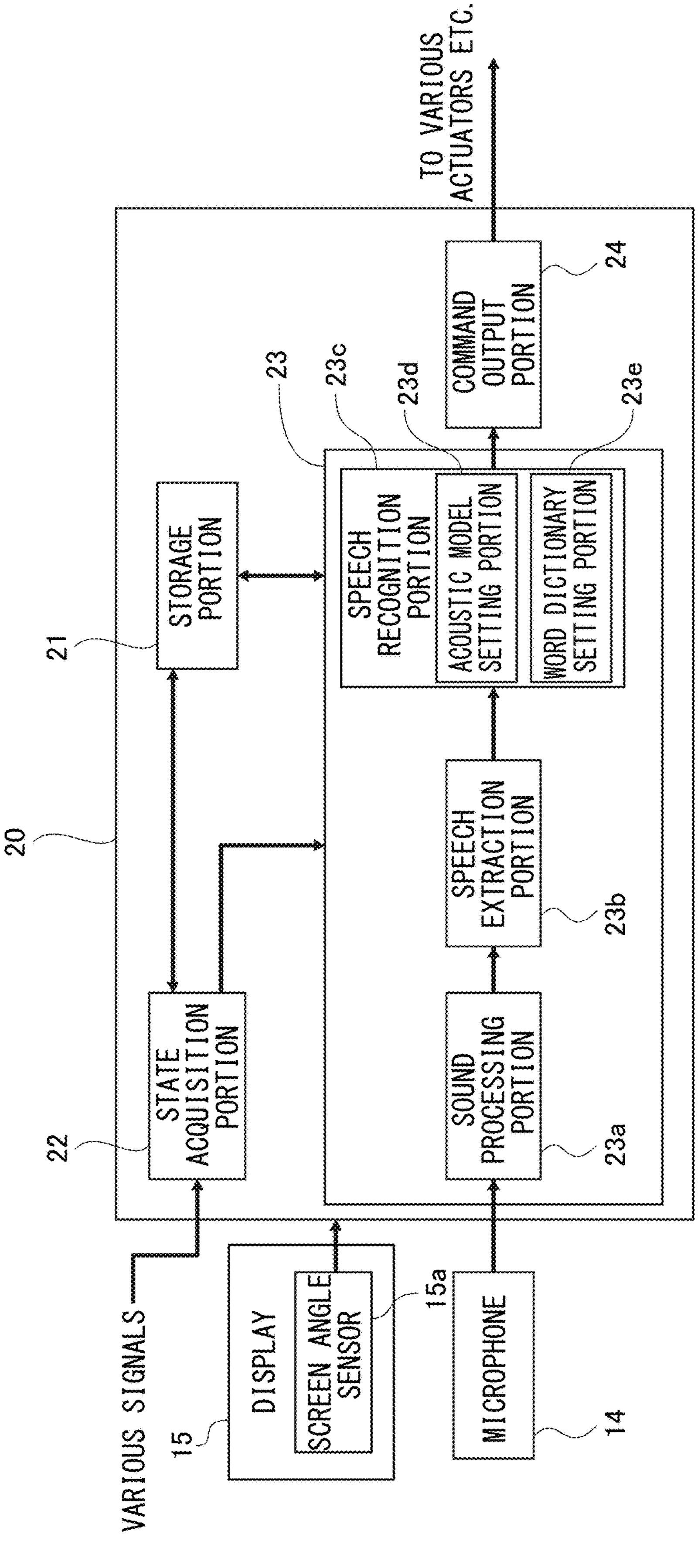
FIG. 11 is a block configuration diagram of the control unit and a recognition control module of the imaging apparatus according to the second embodiment.

Hereinafter, block configurations of the control unit 20 and the recognition control module 23 will be described with reference to FIG. 11.

The recognition control module 23 sets a control content for speech recognition based on the state information signal, and performs speech recognition (recognition control processing). The recognition control module 23 includes a sound processing portion 23*a*, a speech extraction portion 23*b*, and a speech recognition portion 23*c* (recognition portion). The speech recognition portion 23*c* includes an acoustic model setting portion 23*d* and a word dictionary setting portion 23*e*. Note that, in the example illustrated in FIG. 11, the imaging apparatus 1B of the present embodiment includes the microphones 14, the display 15, the screen angle sensor 15*a*, the control unit 20, and the recognition control module 23. The control unit 20 functions as the speech recognition apparatus. Note that, in the second embodiment, the speech extraction portion 23*b* and the speech recognition portion 23*c* will be described. The state acquisition portion 22, the sound processing portion 23*a*, and a command output portion 24 are similar to those of the first embodiment.

The speech extraction portion 23*b* sets directivity based on various signals. The speech extraction portion 23*b* extracts a speech digital signal (speech digital data or speech) from the sound digital signal input from the sound processing portion 23*a*. The speech extraction portion 23*b* outputs the extracted speech digital signal to the speech recognition portion 23*c*. The speech extraction portion 23*b* repeatedly executes the following speech extraction processing while the sound digital signal is being input from the sound processing portion 23*a*.

Here, the speech extraction portion 23*b* sets the control content for recognizing the speech digital signal based on the state information signal. In the present embodiment, the state information signal is a signal of the state information of the display 15, that is, the screen angle signal. The state information of the display 15 is changed depending on the screen angle of the display 15. For example, it is presumed that the screen of the display 15 faces the mouth of the user as illustrated in FIGS. 10A to 10C. For example, in FIG. 10A, the mouth of the user is above the screen of the display 15. In FIG. 10B, the mouth of the user is below the screen of the display 15. In FIG. 10C, the mouth of the user is in front of the screen of the display 15. As described above, when the screen angle of the display 15 is changed, the position of the mouth of the user who utters a speech is changed. That is, a change in state information of the display 15 affects recognition of a speech input to the microphone 14. Therefore, it is necessary to set the control content for speech recognition according to a change in state information of the display 15. As described above, the position of the mouth of the user is changed according to a change in screen angle. As a result, a speech is input to the microphone 14 from a specific direction, and thus, extraction of a speech in the specific direction is changed. In the present embodiment, the control content is the setting of extraction of a specific-direction speech among speeches (directivity control setting). Then, the speech extraction portion 23*b* sets extraction of the specific-direction speech from speeches input to first to fourth microphones 14*a* to 14*d* based on the state information signal. The "specific-direction speech" is a speech in the specific direction. The speech extraction portion 23*b* extracts the speech digital signal of the specific-direction speech from among speeches of first to fourth microphone sound digital signals based on the state information signal. Specifically, the speech extraction portion 23*b* applies Ambix to the speech input to each of the first to fourth microphones 14*a* to 14*d*, and extracts the specific-direction speech from the speeches in an omnidirectional space.

For example, the specific direction is set in advance for each screen angle of one degree. Therefore, the speech extraction portion 23*b* sets the extraction of the specific-direction speech based on the state information signal. As the specific direction for each screen angle of one degree, the position of the mouth of the user with respect to the screen angle is set based on an experiment, a simulation, or the like. Note that the position of the mouth of the user with respect to the screen angle is an estimated position. As a result, it is possible to extract the speech digital signal that enables speech recognition. A range of the specific-direction speech will be described with reference to FIGS. 10A and 10B as an example. Note that, although the third microphone 14*c* and the fourth microphone 14*d* are not illustrated in FIGS. 10A and 10B, sounds input to the third microphone 14*c* and the fourth microphone 14*d* are also used for extracting the speech digital signal. In the case illustrated in in FIG. 10A, the speech extraction portion 23*b* sets an upper side of the screen of the display 15 as the specific direction, and extracts a specific-direction sound of the specific direction as in a space 221 as the speech digital signal in an omnidirectional space. In the case illustrated in in FIG. 10B, the speech extraction portion 23*b* sets a lower side of the screen of the display 15 as the specific direction, and extracts a specific-direction sound of the specific direction as in a space 222 as the speech digital signal in an omnidirectional space.

Note that the speech extraction portion 23*b* executes noise removal processing for the speech digital signal of the extracted specific-direction speech as in the first embodiment.

The speech recognition portion 23*c* sets the control content for recognizing the speech digital signal input from the speech extraction portion 23*b* based on the state information signal, and recognizes the speech digital signal. The speech recognition portion 23*c* outputs the text signal to the command output portion 24. The speech recognition portion 23*c* repeatedly executes the following speech recognition processing (recognition processing) while the speech digital signal from the speech extraction portion 23*b* and the state information signal are being input. Hereinafter, the acoustic model setting portion 23*d* and the word dictionary setting portion 23*e* will be described.

First, the acoustic model setting portion 23*d* sets the control content for recognizing the speech digital signal input from the speech extraction portion 23*b* based on the state information signal. In the present embodiment, the state information signal is the screen angle signal. Taking the above screen angle as an example, since the speech is input to the microphone 14 from the specific direction when the screen angle is changed, the speech may collide with the display 15. Then, since a frequency characteristic or the like of the speech is changed due to a diffraction phenomenon, it is necessary to change an acoustic model. In addition, since there is a microphone 14 to which the speech is difficult to input due to the screen angle, it is necessary to change the acoustic model. Note that, since the position of the display 15 is also changed in addition to the screen angle, the screen angle and the position of the display 15 affect the frequency characteristic or the like of the speech. Therefore, it is necessary to set the control content for speech recognition according to a change in the screen angle of the display 15. In the present embodiment, the control content is the setting of the acoustic model. Then, the acoustic model setting portion 23*d* sets the acoustic model based on the state information signal.

For example, the acoustic model is stored in advance for each screen angle of one degree. Therefore, the acoustic model setting portion 23*d* selects an acoustic model suitable for speech recognition from a plurality of acoustic models stored in the storage portion 21 based on the state information signal. Then, the acoustic model setting portion 23*d* reads the selected acoustic model from the storage portion 21 and sets the acoustic model as an acoustic model for speech recognition. The acoustic model for each screen angle of one degree is created by learning features of teaching data of unspecified speeches acquired from a large number of speakers in advance based on experiments, simulations, or the like. The setting of the acoustic model will be described using FIGS. 10A and 10B as an example. In the case illustrated in FIG. 10A, a speech input to the first microphone 14*a* is a speech for which the diffraction phenomenon has occurred by the display 15, and a speech partially blocked by the display 15 is input. The speech partially blocked by the display 15 indicates that it is difficult for a speech to be input. Therefore, in FIG. 10A, it is necessary to use a different acoustic model from that in the case where the display 15 is in the housed state (see FIG. 1). In the case illustrated in FIG. 10B, speeches input to the second microphone 14*b* and the third microphone 14*c* are speeches for which the diffraction phenomenon has occurred and are difficult to be input similarly to the case of FIG. 10A. Therefore, in FIG. 10B, it is also necessary to use a different acoustic model from that in the case where the display 15 is in the housed state (see FIG. 1). Note that, since the state of the speech input through the microphone 14 is different between FIG. 10A and FIG. 10B as described above, the different acoustic models are used.

Next, the speech recognition portion 23*c* converts the speech digital signal into "phonemes" in a speech recognition engine. The speech recognition portion 23*c* lists word candidates by linking an arrangement order of the phonemes to a word dictionary (pronunciation dictionary) stored in advance. The word dictionary setting portion 23*e* selects a word suitable for speech recognition from the words in the word dictionary stored in the storage portion 21 based on various signals. Then, the word dictionary setting portion 23*e* reads the word selected from the storage portion 21 and sets the word as a word in the word dictionary for speech recognition. Next, the speech recognition portion 23*c* lists sentence candidates that are to be correct sentences from the word candidates by using a language model.

Next, the actions and effects of the second embodiment will be described.

First, the actions and effects of the speech recognition control of the imaging apparatus 1B will be described. In the state acquisition portion 22, when various signals are input, the various signals are acquired by the state acquisition portion 22 (acquisition processing). In the sound processing portion 23*a*, when a sound is input to the microphone 14, at the same time as the acquisition processing portion, or before or after the acquisition processing portion, the sound processing portion 23*a* converts the sound analog signal into the sound digital signal (sound processing). Next, in the speech extraction portion 23*b*, when the various signals, the sound digital signal, and the state information signal are input, the speech extraction portion 23*b* sets the directivity based on the various signals (speech extraction processing). Thereafter, the speech extraction portion 23*b* sets the extraction of the specific-direction speech based on the state information signal (speech extraction processing and specific-direction speech extraction setting processing). Subsequently, the speech digital signal of the specific-direction speech is extracted by the speech extraction portion 23*b* (speech extraction processing). Next, the speech extraction portion 23*b* executes noise removal processing for the extracted speech digital signal (speech extraction processing).

Next, in the speech recognition portion 23*c*, when the various signals and the speech digital signal are input, the acoustic model setting portion 23*d* sets the acoustic model based on the state information signal (speech recognition processing and acoustic model setting processing). Thereafter, the word dictionary setting portion 23*e* sets the word in the word dictionary (speech recognition processing and word setting processing). Subsequently, a sentence or a word is recognized by the speech recognition portion 23*c* (speech recognition processing). Next, in the command output portion 24, when the text signal as the recognition result is input, the operation signal is output according to the text signal by the command output portion 24 (command output processing). Then, for example, various actuators and the like are operated according to the input operation signal. In this manner, a speech uttered by the user can be recognized, and the operation signal can be output according to the recognition result. As described above, the recognition control module 23 executes the processing of setting a control content for speech recognition based on the state information signal, and performing speech recognition (recognition control processing).

Next, the actions and effects of the imaging apparatus 1B will be described.

In the present embodiment, the speech is input from the microphone 14 provided in the imaging apparatus 1B. Four or more microphones 14 (the first to fourth microphones 14*a* to 14*d*) are provided in the imaging apparatus 1B. The movable portion is the display 15 whose screen angle is changeable. The state acquisition portion 22 acquires the screen angle signal as the state information signal. The recognition control module 23 (the speech extraction portion 23*b*) sets the extraction of the specific-direction speech from the speeches input to each of the first to fourth microphones 14*a* to 14*d* based on the state information signal (screen angle signal). The recognition control module 23 (the speech recognition portion 23*c*) recognizes the specific-direction speech. That is, the specific-direction speech is clearer than a speech simply extracted without considering the screen angle. Further, the speech digital signal is extracted from sounds in an omnidirectional space. Therefore, the accuracy of speech recognition can be improved by setting the extraction of the specific-direction speech (specific-direction speech extraction setting action).

In the present embodiment, the recognition control module 23 (the speech recognition portion 23*c* and the acoustic model setting portion 23*d*) sets the acoustic model that converts a speech into phonemes based on the state information signal (screen angle signal) acquired by the state acquisition portion 22. That is, the setting of the acoustic model improves the accuracy in converting a speech into phonemes. Therefore, erroneous speech recognition is suppressed by setting the acoustic model. Therefore, the accuracy of speech recognition can be improved by setting the acoustic model (acoustic model setting action).

Note that, in the present embodiment, the recognition accuracy improvement action and the imaging apparatus operation action are achieved similarly to the first embodiment.

Third Embodiment

Figure 12:
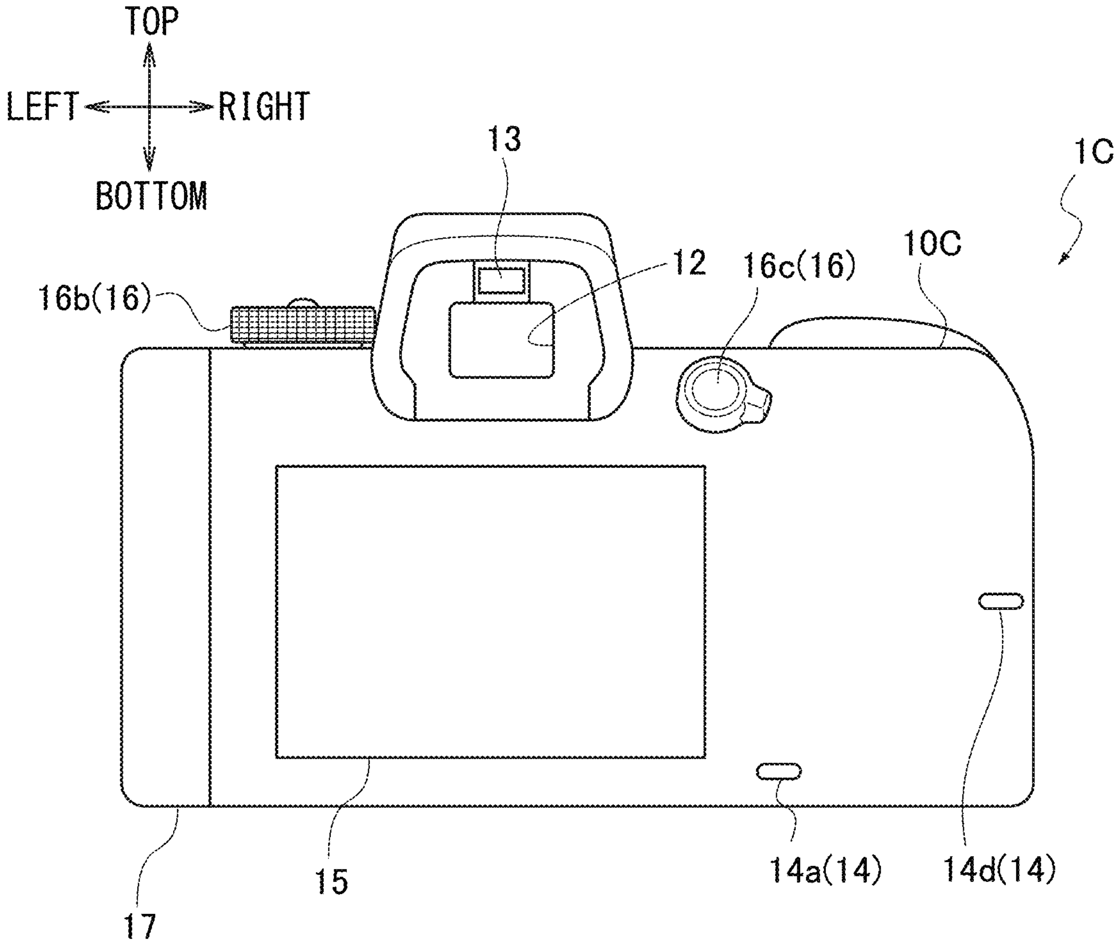
FIG. 12 is a rear view of an imaging apparatus including a speech recognition apparatus according to a third embodiment.
Figure 13:
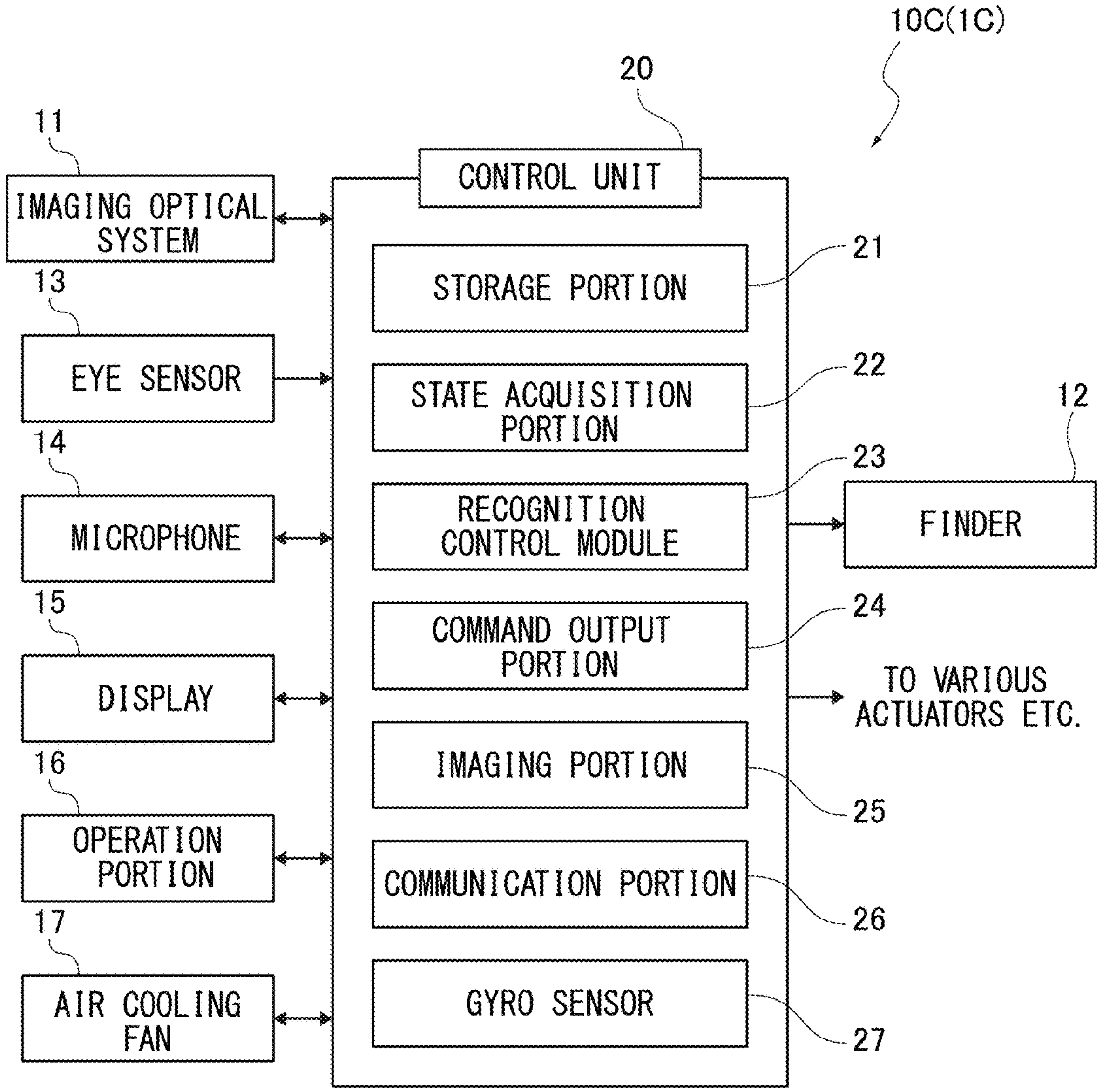
FIG. 13 is a block configuration diagram of a control unit of the imaging apparatus according to the third embodiment.
Figure 14:
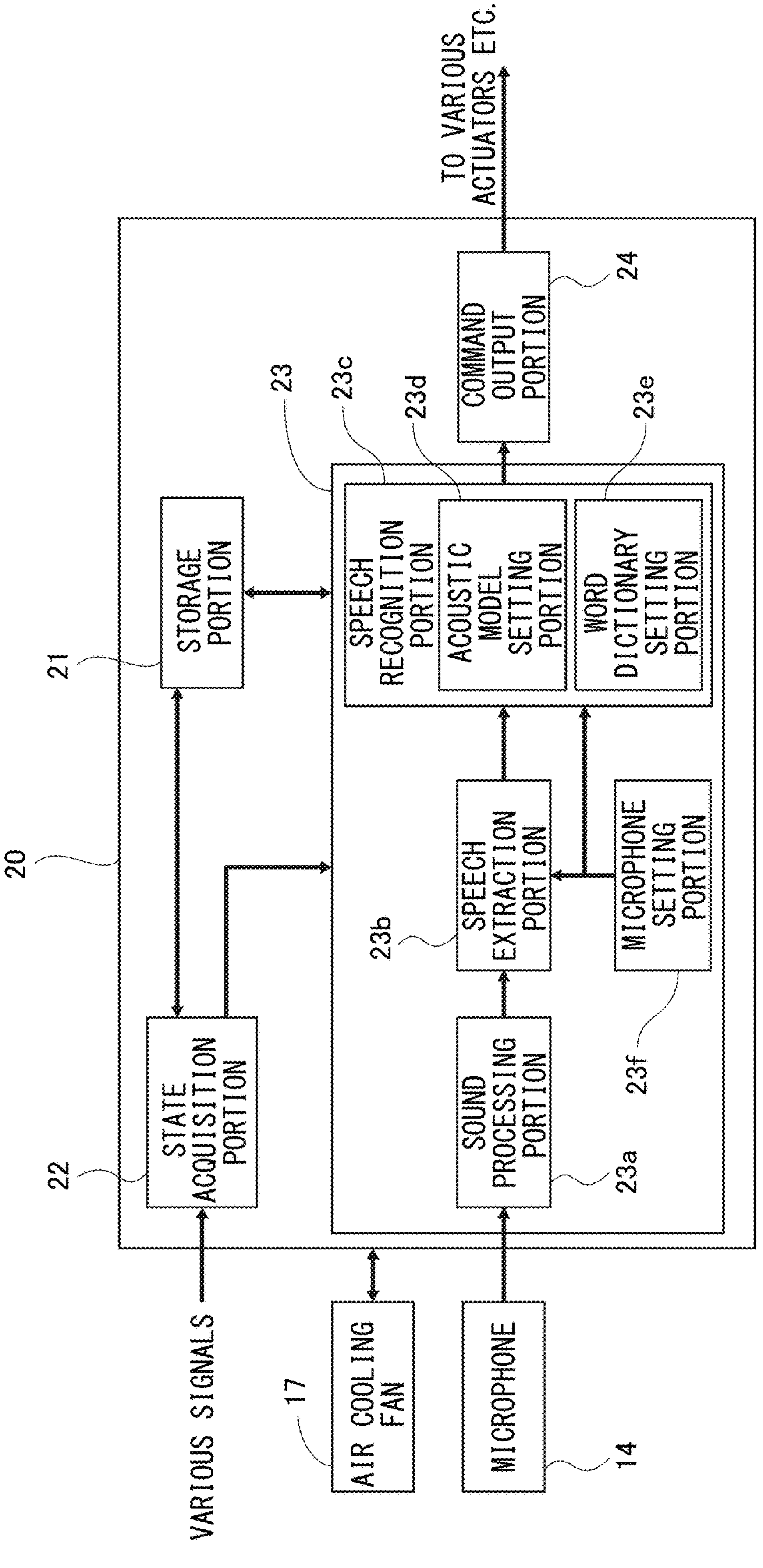
FIG. 14 is a block configuration diagram of the control unit and a recognition control module of the imaging apparatus according to the third embodiment.

Next, an imaging apparatus 1C according to a third embodiment will be described with reference to FIGS. 12 to 14. A description of the same configuration as that of the first embodiment will be omitted or simplified.

Similarly to the first embodiment, an apparatus body 10C (body and housing) of the imaging apparatus 1C includes an imaging optical system 11 (image forming optical system), a finder 12, an eye sensor 13, microphones 14 (input portions and built-in microphones), and a display 15 (display) (see FIGS. 1 to 3, 12, and 13). The apparatus body 10C further includes an air-cooling fan 17 (movable portion). A grip portion 100 is integrally formed on the right side of the apparatus body 10C. The apparatus body 10C further includes a control unit 20 and various actuators and the like (not illustrated).

The air-cooling fan 17 is a fan that cools the imaging apparatus 1C. As illustrated in FIG. 12, for example, the air-cooling fan 17 is disposed on the left side of the apparatus body 10C, and is provided integrally with the apparatus body 10C. An intake port (not illustrated) of the air-cooling fan 17 is provided on a lower side of a left side surface of the air-cooling fan 17. An exhaust port (not illustrated) of the air-cooling fan 17 is provided at the left side surface of the air-cooling fan 17 and above the intake port. Note that the air-cooling fan 17 may be provided separately from the apparatus body 10C as a connected device and connected to the imaging apparatus 1C.

Hereinafter, a block configuration of the control unit 20 will be described with reference to FIG. 13.

The control unit 20 controls the air-cooling fan 17 in addition to the configuration of the first embodiment. The control unit 20 controls a fan drive amount of the air-cooling fan 17, that is, a fan rotation speed, based on, for example, an apparatus temperature of an apparatus temperature sensor (not illustrated). The rotation speed of the air-cooling fan 17 with respect to the apparatus temperature is set in advance based on an experiment, a simulation, or the like.

A storage portion 21 stores a fan distance between each of the intake port and the exhaust port of the air-cooling fan 17 and each of the first to fourth microphones 14*a* to 14*d*. Among the four microphones 14, the second microphone 14*b* is positioned closest to both the intake port and the exhaust port (the air-cooling fan 17). Among the four microphones 14, the fourth microphone 14*d* is positioned farthest from both the intake port and the exhaust port (the air-cooling fan 17). The storage portion 21 stores the rotation speed of the air-cooling fan 17 with respect to the apparatus temperature.

The storage portion 21 stores state information of each of the first to fourth microphones 14*a* to 14*d*. The state information of the microphone 14 is product information such as a model number, a type, a frequency characteristic, or a response characteristic.

The state acquisition portion 22 acquires various signals and outputs the signals to the storage portion 21 and the recognition control module 23. In the present embodiment, a state information signal is a signal of state information related to the air-cooling fan 17 and a signal of the state information related to the microphone 14. The state information of the air-cooling fan 17 includes whether or not the air-cooling fan 17 is driven (for example, the fan rotation speed or driving information of the air-cooling fan 17) and the fan distance. Information indicating whether or not the air-cooling fan 17 is driven is acquired from the control unit 20.

Hereinafter, block configurations of the control unit 20 and the recognition control module 23 will be described with reference to FIG. 14.

The recognition control module 23 sets a control content for speech recognition based on the state information signal, and performs speech recognition (recognition control processing). The recognition control module 23 includes a sound processing portion 23*a*, a speech extraction portion 23*b*, a speech recognition portion 23*c* (recognition portion), and a microphone setting portion 23*f*. The speech recognition portion 23*c* includes an acoustic model setting portion 23*d* and a word dictionary setting portion 23*e*. Note that, in the example illustrated in FIG. 14, the imaging apparatus 1C of the present embodiment includes the microphones 14, the air-cooling fan 17, the control unit 20, and the recognition control module 23. The control unit 20 functions as the speech recognition apparatus. A program for executing processing in each of the portions 22, 23*a* to 23*f*, and 24 is stored as the control program in the storage portion 21. The control unit 20 reads and executes the program in the RAM to execute processing in each of the portions 22, 23*a* to 23*f*, and 24. Note that, in the third embodiment, the microphone setting portion 23*f*, the speech extraction portion 23*b*, and the speech recognition portion 23*c* will be described. The state acquisition portion 22, the sound processing portion 23*a*, and a command output portion 24 are similar to those of the first embodiment.

The microphone setting portion 23*f* sets one microphone to be used for speech recognition among the first to fourth microphones 14*a* to 14*d* based on various signals. The microphone setting portion 23*f* repeatedly executes the following microphone setting processing while various signals are being input.

Here, the microphone setting portion 23*f* sets the control content for recognizing a speech digital signal based on the state information signal. In the present embodiment, the state information signal is a signal of the state information of the air-cooling fan 17. When the air-cooling fan 17 is driven, noise due to fan rotation is mixed in the microphone 14. The amount of noise may be relatively large in a case where the speech digital signal is extracted similarly to the first embodiment since the closer the distance to the air-cooling fan 17, which is a noise source, the larger the amount of noise entering into the microphone 14. Therefore, when the air-cooling fan 17 is driven, one microphone to be used for speech recognition among the first to fourth microphones 14*a* to 14*d* is set. That is, a change in state information of the air-cooling fan 17 affects recognition of a speech input to the microphone 14. Therefore, it is necessary to set the control content for speech recognition according to a change in state information of the air-cooling fan 17. As described above, when the air-cooling fan 17 is driven, one microphone to be used for speech recognition among the first to fourth microphones 14*a* to 14*d* is set.

In the present embodiment, the control content is the setting of the microphone 14. Then, the microphone setting portion 23*f* sets one microphone disposed at a position farthest from the air-cooling fan 17, for speech recognition based on the state information signal. For example, in the present embodiment, when the air-cooling fan 17 is driven, the microphone setting portion 23*f* sets the fourth microphone 14*d* for speech recognition since the fourth microphone 14*d* is disposed at the position farthest from the air-cooling fan 17. The microphone setting portion 23*f* outputs, as a microphone information signal (state information signal), information regarding the one microphone set for speech recognition to the speech extraction portion 23*b* and the speech recognition portion 23*c*. When the air-cooling fan 17 is not driven, the microphone setting portion 23*f* does not set one of the first to fourth microphones 14*a* to 14*d* for speech recognition. Even in a case where the setting of a microphone for speech recognition is not performed, the microphone setting portion 23*f* outputs information indicating that the setting is not performed to the speech extraction portion 23*b* and the speech recognition portion 23*c* as the microphone information signal.

The speech extraction portion 23*b* sets directivity based on various signals. The speech extraction portion 23*b* extracts the speech digital signal (speech digital data or speech) based on a sound digital signal input from the sound processing portion 23*a* and the microphone information signal input from the microphone setting portion 23*f*. The speech extraction portion 23*b* outputs the extracted speech digital signal to the speech recognition portion 23*c*. The speech extraction portion 23*b* repeatedly executes the following speech extraction processing while the sound digital signal and the microphone information signal are being input.

In a case where the microphone information signal is the "information not being set", the speech extraction portion 23*b* extracts the speech digital signal from the sound digital signal as in the first embodiment. In a case where the microphone information signal is the "information regarding one microphone set for speech recognition", the speech extraction portion 23*b* extracts a fourth microphone sound digital signal as the speech digital signal. Note that the speech extraction portion 23*b* executes noise removal processing for the extracted speech digital signal as in the first embodiment.

The speech recognition portion 23*c* sets the control content for recognizing the speech digital signal input from the speech extraction portion 23*b* based on the state information signal, and recognizes the speech digital signal. The speech recognition portion 23*c* recognizes the speech digital signal input from the speech extraction portion 23*b* based on the microphone information signal input from the microphone setting portion 23*f*. The speech recognition portion 23*c* outputs the text signal to the command output portion 24. The speech recognition portion 23*c* repeatedly executes the following speech recognition processing (recognition processing) while the state information signal, the microphone information signal, and the speech digital signal are being input. Hereinafter, the acoustic model setting portion 23*d* and the word dictionary setting portion 23*e* will be described.

First, the acoustic model setting portion 23*d* sets the control content for recognizing the speech digital signal input from the speech extraction portion 23*b* based on the state information signal. In the present embodiment, the state information signal is the microphone information signal and the state information signal of the microphone 14. In the case where the microphone information signal is the "information not being set", the acoustic model setting portion 23*d* sets an acoustic model as in the first embodiment. In the case where the microphone information signal is the "information regarding one microphone set for speech recognition", the acoustic model setting portion 23*d* selects the acoustic model suitable for a characteristic of the fourth microphone 14*d* from among a plurality of acoustic models stored in the storage portion 21 based on the state information signal of the fourth microphone 14*d*. Then, the acoustic model setting portion 23*d* reads the selected acoustic model from the storage portion 21 and sets the acoustic model as an acoustic model for speech recognition.

Here, as one microphone among the microphones 14 is set for speech recognition, the frequency characteristic of the input speech is changed depending on the frequency characteristic or response characteristic of the microphone for speech recognition. That is, a change in state information of the microphone 14 (a change in microphone 14 for speech recognition) affects the recognition of a speech input to the microphone 14. Therefore, it is necessary to set the control content for speech recognition according to a change in state information of the microphone 14. In the present embodiment, the control content is the setting of the acoustic model. Then, as described above, the acoustic model setting portion 23*d* selects the acoustic model suitable for the characteristic of the fourth microphone 14*d* from among the plurality of acoustic models stored in the storage portion 21 based on the microphone information signal and the state information signal of the microphone 14.

Note that the following may be considered in the setting of the acoustic model. An air propagation path for noise due to fan rotation of the air-cooling fan 17 is changed depending on a positional relationship between the position of the air-cooling fan 17 and the position of the microphone for speech recognition. Specifically, a noise characteristic (a sound pressure or frequency characteristic depending on the rotation speed) due to fan rotation varies depending on the fan distance between the position of the air-cooling fan 17 and the position of the microphone for speech recognition. That is, the fan distance between the position of the air-cooling fan 17 and the position of the microphone for speech recognition affects the recognition of a speech input to the microphone 14. Therefore, it is necessary to set the control content for speech recognition according to a change in the state information of the microphone 14 and the state information of the air-cooling fan 17. Then, the acoustic model setting portion 23*d* selects the acoustic model suitable for the characteristic of the fourth microphone 14*d* from among the plurality of acoustic models stored in the storage portion 21 based on the microphone information signal, the state information signal of the microphone 14, the state information of the air-cooling fan 17, and the noise characteristic. The acoustic model with the noise characteristic taken into consideration is created by learning features of teaching data of unspecified speeches acquired from a large number of speakers in advance based on experiments, simulations, or the like.

Next, the speech recognition portion 23*c* converts the speech digital signal into "phonemes" in a speech recognition engine. The speech recognition portion 23*c* lists word candidates by linking an arrangement order of the phonemes to a word dictionary (pronunciation dictionary) stored in advance. The word dictionary setting portion 23*e* selects a word suitable for speech recognition from the words in the word dictionary stored in the storage portion 21 based on various signals. Then, the word dictionary setting portion 23*e* reads the selected word from the storage portion 21 and sets the word as a word in the word dictionary for speech recognition. Next, the speech recognition portion 23*c* lists sentence candidates that are to be correct sentences from the word candidates by using a language model.

Next, the speech recognition and the air-cooling fan will be described.

In recent years, a temperature in a digital camera tends to increase more than before due to an increase in voltage caused by an increase in size of an imaging element, execution of artificial intelligence processing in a digital camera, and the like. Therefore, an air-cooling fan may be integrally provided in the digital camera. Furthermore, even in a case where the digital camera is integrally provided with the air-cooling fan, the air-cooling fan may be replaced with a larger air-cooling fan than before. Furthermore, it has been known that the temperature inside the digital camera increases due to long-time exposure of the digital camera. Therefore, the air-cooling fan may be separately provided as a connected device for the digital camera. As described above, the number of situations where the air-cooling fan is provided in the digital camera is increasing, and the air-cooling fan may be increased in size.

Therefore, the applicant has focused on an influence of the air-cooling fan at the time of speech recognition.

Next, the actions and effects of the third embodiment will be described.

First, the actions and effects of the speech recognition control of the imaging apparatus 1C will be described. In the state acquisition portion 22, when various signals are input, the various signals are acquired by the state acquisition portion 22 (acquisition processing). In the sound processing portion 23*a*, when a sound is input to the microphone 14, at the same time as the acquisition processing portion, or before or after the acquisition processing portion, the sound processing portion 23*a* converts the sound analog signal into the sound digital signal (sound processing). Next, in the microphone setting portion 23*f*, when various signals are input, the microphone setting portion 23*f* sets the microphone 14 for speech recognition based on the state information signal (microphone setting processing). Next, in the speech extraction portion 23*b*, when the various signals, the sound digital signal, and the microphone information signal are input, the speech extraction portion 23*b* sets the directivity based on the various signals (speech extraction processing). Thereafter, the speech extraction portion 23*b* extracts the speech digital signal from the sound digital signal based on the microphone information signal as in the first embodiment (speech extraction processing). Alternatively, the speech extraction portion 23*b* extracts the fourth microphone sound digital signal as the speech digital signal based on the microphone information signal (speech extraction processing). Next, the speech extraction portion 23*b* executes noise removal processing for the extracted speech digital signal (speech extraction processing).

Next, in the speech recognition portion 23*c*, when the various signals are input, the acoustic model setting portion 23*d* sets the acoustic model based on the microphone information signal and the state information signal (speech recognition processing and acoustic model setting processing). Thereafter, the word dictionary setting portion 23*e* sets the word in the word dictionary (speech recognition processing and word setting processing). Subsequently, a sentence or a word is recognized by the speech recognition portion 23*c* (speech recognition processing). Next, in the command output portion 24, when the text signal as the recognition result is input, the operation signal is output according to the text signal from the command output portion 24 (command output processing). Then, for example, various actuators and the like are operated according to the input operation signal. In this manner, a speech uttered by the user can be recognized, and the operation signal can be output according to the recognition result. As described above, the recognition control module 23 executes the processing of setting a control content for speech recognition based on the state information signal, and performing speech recognition (recognition control processing).

Next, the actions and effects of the imaging apparatus 1C will be described.

In the present embodiment, the speech is input from the microphone 14 provided in the imaging apparatus 1C. A plurality of microphones 14 (the first to fourth microphones 14*a* to 14*d*) are provided in the imaging apparatus 1C. The movable portion or the connected device is the air-cooling fan 17 that cools the imaging apparatus 1C. The state acquisition portion 22 acquires the state information signal of the air-cooling fan 17. The recognition control module 23 (microphone setting portion 23*f*) sets one microphone to be used for speech recognition among the first to fourth microphones 14*a* to 14*d* based on the state information signal of the air-cooling fan 17 acquired by the state acquisition portion 22. In the present embodiment, the recognition control module 23 (microphone setting portion 23*f*) sets the fourth microphone 14*d* disposed at a position farthest from the air-cooling fan 17 for speech recognition based on the state information signal of the air-cooling fan 17 acquired by the state acquisition portion 22. That is, when the air-cooling fan 17 is driven, the amount of mixed noise may be relatively large, and thus the microphone setting portion 23*f* sets the fourth microphone 14*d* disposed at a position farthest from the air-cooling fan 17 for speech recognition. The fourth microphone sound digital signal extracted as the speech digital signal is clearer with less noise than the speech digital signal extracted by the directivity control as in the first embodiment. Therefore, the accuracy of speech recognition can be improved by setting the microphone 14 (a speech recognition microphone setting action using the air-cooling fan).

In the present embodiment, the recognition control module 23 (the speech recognition portion 23*c* and the acoustic model setting portion 23*d*) sets the acoustic model that converts a speech into phonemes based on the state information signal (the microphone information signal and the state information signal of the microphone 14) acquired by the state acquisition portion 22. That is, the setting of the acoustic model improves the accuracy in converting a speech into phonemes. Therefore, erroneous speech recognition is suppressed by setting the acoustic model. Therefore, the accuracy of speech recognition can be improved by setting the acoustic model (acoustic model setting action).

Note that, in the present embodiment, the recognition accuracy improvement action and the imaging apparatus operation action are achieved similarly to the first embodiment.

Figure 15:
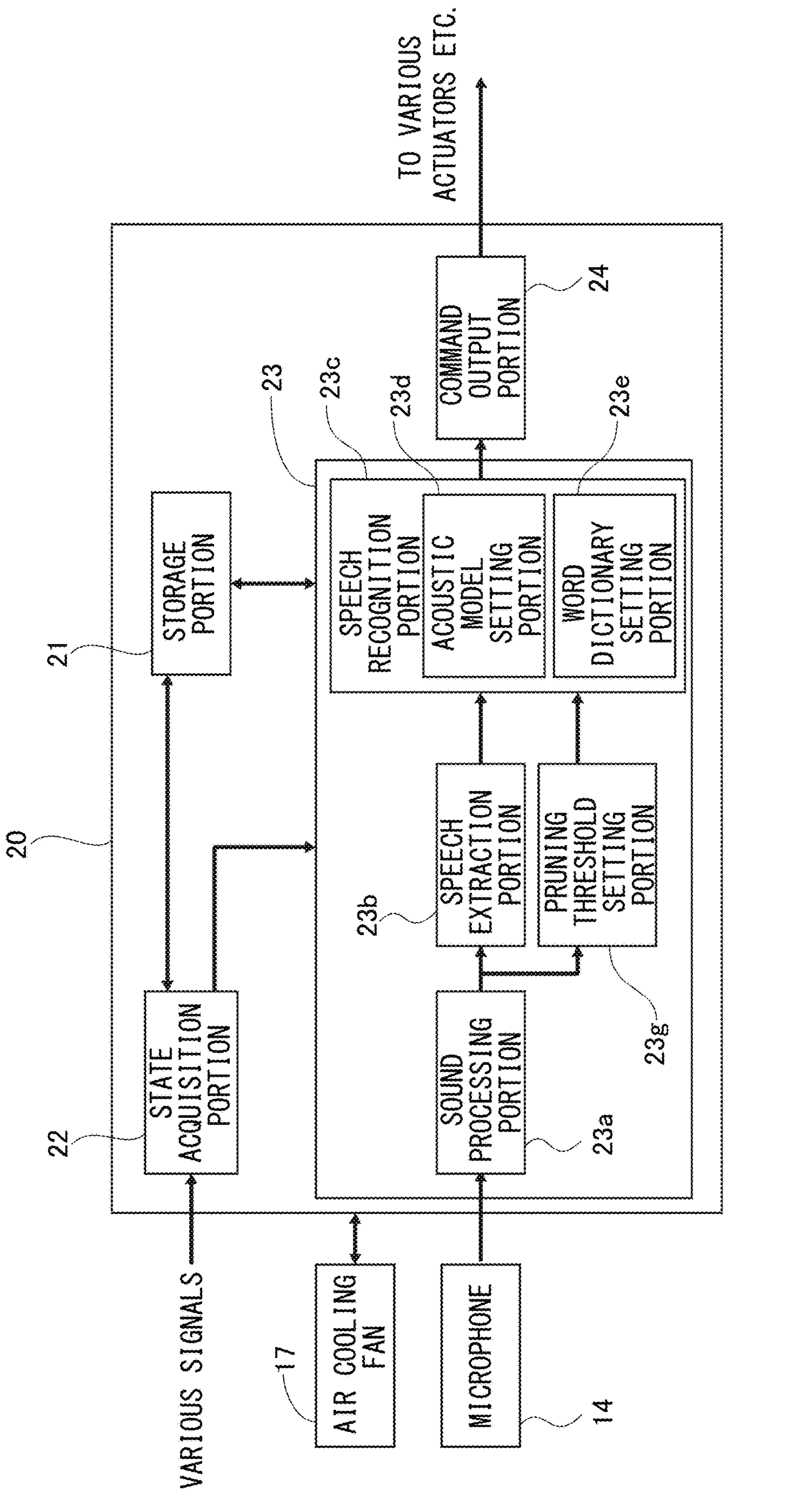
FIG. 15 is a block configuration diagram of a control unit and a recognition control module of an imaging apparatus according to Modified Example 3-1 of the third embodiment.

Next, another form (Modified Example 3-1) of the third embodiment will be described with reference to FIG. 15. A description of the same configuration as that of the third embodiment will be omitted or simplified. Note that, in the present modification, the microphone setting portion 23*f* is not provided.

Hereinafter, block configurations of the control unit 20 and the recognition control module 23 will be described with reference to FIG. 15.

The recognition control module 23 sets a control content for speech recognition based on the state information signal, and performs speech recognition (recognition control processing). The recognition control module 23 includes the sound processing portion 23*a*, the speech extraction portion 23*b*, the speech recognition portion 23*c* (recognition portion), and a pruning threshold setting portion 23*g*. The speech recognition portion 23*c* includes an acoustic model setting portion 23*d* and a word dictionary setting portion 23*e*. Note that, in the example illustrated in FIG. 15, the imaging apparatus 1C of the present embodiment includes the microphones 14, the air-cooling fan 17, the control unit 20, and the recognition control module 23. The control unit 20 functions as the speech recognition apparatus. A program for executing processing in each of the portions 22, 23*a* to 23*e*, 23*g*, and 24 is stored as the control program in the storage portion 21. The control unit 20 reads and executes the program in the RAM to execute processing in each of the portions 22, 23*a* to 23*e*, 23*g*, and 24. Note that, in the present modification, the state acquisition portion 22, the sound processing portion 23*a*, the speech extraction portion 23*b*, and the speech recognition portion 23*c* will be described. The command output portion 24 is similar to that of the third embodiment.

The state acquisition portion 22 acquires various signals and outputs the signals to the storage portion 21 and the recognition control module 23. In the present modification, the state information signal is a signal of state information related to the air-cooling fan 17. The state information of the air-cooling fan 17 is the fan rotation speed of the air-cooling fan 17. The fan rotation speed is acquired from the control unit 20. In other words, the fan rotation speed is directly acquired from the control unit 20 that controls the fan rotation speed.

The sound processing portion 23*a* is different from that of the third embodiment in that the sound digital signal is output to the speech extraction portion 23*b* and the pruning threshold setting portion 23*g*, and is otherwise similar to that of the third embodiment.

Similarly to the first embodiment, the speech extraction portion 23*b* estimates a position of the speech (a position of the mouth of the user) from the first to fourth microphone sound digital signals, and extracts the speech digital signal from the sound digital signal based on the position of the speech (extraction by directivity control). As a result, it is possible to extract the speech digital signal that enables speech recognition.

The pruning threshold setting portion 23*g* automatically sets a pruning threshold based on various signals. The pruning threshold setting portion 23*g* repeatedly executes the following pruning threshold setting processing while the sound digital signal and the various signals are being input from the sound processing portion 23*a*.

Here, the pruning threshold will be described. As a premise, in the speech recognition processing, hypothesis calculation is performed in the process of converting a speech into phonemes. At the time of the hypothesis calculation, pruning processing for thinning out the hypothesis processing is executed to speed up the processing. That is, the pruning threshold is a threshold for thinning out the hypothesis processing at the time of speech recognition in the speech recognition portion 23*c*. Aggressive pruning (small pruning threshold) results in faster processing, while loose pruning (large pruning threshold) results in slower processing. In addition, in a case where the pruning is too aggressive, even the correct hypothesis processing may be thinned out, and the speech recognition performance is deteriorated. In a case where the fan rotation speed is relatively low, when the pruning is loose, unnecessary hypothesis calculation is performed. Therefore, the pruning threshold is appropriately set based on the fan rotation speed.

The pruning threshold setting portion 23*g* sets the control content for recognizing the speech digital signal based on the state information signal. In the present embodiment, the state information signal is a fan rotation speed signal. As the fan rotation speed of the air-cooling fan 17 increases, the amount of noise due to the fan rotation speed mixed in the microphone 14 increases. Therefore, when the speech digital signal is extracted as in the first embodiment, the amount of mixed noise may be relatively large. Therefore, when the fan rotation speed changes, the pruning threshold is changed. In other words, the pruning threshold setting portion 23*g* sets the pruning threshold based on the fan rotation speed. That is, a change in state information of the air-cooling fan 17 affects recognition of a speech input to the microphone 14. Therefore, it is necessary to set the control content for speech recognition according to a change in state information of the air-cooling fan 17. As described above, the pruning threshold is set based on the fan rotation speed. In the present embodiment, the control content is the setting of the pruning threshold. Then, the pruning threshold setting portion 23*g* sets the pruning threshold based on the state information signal.

For example, the pruning threshold setting portion 23*g* sets the pruning threshold based on the fan rotation speed. That is, as the numerical value of the fan rotation speed increases, the pruning threshold is set to be larger by the pruning threshold setting portion 23*g* On the other hand, as the fan rotation speed decreases, the pruning threshold is set to be smaller by the pruning threshold setting portion 23*g*. Then, the pruning threshold setting portion 23*g* outputs the set pruning threshold to the speech recognition portion 23*c* as a pruning threshold signal. The pruning threshold for each fan rotation speed is set in advance based on experiments, simulations, or the like.

Note that the following may be considered for the pruning threshold. An air propagation path for noise due to fan rotation of the air-cooling fan 17 is changed depending on a positional relationship between the position of the air-cooling fan 17 and the position of the microphone for speech recognition. Specifically, a noise characteristic (a sound pressure or frequency characteristic depending on the rotation speed) due to fan rotation varies depending on the fan distance between the position of the air-cooling fan 17 and the position of the microphone for speech recognition. That is, the fan distance between the position of the air-cooling fan 17 and the position of the microphone for speech recognition affects the recognition of a speech input to the microphone 14. Therefore, it is necessary to set the control content for speech recognition according to a change of the state information of the microphone 14 and the state information of the air-cooling fan 17, and thus, the pruning threshold is changed. Here, the state information includes the fan distance. Then, the pruning threshold setting portion 23*g* sets the pruning threshold based on the state information signal of the microphone 14, the state information of the air-cooling fan 17, and the noise characteristic. The pruning threshold obtained by considering the noise characteristic together with the pruning threshold for each fan rotation speed is set in advance based on experiments, simulations, or the like.

The speech recognition portion 23*c* sets the control content for recognizing the speech digital signal input from the speech extraction portion 23*b* based on the state information signal, and recognizes the speech digital signal. The speech recognition portion 23*c* sets the pruning threshold for speech recognition based on the pruning threshold signal input from the pruning threshold setting portion 23*g*. The speech recognition portion 23*c* recognizes the speech digital signal input from the speech extraction portion 23*b* according to the set pruning threshold. The speech recognition portion 23*c* outputs the text signal to the command output portion 24. The speech recognition portion 23*c* repeatedly executes the following speech recognition processing (recognition processing) while the state information signal, the pruning threshold signal, and the speech digital signal are being input. Hereinafter, the acoustic model setting portion 23*d* and the word dictionary setting portion 23*e* will be described.

First, the acoustic model setting portion 23*d* sets the control content for recognizing the speech digital signal input from the speech extraction portion 23*b* based on the state information signal. In the present modification, the state information signal is the fan rotation speed signal. Taking the fan rotation speed as an example, the SNR and the noise level differ depending on the fan rotation speed. Therefore, when the SNR changes, it is necessary to change the acoustic model. That is, it is necessary to set the control content for speech recognition according to a change in SNR. In the present embodiment, the control content is the setting of the acoustic model. Then, the acoustic model setting portion 23*d* sets the acoustic model based on the state information signal.

For example, the acoustic model is set in advance according to the SNR based on the fan rotation speed Therefore, the acoustic model setting portion 23*d* selects an acoustic model suitable for speech recognition from a plurality of acoustic models stored in the storage portion 21 based on the state information signal. Then, the acoustic model setting portion 23*d* reads the selected acoustic model from the storage portion 21 and sets the acoustic model as an acoustic model for speech recognition. A plurality of acoustic models having different SNRs are created by learning features of teaching data of unspecified speeches acquired from a large number of speakers in a state in which SNRs are different in advance based on experiments, simulations, or the like.

Next, the speech recognition portion 23*c* converts the speech digital signal into "phonemes" in a speech recognition engine. The speech recognition portion 23*c* lists word candidates by linking an arrangement order of the phonemes to a word dictionary (pronunciation dictionary) stored in advance. The word dictionary setting portion 23*e* selects a word suitable for speech recognition from the words in the word dictionary stored in the storage portion 21 based on various signals. Then, the word dictionary setting portion 23*e* reads the selected word from the storage portion 21 and sets the word as a word in the word dictionary for speech recognition. Next, the speech recognition portion 23*c* sets the pruning threshold for speech recognition based on the pruning threshold signal. Next, the speech recognition portion 23*c* lists sentence candidates that are to be correct sentences from the word candidates by using a language model.

Next, the actions and effects of Modified Example (3-1) will be described.

First, the actions and effects of the speech recognition control of the imaging apparatus 1C of the present modification will be described. In the state acquisition portion 22, when various signals are input, the various signals are acquired by the state acquisition portion 22 (acquisition processing). In the sound processing portion 23*a*, when a sound is input to the microphone 14, at the same time as the acquisition processing portion, or before or after the acquisition processing portion, the sound processing portion 23*a* converts the sound analog signal into the sound digital signal (sound processing). Next, in the speech extraction portion 23*b*, when the various signals and the sound digital signal are input, the speech extraction portion 23*b* sets the directivity based on the various signals and extracts the speech digital signal from the sound digital signal (speech extraction processing). Next, the speech extraction portion 23*b* executes noise removal processing for the extracted speech digital signal (speech extraction processing).

Next, in the pruning threshold setting portion 23*g*, when various signals are input, the pruning threshold setting portion 23*g* sets the pruning threshold based on the state information signal (pruning threshold setting processing). Next, in the speech recognition portion 23*c*, when the various signals, the speech digital signal, and the pruning threshold signal are input, the acoustic model setting portion 23*d* sets the acoustic model based on the state information signal (speech recognition processing and acoustic model setting processing). Thereafter, the word dictionary setting portion 23*e* sets the word in the word dictionary (speech recognition processing and word setting processing). Next, the speech recognition portion 23*c* sets the pruning threshold for speech recognition based on the pruning threshold signal. Subsequently, a sentence or a word is recognized by the speech recognition portion 23*c* (speech recognition processing). Next, in the command output portion 24, when the text signal as the recognition result is input, the operation signal is output according to the text signal from the command output portion 24 (command output processing). Then, for example, various actuators and the like are operated according to the input operation signal. In this manner, a speech uttered by the user can be recognized, and the operation signal can be output according to the recognition result. As described above, the recognition control module 23 executes the processing of setting a control content for speech recognition based on the state information signal, and performing speech recognition (recognition control processing).

Next, the actions and effects of the imaging apparatus 1C of the present modification will be described.

In the present modification, the movable portion or the connected device is the air-cooling fan 17 that cools the imaging apparatus 1C. The state acquisition portion 22 acquires the state information signal of the air-cooling fan 17. The recognition control module 23 (pruning threshold setting portion 23*g*) sets the pruning threshold for thinning out the hypothesis processing at the time of speech recognition based on the state information signal of the air-cooling fan 17 acquired by the state acquisition portion 22. That is, the higher the fan rotation speed, the larger the disturbance, which is noise. For this reason, if the pruning threshold is set to be larger as the fan rotation speed increases, a correct hypothesis can be easily made at the time of speech recognition. The lower the fan rotation speed, the smaller the disturbance. Therefore, if the pruning threshold is set to be smaller as the fan rotation speed decreases, a correct hypothesis can be easily made at the time of speech recognition, so that an influence on the speech recognition performance decreases and the speed of the speech recognition processing increases. In this manner, the pruning threshold is appropriately changed based on the fan rotation speed. Therefore, the accuracy of speech recognition can be improved by setting the pruning threshold (pruning threshold setting action).

In the present modification, the recognition control module 23 (the speech recognition portion 23*c* and the acoustic model setting portion 23*d*) sets the acoustic model, that converts a speech into phonemes, based on the state information signal (fan rotation speed signal) acquired by the state acquisition portion 22. That is, the change of the acoustic model improves the accuracy in converting a speech into phonemes. Therefore, erroneous speech recognition is suppressed by setting the acoustic model. Therefore, the accuracy of speech recognition can be improved by setting the acoustic model (acoustic model setting action).

Note that, in the present modification, the recognition accuracy improvement action and the imaging apparatus operation action are achieved similarly to the first embodiment.

Fourth Embodiment

Next, an imaging apparatus 1D according to a fourth embodiment will be described with reference to FIGS. 16 to 18. A description of the same configuration as that of the first embodiment will be omitted or simplified.

Figure 17:
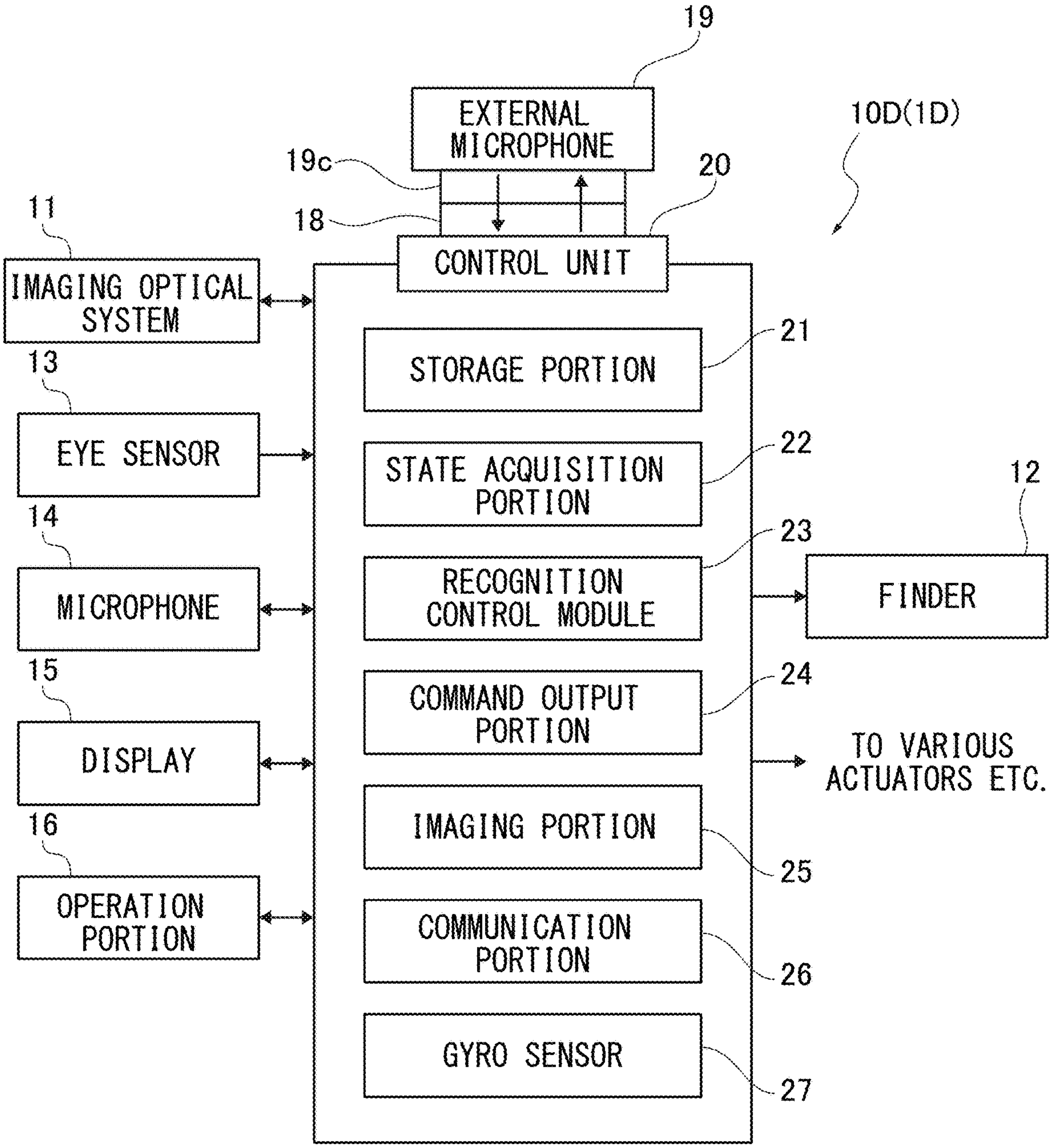
FIG. 17 is a block configuration diagram of a control unit of the imaging apparatus according to the fourth embodiment.
Figure 18:
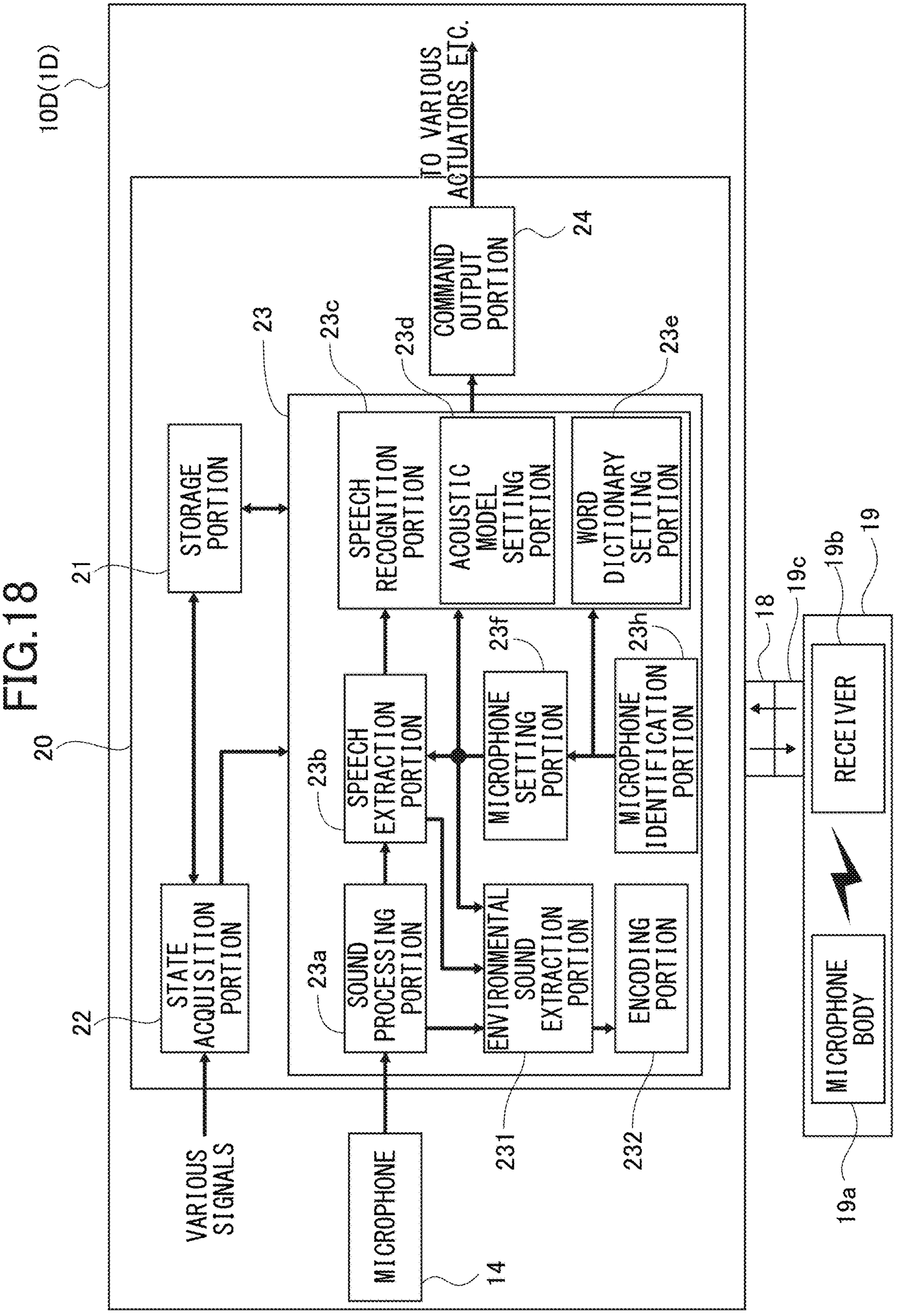
FIG. 18 is a block configuration diagram of the control unit, a recognition control module of the imaging apparatus, and an external microphone according to the fourth embodiment.

Similarly to the first embodiment, an apparatus body 10D (body and housing) of the imaging apparatus 1D includes an imaging optical system 11 (image forming optical system), a finder 12, an eye sensor 13, microphones 14 (input portions and built-in microphones), and a display 15 (display) (see FIGS. 1 to 3, and 17). Furthermore, as illustrated in FIGS. 17 and 18, the apparatus body 10D includes an apparatus-side connector 18. Furthermore, a grip portion 100 is integrally formed on the right side of the apparatus body 10D. The apparatus body 10D further includes a control unit 20 and various actuators and the like (not illustrated). Furthermore, an external microphone 19 (connected device) is separately provided for the apparatus body 10D. Note that the microphones 14 are built in the apparatus body 10D. The external microphone 19 is provided (attached) as a connected device for (to) the apparatus body 10D from the outside, and is connected to the apparatus body 10D.

The apparatus-side connector 18 includes an apparatus-side digital connector for digital communication and an apparatus-side analog connector for analog communication (not illustrated). The apparatus-side digital connector is, for example, a digital interface capable of a universal serial bus (USB) connection. The apparatus-side analog connector can be connected through a microphone jack terminal.

One of a plurality of types of external microphones 19 is connected to the apparatus body 10D. For example, the external microphone 19 includes four types such as a 2-channel stereo microphone, a gun microphone, a pin microphone, and a wireless microphone 19. The wireless microphone 19 is illustrated as an example of the external microphone 19 in FIG. 16. The 2-channel stereo microphone has two channels, left and right, and sounds from the left and right directions are input, respectively. The 2-channel stereo microphone mainly collects an environmental sound. The gun microphone has directivity in an extremely narrow direction, and a sound from a direction in which the gun microphone portion faces is input. The pin microphone is attached to a chest or the like of a person, and mainly receives a speech.

Figure 16:
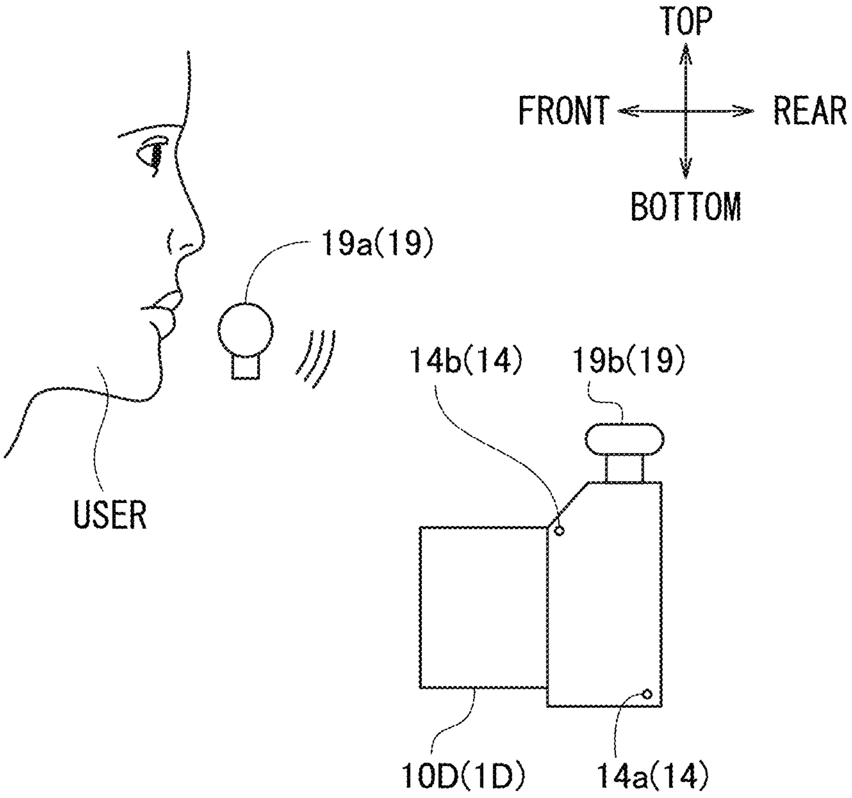
FIG. 16 is a view illustrating an example in which a wireless microphone is provided in an imaging apparatus according to a fourth embodiment.

The wireless microphone 19 includes two portions, a microphone body 19*a* and a receiver 19*b*, and mainly receives a speech (see FIG. 16). The wireless microphone 19 wirelessly transmits a sound input to the microphone body 19*a* to the receiver 19*b*. The microphone body 19*a* converts the input sound from an external sound analog signal into an external sound digital signal, and wirelessly transmits the signal to the receiver 19*b*. The receiver 19*b* receives the external sound digital signal of the microphone body 19*a*. Therefore, the microphone body 19*a* and the receiver 19*b* are disposed at distant positions as illustrated in FIG. 16. For example, the microphone body 19*a* is attached to a chest of a person or the like. The receiver 19*b* is connected to the apparatus body 10D. Note that the receiver 19*b* may convert the input external sound digital signal into the external sound analog signal.

The receiver 19*b* of the external microphone 19 includes an external-side connector 19*c*. The external-side connector 19*c* can perform digital communication or analog communication. Therefore, the external-side connector 19*c* is connected to the apparatus-side digital connector or the apparatus-side analog connector of the apparatus-side connector 18. Identification of the external microphone 19 and the setting of the microphone 14 and the external microphone 19 are described below.

Both a speech uttered by a person and an environmental sound around the person are input to the external microphone 19. The directivity or microphone sensitivity of the external microphone 19 varies depending on the type. For example, the pin microphone and the wireless microphone 19 mainly collect a speech. Therefore, the microphone sensitivity is set to a sensitivity at which a speech uttered by a person with the pin microphone or the microphone body 19*a* can be input. Adjustment due to a difference in sensitivity may be performed by a sound processing portion 23*a*, a speech extraction portion 23*b*, or the like described below. In the following description, it is assumed that the apparatus-side connector 18 and the external-side connector 19*c* are connected.

Hereinafter, a block configuration of the control unit 20 will be described with reference to FIG. 17.

Similarly to the first embodiment, various signals such as a detection signal (detection result) of the eye sensor 13 and an angle signal (inclination information) of a gyro sensor 27 are input to the control unit 20. An internal sound analog signal of the microphone 14 is input to the control unit 20. A state information signal of the external microphone 19 is input to the control unit 20 through the apparatus-side connector 18 and the external-side connector 19*c*. The state information signal of the external microphone 19 is a signal of state information of the external microphone 19. The state information of the external microphone 19 is product information such as a model number, a type, a frequency characteristic, a response characteristic, the number of poles in a case of a monaural microphone, a stereo microphone, and a microphone jack terminal, the presence or absence of a speech recognition function, and version information of the speech recognition function. Note that, in the present embodiment, the external microphone 19 does not have the speech recognition function. Further, the state information of the external microphone 19 is a communication state of analog communication or digital communication. Furthermore, the external sound analog signal from the receiver 19*b* or the external sound digital signal input to the receiver 19*b* is input to the control unit 20 (see FIG. 18). Note that the external microphone 19 is driven by a microphone driver (not illustrated) in the control unit 20.

The state acquisition portion 22 acquires various signals and outputs the signals to the storage portion 21 and the recognition control module 23. In the present embodiment, the state information signal is a signal of the state information related to the external microphone 19.

The recognition control module 23 executes processing such as the conversion of the internal sound analog signal input from the microphone 14, conversion of the external sound analog signal input from the external microphone 19, recognition of a speech uttered by the user, or/and output of a recognized text signal (recognition result). The recognition control module 23 outputs the text signal to the command output portion 24. Details of the recognition control module 23 are described below.

Hereinafter, block configurations of the control unit 20 and the recognition control module 23 will be described with reference to FIG. 18.

The recognition control module 23 sets a control content for speech recognition based on the state information signal, and performs speech recognition (recognition control processing). The recognition control module 23 includes the sound processing portion 23*a*, the speech extraction portion 23*b*, a speech recognition portion 23*c* (recognition portion), a microphone setting portion 23*f*, and a microphone identification portion 23*h*. The speech recognition portion 23*c* includes an acoustic model setting portion 23*d* and a word dictionary setting portion 23*e*. The recognition control module 23 further includes an environmental sound extraction portion 23*l* (moving image sound extraction portion) and an encoding portion 232. Note that, in the example illustrated in FIG. 18, the imaging apparatus 1D of the present embodiment includes the microphones 14, the external microphone 19, the control unit 20, and the recognition control module 23. The control unit 20 functions as the speech recognition apparatus. A program for executing processing in each of the portions 22, 23*a* to 23*f*, 23*h*, 24, 231, and 232 is stored as the control program in the storage portion 21. The control unit 20 reads and executes the program in the RAM to execute processing in each of the portions 22, 23*a* to 23*f*, 23*h*, 24, 231, and 232. Note that, in the fourth embodiment, the sound processing portion 23*a*, the speech extraction portion 23*b*, the speech recognition portion 23*c*, the environmental sound extraction portion 23*l*, and the encoding portion 232 will be described. The state acquisition portion 22 and the command output portion 24 are similar to those of the first embodiment.

Similarly to the first embodiment, the sound processing portion 23*a* executes sound processing such as the conversion of the internal sound analog signal input from the microphone 14 into an internal sound digital signal and known noise removal for the internal sound digital signal. The sound processing portion 23*a* outputs the internal sound digital signal to the speech extraction portion 23*b* and the environmental sound extraction portion 23*l*.

When the external sound analog signal is input from the external microphone 19, the sound processing portion 23*a* executes sound processing such as conversion of the external sound analog signal into the external sound digital signal and known noise removal for the external sound digital signal, similarly to the internal sound analog signal. When the external sound digital signal is input from the external microphone 19, the sound processing portion 23*a* executes sound processing such as known noise removal. The sound processing portion 23*a* outputs the external sound digital signal to the speech extraction portion 23*b* and the environmental sound extraction portion 23*l*. When the internal sound digital signal and the external sound digital signal are not particularly distinguished from each other, they are described as "sound digital signals".

The sound processing portion 23*a* repeatedly executes sound processing while a sound is being input to at least one of the microphone 14 or the external microphone 19. Note that the sound processing is separately executed for a sound input to each of the first to fourth microphones 14*a* to 14*d* and a sound input to the external microphone 19. In the following description, if no particular distinction is made among the first to fourth microphone sound digital signals, they are described as "internal sound digital signals".

The microphone identification portion 23*h* automatically identifies the external microphone 19 based on the state information signal of the external microphone 19. Here, the microphone setting portion 23*f* described below requires an identification result as to whether the external microphone 19 is a monaural microphone or a stereo microphone Therefore, the microphone identification portion 23*h* outputs a monaural signal or a stereo signal to the microphone setting portion 23*f* as an identification result signal (identification result and state information signal) of the external microphone 19. An acoustic model setting portion 23*d* described below requires a result of identifying the type of the external microphone 19. Therefore, the microphone identification portion 23*h* outputs an external microphone type identification signal (state information signal) to the speech recognition portion 23*c* as the identification result for the external microphone 19. The microphone identification portion 23*h* repeatedly executes the following microphone identification processing while the state information signal is being input from the state acquisition portion 22.

Here, a sound to be input is changed depending on the state information of the external microphone 19. For example, in a case where the external microphone 19 is a monaural microphone, the external microphone 19 is more suitable for speech recognition than the microphone 14. In a case where the external microphone 19 is a stereo microphone, the microphone 14 is more suitable for speech recognition. In this manner, a microphone suitable for speech recognition changes depending on the state information of the external microphone 19. In a case where the external microphone 19 is a monaural microphone, the microphone 14 is more suitable for moving images. In a case where the external microphone 19 is a stereo microphone, the external microphone 19 is more suitable for moving images. That is, the state information of the external microphone 19 affects speech recognition and environment sound extraction. Therefore, it is necessary to set the control content for speech recognition and environmental sound extraction based on the state information of the external microphone 19. As described above, a microphone for speech recognition and a microphone for moving images are set depending on the state information of the external microphone 19. In the present embodiment, the control content is the setting of the microphone 14 and the external microphone 19 for speech recognition and moving images. The microphone identification portion 23*h* automatically identifies the external microphone 19 based on the state information of the external microphone 19. The microphone setting portion 23*f* described below automatically sets one of the microphone 14 and the external microphone 19 for speech recognition based on the identification result signal of the external microphone 19. Furthermore, the acoustic model setting portion 23*d* sets an acoustic model based on the external microphone type identification signal.

For example, in a case where the external microphone 19 is a 2-channel stereo microphone, the microphone 14 is set for speech recognition, and the external microphone 19 is set for moving images. In a case where the external microphone 19 is a pin microphone or a wireless microphone 19, the external microphone 19 is set for speech recognition, and the microphone 14 is set for moving images. In this manner, the setting for speech recognition and moving image are changed depending on the state information of the external microphone 19.

The microphone identification portion 23*h* identifies whether the external microphone 19 is a monaural microphone or a stereo microphone. By the following method, the microphone identification portion 23*h* can automatically perform identification even without a user operation (automatic identification). In a case where the external microphone 19 is connected to the apparatus-side digital connector, the microphone identification portion 23*h* can automatically identify the external microphone 19 based on the state information signal including the monaural microphone or the stereo microphone. In a case where the external microphone 19 is connected to the apparatus-side analog connector, the microphone identification portion 23*h* can automatically identify the external microphone 19 based on the number of poles of the microphone jack terminal included in the state information signal. In a case where the number of poles is two, the microphone is a monaural microphone, and in a case where the number of poles is three or more, the microphone is a stereo microphone.

The microphone identification portion 23*h* identifies the type of the external microphone 19. The microphone identification portion 23*h* can identify the type by the following method. In the case where the external microphone 19 is connected to the apparatus-side digital connector, the microphone identification portion 23*h* can automatically identify one of the four types of external microphones 19 exemplified above (automatic identification) depending on the model number and the type included in the state information signal even without a user operation.

In the case where the external microphone 19 is connected to the apparatus-side analog connector, the microphone identification portion 23*h* partially requires a user's operation or the like in the process of identifying the type (semi-automatic). The microphone identification portion 23*h* can identify the type of the external microphone 19 by one of the following three methods. In any case, the external-side connector 19*c* is connected to the apparatus-side analog connector.

As one identification method, the microphone identification portion 23*h* identifies one of the four types by using the fact that the four types of external microphones 19 exemplified above have different characteristics of background noise. Therefore, when the external microphone 19 is connected to the apparatus-side analog connector, a notification portion such as the display 15 notifies the user that the external microphone 19 is to be placed in a quiet environment for a predetermined time. The user executes the content of the notification. Then, in a case of being placed in a quiet environment, the microphone identification portion 23*h* can automatically identify one of the four types of external microphones 19 based on a background noise level in a silent state and a frequency characteristic of background noise.

As one identification method, the microphone identification portion 23*h* identifies one of the four types by using the fact that the response characteristics (sensitivities or frequency characteristics) of the four types of external microphones 19 described above as an example are different. The response characteristic is a response characteristic when a sound is emitted from a speaker (not illustrated) provided in the apparatus body 10D. Therefore, when the external microphone 19 is connected to the apparatus-side analog connector, the notification portion such as the display 15 notifies the user that the relative positions of the external microphone 19 and the imaging apparatus 1D are to be the same. The user executes the content of the notification. When the relative positions are confirmed to be the same, the speaker (not illustrated) of the apparatus body 10D automatically emits a sound. As a result, the microphone identification portion 23*h* can automatically identify one of the four types of external microphones 19 based on the difference in response characteristics.

As one identification method, the microphone identification portion 23*h* identifies one of the four types by using the fact that the response characteristics of the four types of external microphones 19 described above as an example are different. The response characteristic is a time average characteristic in a predetermined environmental sound or a speech of the same speaker. Therefore, when the external microphone 19 is connected to the apparatus-side analog connector, the notification portion such as the display 15 notifies the user of the following content. For example, the content indicates that the external microphone 19 is to be placed under an environment of a predetermined environmental sound. Alternatively, the content indicates that a sound of a predetermined phrase is to be uttered by the user. Then, the user executes the content of the notification. When the external microphone 19 is placed under an environment of a predetermined environmental sound or when a speech uttered by the user is confirmed to be input, the microphone identification portion 23*h* can automatically identify one of the four types of external microphones 19 based on a difference in response characteristic.

The microphone setting portion 23*f* automatically sets one of the microphone 14 and the external microphone 19 for speech recognition based on the identification result signal obtained by the microphone identification portion 23*h*. Further, the microphone setting portion 23*f* automatically sets the other one of the microphone 14 and the external microphone 19 for moving images. Alternatively, the microphone setting portion 23*f* invalidates an input from the microphone 14 based on the identification result signal obtained by the microphone identification portion 23*h*, and automatically sets the external microphone 19 for speech recognition and for moving images. The microphone setting portion 23*f* repeatedly executes the following microphone setting processing while the identification result signal is being input.

In a case where the identification result signal is a monaural signal, the microphone setting portion 23*f* automatically sets the external microphone 19 for speech recognition and automatically sets the microphone 14 for moving images. In this case, the microphone setting portion 23*f* outputs information obtained by setting the external microphone 19 for speech recognition to the speech extraction portion 23*b* and the speech recognition portion 23*c* as a speech recognition information signal (state information signal). In this case, the microphone setting portion 23*f* outputs information indicating that the microphone 14 is set for moving images to the environmental sound extraction portion 23*l* as a moving image information signal.

Conversely, in a case where the identification result signal is a stereo signal, the microphone setting portion 23*f* automatically sets the microphone 14 for speech recognition and automatically sets the external microphone 19 for moving images. In this case, the microphone setting portion 23*f* outputs information indicating that the microphone 14 is set for speech recognition to the speech extraction portion 23*b* and the speech recognition portion 23*c* as a speech recognition information signal. In this case, the microphone setting portion 23*f* outputs information indicating that the external microphone 19 is set for moving images to the environmental sound extraction portion 23*l* as the moving image information signal.

Note that, in a case where the identification result signal is a monaural signal or a stereo signal, the microphone setting portion 23*f* may invalidate an input from the microphone 14 and automatically set the external microphone 19 for speech recognition and for moving images. The microphone setting portion 23*f* outputs the following information signal (state information signal) to the speech extraction portion 23*b*, the speech recognition portion 23*c*, and the environmental sound extraction portion 23*l*. The information signal is a dual-use information signal indicating that the external microphone 19 is set for speech recognition and for moving images.

The speech extraction portion 23*b* sets directivity based on various signals. The speech extraction portion 23*b* extracts a speech digital signal (speech digital data or speech) based on the sound digital signal input from the sound processing portion 23*a* and the speech recognition information signal or the dual-use information signal input from the microphone setting portion 23*f*. The speech extraction portion 23*b* outputs the extracted speech digital signal to the speech recognition portion 23*c* and the environmental sound extraction portion 23*l*. The speech extraction portion 23*b* repeatedly executes the following speech extraction processing while the sound digital signal and the speech recognition information signal or the dual-use information signal are input.

In a case where the speech recognition information signal indicates the microphone 14, the speech extraction portion 23*b* extracts the speech digital signal from the internal sound digital signal as in the first embodiment. In a case where the speech recognition information signal indicates the external microphone 19 or in a case where the dual-use information signal is input, the speech extraction portion 23*b* extracts the external sound digital signal as the speech digital signal. Note that, when extracting the speech digital signal, the speech extraction portion 23*b* extracts time information of a portion from which the speech digital signal has been extracted as a time signal. Further, the speech extraction portion 23*b* executes noise removal processing for the extracted speech digital signal as in the first embodiment. The speech extraction portion 23*b* outputs the time signal to the environmental sound extraction portion 23*l* together with the speech digital signal.

The speech recognition portion 23*c* sets the control content for recognizing the speech digital signal input from the speech extraction portion 23*b* based on the state information signal, and recognizes the speech digital signal. The speech recognition portion 23*c* recognizes the speech digital signal input from the speech extraction portion 23*b* based on the state information signal, the external microphone type identification signal input from the microphone identification portion 23*h*, and the speech recognition information signal or the dual-use information signal input from the microphone setting portion 23*f*. The speech recognition portion 23*c* outputs the text signal to the command output portion 24. The speech recognition portion 23*c* repeatedly executes the following speech recognition processing (recognition processing) while the external microphone type identification signal, the speech recognition information signal or the dual-use information signal, and the speech digital signal are input. Hereinafter, the acoustic model setting portion 23*d* and the word dictionary setting portion 23*e* will be described.

First, the acoustic model setting portion 23*d* sets the control content for recognizing the speech digital signal input from the speech extraction portion 23*b* based on the state information signal. In the present embodiment, the state information signal is the external microphone type identification signal and the speech recognition information signal or the dual-use information signal. In a case where the speech recognition information signal indicates the microphone 14, the acoustic model setting portion 23*d* sets the acoustic model as in the first embodiment. In a case where the speech recognition information signal indicates the external microphone 19 or in a case where the dual-use information signal is input, the acoustic model setting portion 23*d* selects the acoustic model suitable for the characteristic of the external microphone 19 from among a plurality of acoustic models stored in the storage portion 21 based on the external microphone type identification signal. Then, the acoustic model setting portion 23*d* reads the selected acoustic model from the storage portion 21 and sets the acoustic model as an acoustic model for speech recognition.

Here, similarly to the third embodiment, as the external microphone 19 is set for speech recognition, the frequency characteristic of the input speech is changed depending on the frequency characteristic or response characteristic of the external microphone 19 for speech recognition. That is, a change in state information of the external microphone 19 affects the recognition of a speech input to the external microphone 19. Therefore, it is necessary to set the control content for speech recognition according to a change in state information of the external microphone 19. In the present embodiment, the control content is the setting of the acoustic model. Then, as described above, the acoustic model setting portion 23*d* selects the acoustic model suitable for the characteristic of the external microphone 19 from among the plurality of acoustic models based on the external microphone type identification signal or the like.

Next, the speech recognition portion 23*c* converts the speech digital signal into "phonemes" in a speech recognition engine using the acoustic model suitable for the speech digital signal. The speech recognition portion 23*c* lists word candidates by associating an arrangement order of the phonemes with a word dictionary (pronunciation dictionary) stored in advance. The word dictionary setting portion 23*e* selects a word suitable for speech recognition from the words in the word dictionary stored in the storage portion 21 based on various signals. Then, the word dictionary setting portion 23*e* reads the selected word from the storage portion 21 and sets the word as a word in the word dictionary for speech recognition. Next, the speech recognition portion 23*c* lists sentence candidates that are correct sentences from the word candidates by using a language model.

Next, moving image sound control will be described Note that when a still image/moving image switching lever 16*c* performs switching to moving image shooting, and a moving image shooting button 16*e* is operated to start the moving image shooting, the moving image sound control is started. Then, when the moving image shooting button 16*e* is operated to end the moving image shooting, the moving image sound control is ended. Note that the user may shoot a moving image by using the speech recognition function rather than the moving image shooting button 16*e*. Furthermore, the moving image sound control may be performed by a RAM different from that for speech recognition control.

Various signals are input to the environmental sound extraction portion 23*l*. The environmental sound extraction portion 23*l* suppresses the speech digital signal based on the speech digital signal and the time signal input from the sound processing portion 23*a* and the moving image information signal or the dual-use information signal input from the microphone setting portion 23*f*, and extracts an environmental sound digital signal (environmental sound digital data, environmental sound, or moving image sound for moving images). The environmental sound extraction portion 23*l* outputs the extracted environmental sound digital signal to the encoding portion 232. Here, the moving image sound for moving images is an environmental sound obtained by suppressing a speech in the sound input to the microphone 14. When extracting the environmental sound digital signal, the environmental sound extraction portion 23*l* suppresses the speech digital signal included in the sound digital signal based on the speech digital signal and the time signal input from the speech extraction portion 23*b*. Then, the environmental sound extraction portion 23*l* outputs the extracted environmental sound digital signal to the encoding portion 232. The environmental sound extraction portion 23*l* repeatedly executes the following environmental sound extraction processing while the sound digital signal, the speech digital signal, the time signal, and the moving image information signal or the dual-use information signal are input.

First, in a case where the moving image information signal indicates the microphone 14, the environmental sound extraction portion 23*l* suppresses the speech digital signal in the internal sound digital signal. In a case where the moving image information signal indicates the external microphone 19 or in a case where the dual-purpose information signal is input, the environmental sound extraction portion 23*l* suppresses the speech digital signal in the external sound digital signal.

Next, the environmental sound extraction portion 23*l* executes the processing of converting the remaining sound digital signal obtained by suppressing the speech digital signal in the sound digital signal into Ambisonics (conversion into Ambisonics). Next, the environmental sound extraction portion 23*l* sets a sound reproduction direction of the sound digital signal converted into Ambisonics based on the angle signal. Then, the environmental sound extraction portion 23*l* extracts the environmental sound digital signal from the sound digital signal converted into Ambisonics of which the sound reproduction direction is set. In this manner, the environmental sound extraction portion 23*l* extracts the environmental sound digital signal from the sound digital signal. Note that the environmental sound extraction portion 23*l* may execute the processing of suppressing the speech digital signal after executing the processing of performing conversion into Ambisonics.

Next, the environmental sound extraction portion 23*l* executes noise removal processing for the extracted environmental sound digital signal similarly to the speech extraction portion 23*b* described above. Then, the environmental sound extraction portion 23*l* outputs the environmental sound digital signal from which noise has been removed to the encoding portion 232.

The encoding portion 232 encodes the environmental sound digital signal input from the environmental sound extraction portion 23*l* and records the encoded signal in the storage portion 21. Specifically, the encoding portion 232 repeatedly executes the following encoding processing while the environmental sound digital signal is input from the environmental sound extraction portion 23*l*.

First, the encoding portion 232 converts the environmental sound digital signal into an uncompressed WAV format, compressed AAC format, or the like. Conversion from the environmental sound digital signal to a file is performed based on a preset format or type. Next, the encoding portion 232 encodes the converted environmental sound digital signal as a moving image file in synchronization with video data. Then, the encoding portion 232 records the moving image file in the storage portion 21.

Next, the actions and effects of the fourth embodiment will be described.

First, the actions and effects of the speech recognition control of the imaging apparatus 1D will be described. In the state acquisition portion 22, when various signals are input, the various signals are acquired by the state acquisition portion 22 (acquisition processing). In the sound processing portion 23*a*, when a sound is input to the microphone 14, at the same time as or before or after the acquisition processing portion, the sound processing portion 23*a* converts the internal sound analog signal into the internal sound digital signal (sound processing). When a sound is input to the external microphone 19, the external sound analog signal is converted into the external sound digital signal by the sound processing portion 23*a* (sound processing). Next, in the microphone identification portion 23*h*, when the state information signal is input, the microphone identification portion 23*h* automatically identifies whether the external microphone 19 is a monaural microphone or a stereo microphone based on the state information signal (microphone identification processing). In addition, the type of the external microphone 19 is identified by the microphone identification portion 23*h* based on the state information signal (microphone identification processing).

Next, in the microphone setting portion 23*f*, when the identification result signal is input, the microphone setting portion 23*f* automatically sets one of the microphone 14 and the external microphone 19 for speech recognition and automatically sets the other one for moving images based on the identification result signal (microphone setting processing). Alternatively, the microphone setting portion 23*f* automatically sets the external microphone 19 for speech recognition and for moving images based on the identification result signal (microphone setting processing). Next, in the speech extraction portion 23*b*, when various signals are input, the speech extraction portion 23*b* sets directivity based on the various signals (speech extraction processing). Thereafter, the speech extraction portion 23*b* extracts the speech digital signal from the internal sound digital signal based on the speech recognition information signal as in the first embodiment (speech extraction processing). Alternatively, the speech extraction portion 23*b* extracts the external sound digital signal as the speech digital signal based on the speech recognition information signal or the dual-use information signal (speech extraction processing). Next, the speech extraction portion 23*b* executes noise removal processing for the extracted speech digital signal (speech extraction processing).

Next, in the speech recognition portion 23*c*, when the various signals are input, the acoustic model setting portion 23*d* sets the acoustic model based on the state information signal, the external microphone type identification signal, and the speech recognition information signal or the dual-use information signal (speech recognition processing and acoustic model setting processing). Thereafter, the word dictionary setting portion 23*e* sets the word in the word dictionary (speech recognition processing and word setting processing). Subsequently, a sentence or word is recognized by the speech recognition portion 23*c* (speech recognition processing). Next, in the command output portion 24, when the text signal as the recognition result is input, the operation signal is output according to the text signal from the command output portion 24 (command output processing). Then, for example, various actuators and the like are operated according to the input operation signal. In this manner, a speech uttered by the user can be recognized, and the operation signal can be output according to the recognition result. As described above, the recognition control module 23 executes the processing of setting a control content for speech recognition based on the state information signal, and performing speech recognition (recognition control processing).

Next, the actions and effects of the moving image sound control of the imaging apparatus 1D will be described. The above-described acquisition processing, sound processing, microphone identification processing, microphone setting processing, and speech extraction processing are executed. Next, in the environmental sound extraction portion 23*l*, when the various signals are input, the environmental sound extraction portion 23*l* suppresses the speech digital signal corresponding to the time signal in the internal sound digital signal based on the moving image information signal (environmental sound extraction processing). Alternatively, the environmental sound extraction portion 23*l* suppresses the speech digital signal corresponding to the time signal in the external sound digital signal based on the moving image information signal or the dual-use information signal (environmental sound extraction processing). Next, the environmental sound extraction portion 23*l* converts the remaining sound digital signal obtained by suppressing the speech digital signal in the sound digital signal into Ambisonics (environmental sound extraction processing). Next, the environmental sound extraction portion 23*l* sets the sound reproduction direction of the sound digital signal converted into Ambisonics based on the angle signal (environmental sound extraction processing). Then, the environmental sound extraction portion 23*l* extracts the environmental sound digital signal from the sound digital signal converted into Ambisonics of which the sound reproduction direction is set (environmental sound extraction processing). Next, the environmental sound extraction portion 23*l* executes noise removal processing for the extracted environmental sound digital signal (environmental sound extraction processing).

Next, in the encoding portion 232, when the environmental sound digital signal is input, the encoding portion 232 converts the environmental sound digital signal into a file and encodes the converted environmental sound digital signal as a moving image file in synchronization with video data (encoding processing). Then, the encoding portion 232 records the moving image file in the storage portion 21 (encoding processing).

Next, the actions and effects of the imaging apparatus 1D will be described.

In the present embodiment, the speech is input from the microphone 14 provided in the imaging apparatus 1D. The connected device is the external microphone 19 to which at least one of a speech or an environmental sound is input. The state acquisition portion 22 acquires the state information signal of the external microphone 19. The recognition control module 23 (microphone setting portion 23*f*) sets one of the microphone 14 and the external microphone 19 for speech recognition based on the state information signal of the external microphone 19 acquired by the state acquisition portion 22. Therefore, in a case where the external microphone 19 is added, it is possible to select one microphone to which a speech can be easily input (a speech recognition microphone setting action by the external microphone).

In the present embodiment, the recognition control module 23 (microphone identification portion 23*h*) automatically identifies the external microphone 19 based on the state information signal of the external microphone 19 acquired by the state acquisition portion 22. The recognition control module 23 (microphone setting portion 23*f*) automatically sets one of the microphone 14 and the external microphone 19 for speech recognition based on the obtained identification result signal That is, in a case where the external microphone 19 is added, one microphone is automatically set as the microphone for speech recognition, and thus the user does not need to set a microphone for speech recognition. Therefore, in the case where the external microphone 19 is added, the user's trouble can be reduced (automatic speech recognition microphone setting action).

In the present embodiment, the recognition control module 23 (microphone setting portion 23*f*) sets the other one of the microphone 14 and the external microphone 19 for moving images (moving images). That is, even in the case where the external microphone 19 is added, one is set for speech recognition and the other is set for moving images. Therefore, in the case where the external microphone 19 is added, the microphone 14 and the external microphone 19 can be divided into a microphone for speech recognition and a microphone for moving images. Therefore, in the case where the external microphone 19 is added, it is possible to select one microphone to which a speech can be easily input, and it is possible to select the other microphone to which an environmental sound can be easily input (speech recognition and moving image microphone setting action).

In the present embodiment, the recognition control module 23 (microphone setting portion 23*f*) invalidates an input from the microphone 14 based on the state information signal of the external microphone 19 acquired by the state acquisition portion 22, and sets the external microphone 19 for speech recognition and for moving images. Therefore, it is possible to select the external microphone 19 to which both the speech and the environmental sound can be easily input (a microphone setting action by the external microphone).

In the present embodiment, the recognition control module 23 (the speech recognition portion 23*c* and the acoustic model setting portion 23*d*) sets the acoustic model that converts a speech into phonemes based on the state information signal (the state information signal of the external microphone 19) acquired by the state acquisition portion 22. That is, the setting of the acoustic model improves the accuracy in converting a speech into phonemes. Therefore, erroneous speech recognition is suppressed by setting the acoustic model Therefore, the accuracy of speech recognition can be improved by setting the acoustic model (acoustic model setting action).

Note that, in the present embodiment, the recognition accuracy improvement action and the imaging apparatus operation action are achieved similarly to the first embodiment.

Fifth Embodiment

Next, an imaging apparatus 1E according to a fifth embodiment will be described with reference to FIGS. 17 and 19 to 22. A description of the same configuration as those of the first embodiment and the like will be omitted or simplified.

Figure 19:
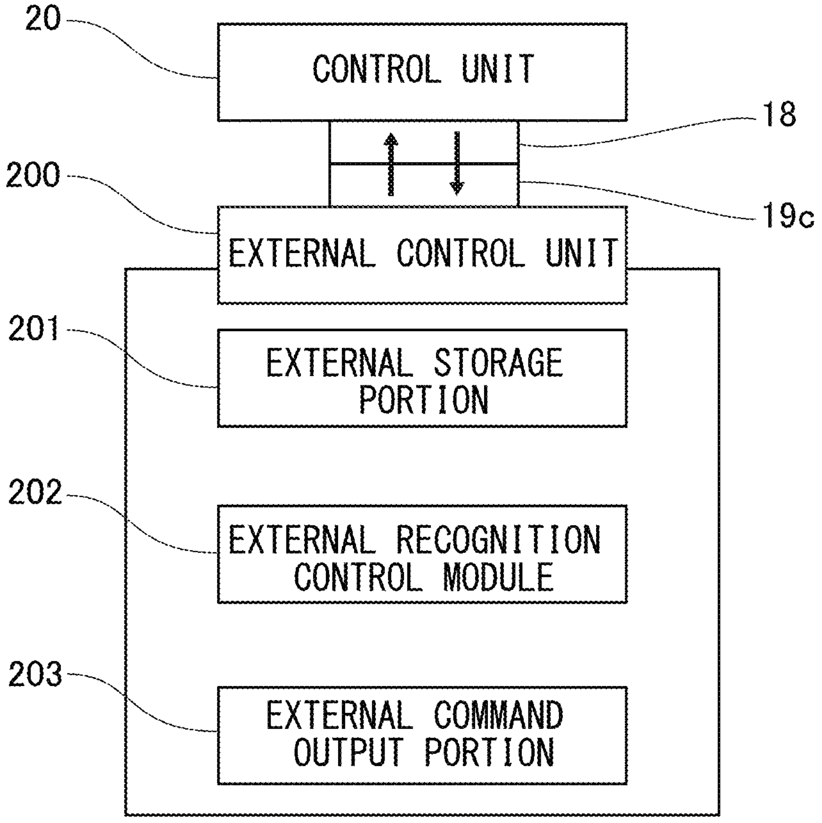
FIG. 19 is a block configuration diagram of an external control unit of an external microphone according to a fifth embodiment.
Figure 20:
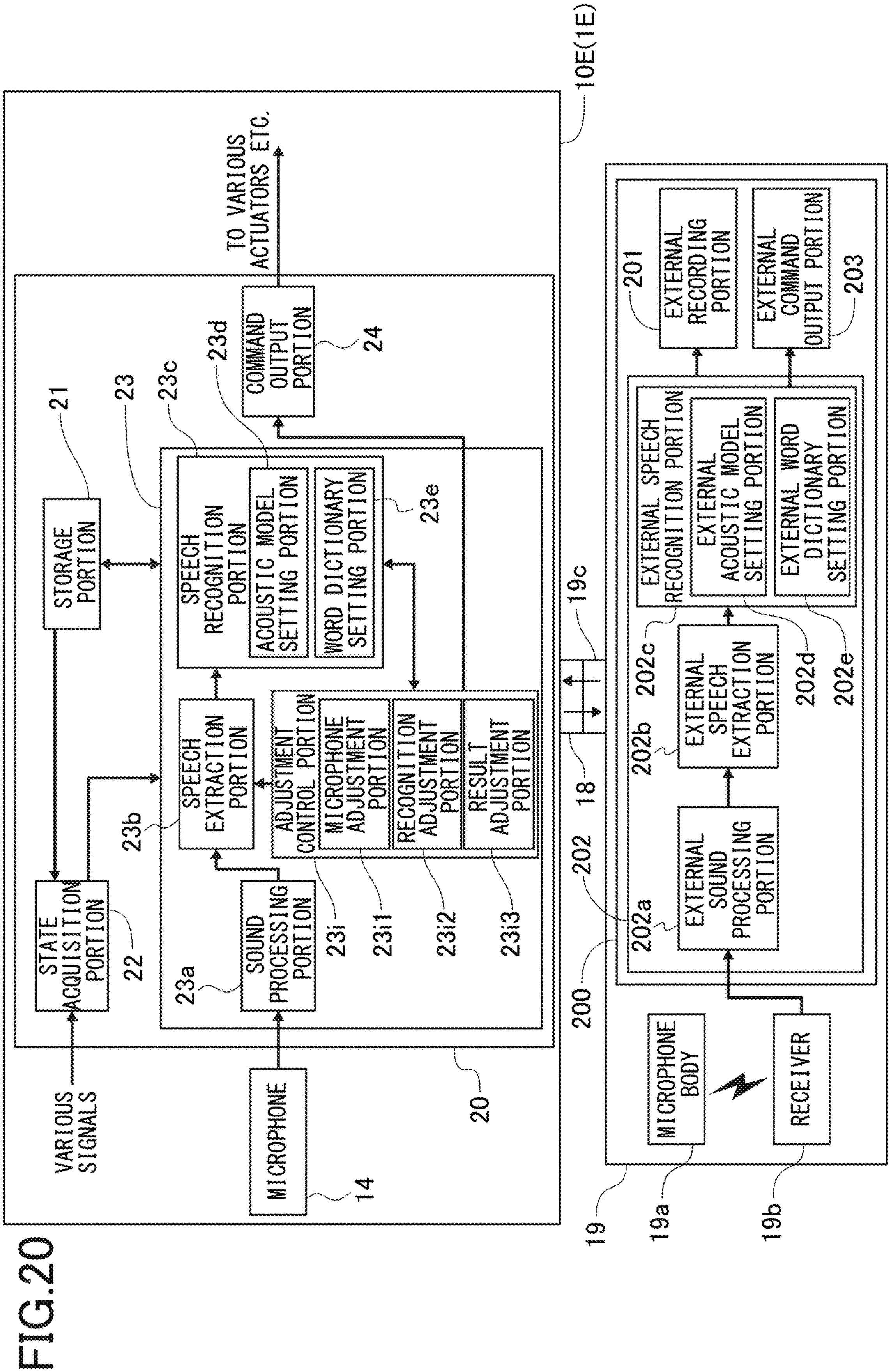
FIG. 20 is a block configuration diagram of a control unit and a recognition control module of an imaging apparatus, the external control unit, and an external recognition control module according to the fifth embodiment.

An apparatus body 10E (body and housing) of the imaging apparatus 1E includes microphones 14 (input portions and built-in microphones) and the like (see FIGS. 1 to 3 and 17) as in the fourth embodiment. Furthermore, as illustrated in FIGS. 19 and 20, the apparatus body 10E includes an apparatus-side connector 18. Furthermore, a grip portion 100 is integrally formed on the right side of the apparatus body 10E. The apparatus body 10E further includes a control unit 20 and various actuators and the like (not illustrated). Furthermore, an external microphone 19 (connected device) is separately provided for the apparatus body 10E. Note that the microphones 14 are built in the apparatus body 10E. The external microphone 19 is provided (attached) as a connected device for (to) the apparatus body 10E from the outside, and is connected to the apparatus body 10D. The control unit 20 and the portions 21 to 26 included in the control unit 20 are incorporated in the apparatus body 10E. An external control unit 200 and each of portions 201 to 203 included in the external control unit 200 described below are provided outside the apparatus body 10E, and included in the external microphone 19.

The apparatus-side connector 18 is similar to that of the fourth embodiment. As in the fourth embodiment, one of a plurality of types of external microphones 19 is connected to the apparatus body 10E (see FIG. 16). In the following description, it is assumed that the apparatus-side connector 18 and an external-side connector 19*c* are connected.

Hereinafter, a block configuration of the control unit 20 will be described with reference to FIG. 17 of the fourth embodiment.

Similarly to the fourth embodiment, various signals such as a detection signal (detection result) of an eye sensor 13, an angle signal (inclination information) of a gyro sensor 27, and an internal sound analog signal of the microphone 14 are input to the control unit 20. A state information signal of the external microphone 19 is input to the control unit 20 through the apparatus-side connector 18 and the external-side connector 19*c*. The state information signal of the external microphone 19 is a signal of state information of the external microphone 19. The state information of the external microphone 19 is product information such as a model number, a type, a frequency characteristic, a response characteristic, the number of poles in a case of a monaural microphone, a stereo microphone, and a microphone jack terminal, the presence or absence of a speech recognition function, and version information of the speech recognition function. Note that, in the present embodiment, the external microphone 19 has a speech recognition function. Further, the state information of the external microphone 19 is a communication state of analog communication or digital communication. Furthermore, an external sound analog signal from a receiver 19*b* or an external sound digital signal input to the receiver 19*b* is input to the control unit 20 (see FIG. 20). Furthermore, a text signal from an external recognition control module 202 and an operation signal from an external command output portion 203 are input to the control unit 20 (see FIG. 20). Note that the external microphone 19 is driven by a microphone driver (not illustrated) included in the control unit 20.

Input and output of various signals and various data of each of the apparatus body 10E and the external microphone 19 are performed through the apparatus-side connector 18 and the external-side connector 19*c*. That is, the apparatus body 10E and the external microphone 19 exchange various signals (information) and various data (information) through the apparatus-side connector 18 and the external-side connector 19*c*.

Similarly to the fourth embodiment, a state acquisition portion 22 acquires various signals and outputs the signals to a storage portion 21 and a recognition control module 23. In the present embodiment, the state information signal is a signal of the state information related to the external microphone 19.

Similarly to the fourth embodiment, the recognition control module 23 executes processing such as conversion of the internal sound analog signal input from the microphone 14, conversion of the sound analog signal input from the external microphone 19, recognition of a speech uttered by the user, or output of a recognized text signal (recognition result). The recognition control module 23 outputs the text signal to the command output portion 24. Details of the recognition control module 23 are described below.

Hereinafter, a block configuration of the external control unit 200 will be described with reference to FIG. 19.

The external control unit 200 (computer) includes an external storage portion 201, an external recognition control module 202 (external recognition control portion), and an external command output portion 203 (external output portion).

Similarly to the control unit 20, the external control unit 200 includes an arithmetic element such as a CPU, and an external control program (not illustrated) stored in the external storage portion 201 is read at the time of activation and executed in the external control unit 200. As a result, the external control unit 200 controls the entire external microphone 19 including the external recognition control module 202 and the external command output portion 203. The external sound analog signal from the receiver 19*b* or the external sound digital signal input to the receiver 19*b* is input to the external control unit 200. In a case where the external-side connector 19*c* is connected to an apparatus-side digital connector or an apparatus-side analog connector of the apparatus-side connector 18, the following various signals are input to the external control unit 200. Various signals to be input include signals such as the detection signal (detection result) of the eye sensor 13 and the internal sound analog signal, an internal sound digital signal, or an internal speech digital signal of the microphone 14. The external control unit 200 controls the entire external microphone 19 based on the input various signals. Note that "CPU" stands for "central processing portion".

The external storage portion 201 includes a mass storage medium (for example, a flash memory or a hard disk drive) and a semiconductor storage medium such as a ROM or RAM. The external storage portion 201 stores the above-described external control program, and also temporarily stores various signals (various sensor signals, the state information signal of the external microphone 19, and the like) and various data required at the time of the control operation of the external control unit 200. It is assumed that an acoustic model and teaching data for an external acoustic model setting portion 202*d* described below, a word of a word dictionary for an external word dictionary setting portion 202*e* described below, and a language model are stored in the external storage portion 201 in advance. Uncompressed raw audio data input from the external microphone 19 is temporarily stored in the RAM of the external storage portion 201. Note that "ROM" stands for "read-only memory", and "RAM" stands for "random access memory".

The external recognition control module 202 executes processing such as conversion of the sound analog signal input from the external microphone 19, recognition of a speech uttered by the user, or output of a recognized text signal (recognition result). The external recognition control module 202 outputs the text signal to the external command output portion 203. Details of the external recognition control module 202 are described below.

The external command output portion 203 executes the processing of outputting an operation signal (command signal) according to the text signal from the external recognition control module 202. Note that details of the external command output portion 203 are described below.

Hereinafter, block configurations of the control unit 20, the recognition control module 23, the external control unit 200, and the external recognition control module 202 will be described with reference to FIG. 20.

The recognition control module 23 sets a control content for speech recognition based on the state information signal, and performs speech recognition (recognition control processing). The recognition control module 23 includes a sound processing portion 23*a*, a speech extraction portion 23*b*, a speech recognition portion 23*c* (recognition portion), and an adjustment control portion 23*i*. The speech recognition portion 23*c* includes an acoustic model setting portion 23*d* and a word dictionary setting portion 23*e*. The adjustment control portion 23*i* includes a microphone adjustment portion 23*i*1, a recognition adjustment portion 23*i*2, and a result adjustment portion 23*i*3.

The external recognition control module 202 sets a control content for speech recognition based on the state information signal, and performs speech recognition. The external recognition control module 202 includes an external sound processing portion 202*a*, an external speech extraction portion 202*b*, and an external speech recognition portion 202*c*. The external speech recognition portion 202*c* includes the external acoustic model setting portion 202*d* and the external word dictionary setting portion 202*e*. The external recognition control module 202 is connected to the recognition control module 23 through the apparatus-side connector 18 and the external-side connector 19*c*.

Note that, in the example illustrated in FIG. 20, the imaging apparatus 1E of the present embodiment includes the microphones 14, the external microphone 19, the control unit 20, the recognition control module 23, the external control unit 200, and the external recognition control module 202. The control unit 20 and the external control unit 200 function as the speech recognition apparatuses. A program for executing processing in each of the portions 22, 23*a* to 23*e*, 23*i* (including 23*i*1 to 23*i*3), and 24 is stored as the control program of the control unit 20 in the storage portion 21. The control unit 20 reads and executes the program in the RAM to execute processing in each of the portions 22, 23*a* to 23*e*, 23*i* (including 23*i*1 to 23*i*3), and 24. A program for executing processing in each of the portions 202*a* to 202*e* is stored as the control program of the external control unit 200 in the external storage portion 201. The external control unit 200 reads and executes the program in the RAM to execute processing in each of the portions 202*a* to 202*e*. Note that, hereinafter, the state acquisition portion 22, the recognition control module 23, the external recognition control module 202, the command output portion 24, and the external command output portion 203 will be described in this order. In addition, the result adjustment portion 23*i*3 will be described after the external recognition control module 202. Hereinafter, when the internal sound digital signal and the external sound digital signal are not particularly distinguished, they are described as "sound digital signals". When the internal speech digital signal and an external speech digital signal described below are not particularly distinguished, they are described as "speech digital signals".

The state acquisition portion 22 acquires various signals and outputs the signals to the recognition control module 23 and the external recognition control module 202.

Next, the recognition control module 23 will be described.

Similarly to the first embodiment, the sound processing portion 23*a* executes sound processing such as the conversion of the internal sound analog signal input from the microphone 14 into an internal sound digital signal and known noise removal for the internal sound digital signal. The sound processing portion 23*a* outputs the internal sound digital signal to the speech extraction portion 23*b*.

The adjustment control portion 23*i* performs adjustment control for speech recognition. The microphone adjustment portion 23*i*1 sets at least one of the microphone 14 or the external microphone 19 for speech recognition based on the state information signal of the external microphone 19. The microphone adjustment portion 23*i*1 repeatedly executes the following microphone adjustment processing while the state information signal is input from the state acquisition portion 22. First, the microphone adjustment portion 23*i*1 automatically executes processing similar to the microphone identification processing of the fourth embodiment That is, the microphone adjustment portion 23*i*1 identifies whether the external microphone 19 is a monaural microphone or a stereo microphone. Further, the microphone adjustment portion **23*i*1 identifies the type of the external microphone 19**.

Next, the microphone adjustment portion **23*i*1 automatically sets at least one of the microphone 14 or the external microphone 19 for speech recognition based on an identification result signal (state information signal). In a case where the identification result signal is a monaural signal, the microphone adjustment portion 23*i*1 automatically sets the external microphone 19 for speech recognition. Note that, in the case where the identification result signal is a monaural signal, the microphone adjustment portion 23*i*1 may automatically set both the microphone 14 and the external microphone 19 for speech recognition. In a case where the identification result signal is a stereo signal, the microphone adjustment portion 23*i*1 automatically sets the microphone 14 for speech recognition. Then, the microphone adjustment portion 23*i*1 outputs information indicating that one or both of the microphone 14 and the external microphone 19 are set for speech recognition to an output destination as a speech recognition information signal (state information signal). The output destination includes the speech extraction portion 23*b*, the speech recognition portion 23*c*, the external speech extraction portion 202*b*, the external speech recognition portion 202*c*, and the result adjustment portion 23*i*3. Further, the microphone adjustment portion 23*i*1 outputs an external microphone type identification signal (state information signal) to the speech recognition portion 23*c* and the external speech recognition portion 202*c* as an identification result for the external microphone 19**.

The recognition adjustment portion **23*i*2 automatically sets at least one of the speech recognition portion 23*c* or the external speech recognition portion 202*c* as a recognition specifying portion (for speech recognition) based on the state information signal. The recognition specifying portion is specified as recognizing the speech digital signal. In other words, one of the speech recognition portion 23*c* and the external speech recognition portion 202*c* that is not set as the recognition specifying portion does not recognize the speech digital signal. The recognition adjustment portion 23*i*2 repeatedly executes the following recognition adjustment processing while the state information signal is input from the state acquisition portion 22**.

Here, in a case where each of the apparatus body 10E and the external microphone 19 has the speech recognition function, it is necessary to set which one of the apparatus body 10E and the external microphone 19 recognizes the speech digital signal. Therefore, it is necessary to set at least one of the two speech recognition functions as the recognition specifying portion based on the state information signal of the external microphone 19. That is, the state information of the external microphone 19 affects speech recognition. For this reason, it is necessary to set the control content for speech recognition based on the state information of the external microphone 19. As described above, the recognition specifying portion is set based on the state information of the external microphone 19. In the present embodiment, the control content is the setting of the recognition specifying portion. The recognition adjustment portion **23*i*2 sets at least one of the speech recognition portion 23*c* or the external speech recognition portion 202*c* as the recognition specifying portion based on version information of the speech recognition function or the like in the state information signal of the external microphone 19**.

For example, according to the version information of the speech recognition function of each of the speech recognition portion **23*c* and the external speech recognition portion 202*c*, the speech recognition function of the latest version is set as the recognition specifying portion. The "version information of the speech recognition function" is information of three databases including an acoustic model used for speech recognition, words in the word dictionary, and the language model. Then, the speech recognition function of the latest version is obtained by learning speeches, language data, and the like in the three databases, and enables more accurate speech recognition than older versions. The version information of the speech recognition function of the speech recognition portion 23*c* is stored in advance in the storage portion 21. Therefore, the recognition adjustment portion 23*i*2 can set the speech recognition function of the latest version as the recognition specifying portion by comparing the pieces of version information of the speech recognition functions of the speech recognition portion 23*c* and the external speech recognition portion 202*c***.

As for a specific comparison of the pieces of version information, the recognition adjustment portion **23*i*2 sets, as the recognition specifying portion, one of the storage portion 21, and the external storage portion 201 that has a larger number of words in the word dictionary, in other words, at least one of the speech recognition portion 23*c* or the external speech recognition portion 202*c*. For example, in a case where the words in the word dictionary stored in the storage portion 21 are "shoot, stop, and cheese!" and the words in the word dictionary stored in the external storage portion 201 are "shoot and stop", the recognition adjustment portion 23*i*2 sets the speech recognition portion 23*c*** as the recognition specifying portion.

In addition, even in a case where the numbers of words in the word dictionaries are different, the words registered in the word dictionaries of the storage portion 21 and the external storage portion 201 may be different. In this case, there is no superiority in the speech recognition performances (performances of the speech recognition functions) of the speech recognition portion **23*c* and the external speech recognition portion 202*c*, and accordingly, the recognition adjustment portion 23*i*2 sets both of the speech recognition portion 23*c* and the external speech recognition portion 202*c* as the recognition specifying portions. For example, in a case where the words in the word dictionary stored in the storage portion 21 are "shoot, stop, and cheese!" and the words in the word dictionary stored in the external storage portion 201 are "shoot, stop, and reduce wind noise", the recognition adjustment portion 23*i*2 cannot compare the speech recognition performances thereof. Therefore, the recognition adjustment portion 23*i*2 sets both of the speech recognition portion 23*c* and the external speech recognition portion 202*c*** as the recognition specifying portions.

In a case where the numbers of words in the word dictionaries of the speech recognition portion **23*c* and the external speech recognition portion 202*c* are completely the same, that is, in a case where both the speech recognition performances are the same, the recognition adjustment portion 23*i*2 sets both of the speech recognition portion 23*c* and the external speech recognition portion 202*c*** as the recognition specifying portions.

As for the comparison of the pieces of version information, the recognition adjustment portion **23*i*2 may set, as the recognition specifying portion, one of the speech recognition portion 23*c*, and the external speech recognition portion 202*c* that has only the latest version number. However, even in a case where the version number is the latest, for example, the number of words in the word dictionary of the latest version may be smaller, and thus, there is a possibility that the speech recognition function with the latest version number is not superior to that of the older versions. The recognition adjustment portion 23*i*2 outputs, as a recognition specifying portion signal (state information signal), information indicating that the recognition specifying portion is set to the speech extraction portion 23*b*, the speech recognition portion 23*c*, the external speech extraction portion 202*b*, the external speech recognition portion 202*e*, and the result adjustment portion 23*i*3. The information indicating that the recognition specifying portion is set indicates one or both of the speech recognition portion 23*c* and the external speech recognition portion 202*c*. In a case where the information indicates both of the speech recognition portion 23*c* and the external speech recognition portion 202*c***, the information indicating that the recognition specifying portion is set indicates that the speech recognition performances are the same (the performances are the same) or there is no superiority in the speech recognition performances (no superiority in performances).

The speech extraction portion **23*b* extracts the internal speech digital signal (speech digital data or speech) based on the speech recognition information signal input from the microphone adjustment portion 23*i*1 and the recognition specifying portion signal input from the recognition adjustment portion 23*i*2. The speech extraction portion 23*b* repeatedly executes the following speech extraction processing while the internal sound digital signal, the speech recognition information signal, and the recognition specifying portion signal are input. The speech extraction portion 23*b* determines whether or not to extract the internal speech digital signal based on the speech recognition information signal input from the microphone adjustment portion 23*i*1. In a case where the speech recognition information signal indicates the microphone 14 or both of the microphone 14 and the external microphone 19, the speech extraction portion 23*b* sets directivity based on various signals. Then, the speech extraction portion 23*b* extracts the internal speech digital signal from the internal sound digital signal input from the sound processing portion 23*a*. In a case where the speech recognition information signal indicates the external microphone 19, the speech extraction portion 23*b* does not extract the internal speech digital signal from the internal sound digital signal. Further, the speech extraction portion 23*b*** executes noise removal processing for the extracted internal speech digital signal as in the first embodiment.

The speech extraction portion **23*b* sets an output destination of the extracted internal speech digital signal based on the recognition specifying portion signal input from the recognition adjustment portion 23*i*2. In a case where the recognition specifying portion signal indicates the speech recognition portion 23*c* or indicates that the performances are the same, the speech extraction portion 23*b* outputs the extracted internal speech digital signal to the speech recognition portion 23*c*. In a case where the recognition specifying portion signal indicates that there is no superiority in the performances, the speech extraction portion 23*b* outputs the extracted internal speech digital signal to both of the speech recognition portion 23*c* and the external speech recognition portion 202*c*. In a case where the recognition specifying portion signal indicates the external speech recognition portion 202*c*, the speech extraction portion 23*b* outputs the extracted internal speech digital signal to the external speech recognition portion 202*c*. Note that the speech extraction portion 23*b* may output the extracted internal speech digital signal to both the speech recognition portion 23*c* and the external speech recognition portion 202*c*** regardless of the recognition specifying portion signal.

The speech recognition portion **23*c* sets the control content for recognizing the speech digital signal input from at least one of the speech extraction portion 23*b* or the external speech extraction portion 202*b*** based on the state information signal, and recognizes the speech digital signal.

The state information signal, the speech recognition information signal, and the external microphone type identification signal input from the microphone adjustment portion **23*i*1, the recognition specifying portion signal input from the recognition adjustment portion 23*i*2, and the speech digital signal input from at least one of the speech extraction portion 23*b* or the external speech extraction portion 202*b* are input to the speech recognition portion 23*c*. The speech recognition portion 23*c* recognizes at least one of the internal speech digital signal or the external speech digital signal based on these signals. The speech recognition portion 23*c* outputs the text signal to the result adjustment portion 23*i*3. The speech recognition portion 23*c*** repeatedly executes the following speech recognition processing (recognition processing) while the state information signal, the speech recognition information signal, the external microphone type identification signal, and the speech digital signal are input.

First, the speech recognition portion **23*c* recognizes the following speech digital signals. In a case where the internal speech digital signal is input and the recognition specifying portion signal indicates the speech recognition portion 23*c* or indicates that there is no superiority in the performances, the speech recognition portion 23*c* recognizes the internal speech digital signal. In a case where the external speech digital signal is input and the recognition specifying portion signal indicates the speech recognition portion 23*c* or indicates that there is no superiority in the performances, the speech recognition portion 23*c* recognizes the external speech digital signal. In a case where the internal speech digital signal is input and the recognition specifying portion signal indicates that the performances are the same, the speech recognition portion 23*c* recognizes only the internal speech digital signal. Note that, in a case where the recognition specifying portion signal indicates the external speech recognition portion 202*c*, the speech recognition portion 23*c* does not recognize the speech digital signal. Hereinafter, the acoustic model setting portion 23*d* and the word dictionary setting portion 23*e*** will be described.

First, the acoustic model setting portion **23*d* sets the control content for recognizing the speech digital signal based on the state information signal. In the present embodiment, the state information signal is the external microphone type identification signal and the speech recognition information signal. In a case where the speech recognition information signal indicates the microphone 14, the acoustic model setting portion 23*d* sets the acoustic model as in the first embodiment. In a case where the speech recognition information signal indicates the external microphone 19, the acoustic model setting portion 23*d* selects the acoustic model suitable for the characteristic of the external microphone 19 from among a plurality of acoustic models stored in the storage portion 21 based on the external microphone type identification signal. Then, the acoustic model setting portion 23*d* reads the selected acoustic model from the storage portion 21 and sets the acoustic model as an acoustic model for speech recognition. In a case where the speech recognition information signal indicates both of the microphone 14 and the external microphone 19, the acoustic model setting portion 23***d* sets the acoustic model suitable for the characteristics of the microphone 14 and the external microphone 19.

Next, the speech recognition portion 23*c* converts the speech digital signal into "phonemes" in a speech recognition engine using the acoustic model suitable for the speech digital signal. The speech recognition portion 23*c* lists word candidates by associating an arrangement order of the phonemes with a word dictionary (pronunciation dictionary) stored in advance. The word dictionary setting portion 23*e* selects a word suitable for speech recognition from the words in the word dictionary stored in the storage portion 21 based on various signals. Then, the word dictionary setting portion 23*e* reads the selected word from the storage portion 21 and sets the word as a word in the word dictionary for speech recognition. In addition, a statistical evaluation value is attached to the word candidates similarly to the sentence candidates.

Next, the speech recognition portion 23*c* lists sentence candidates that are correct sentences from the word candidates by using a language model.

Next, the speech recognition portion 23*c* selects a sentence having the highest statistical evaluation value (hereinafter, also referred to as evaluation value) among the sentence candidates. Then, the speech recognition portion 23*c* outputs the selected sentence (recognition result) to the result adjustment portion 23*i*3 as the text signal (text data). Note that the "statistical evaluation value" is an evaluation value indicating the accuracy of the recognition result at the time of speech recognition, similarly to the first embodiment. Furthermore, in a case where one word is output from phonemes, the listing of the sentence candidates and the sentence selection are omitted, and the speech recognition portion 23*c* outputs the word (recognition result) output from the phonemes to the result adjustment portion 23*i*3 as the text signal (text data). In the first place, in a case where the sound digital signal subjected to the sound processing includes an environmental sound but does not include a speech, or in a case where a speech is not recognized, the speech recognition portion 23*c* outputs the sound digital signal to the result adjustment portion 23*i*3 as a non-text signal (a type of text signal). Note that the non-text signal is a non-applicable recognition result in which a speech is not recognized.

Next, the external recognition control module 202 will be described.

When the external sound analog signal is input from the external microphone 19, the external sound processing portion 202*a* executes sound processing such as conversion of the external sound analog signal into the external sound digital signal and known noise removal for the external sound digital signal, similarly to the sound processing portion 23*a*. When the external sound digital signal is input from the external microphone 19, the external sound processing portion 202*a* executes sound processing such as known noise removal. The external sound processing portion 202*a* outputs the external sound digital signal to the external speech extraction portion 202*b*. The external sound processing portion 202*a* repeatedly executes the external sound processing while a sound is input to the external microphone 19.

The external speech extraction portion 202*b* extracts the external speech digital signal (speech digital data or speech) based on the speech recognition information signal input from the microphone adjustment portion 23*i*1 and the recognition specifying portion signal input from the recognition adjustment portion 23*i*2. The external speech extraction portion 202*b* repeatedly executes the following external speech extraction processing while the external sound digital signal, the speech recognition information signal, and the recognition specifying portion signal are input. The external speech extraction portion 202*b* determines whether or not to extract the external speech digital signal based on the speech recognition information signal input from the microphone adjustment portion 23*i*1. In a case where the speech recognition information signal indicates the external microphone 19 or both of the microphone 14 and the external microphone 19, the external speech extraction portion 202*b* extracts the external sound digital signal input from the external sound processing portion 202*a* as the external speech digital signal. Note that the external speech extraction portion 202*b* does not extract the external sound digital signal as the external speech digital signal in a case where the speech recognition information signal indicates the microphone 14. Furthermore, the external speech extraction portion 202*b* executes noise removal processing for the extracted external speech digital signal similarly to the speech extraction portion 23*b*.

The external speech extraction portion 202*b* sets an output destination of the extracted external speech digital signal based on the recognition specifying portion signal input from the recognition adjustment portion 23*i*2. In a case where the recognition specifying portion signal indicates the external speech recognition portion 202*c* or indicates that the performances are the same, the external speech extraction portion 202*b* outputs the extracted external speech digital signal to the external speech recognition portion 202*c*. In a case where the recognition specifying portion signal indicates that there is no superiority in the performances, the external speech extraction portion 202*b* outputs the extracted external speech digital signal to both of the speech recognition portion 23*c* and the external speech recognition portion 202*c*. In a case where the recognition specifying portion signal indicates the speech recognition portion 23*c*, the external speech extraction portion 202*b* outputs the extracted external speech digital signal to the speech recognition portion 23*c*. Note that the external speech extraction portion 202*b* may output the extracted external speech digital signal to both of the speech recognition portion 23*c* and the external speech recognition portion 202*c* regardless of the recognition specifying portion signal.

The external speech recognition portion 202*c* sets the control content for recognizing the speech digital signal input from at least one of the speech extraction portion 23*b* or the external speech extraction portion 202*b* based on the state information signal, and recognizes the speech digital signal.

The state information signal, the speech recognition information signal, and the external microphone type identification signal input from the microphone adjustment portion 23*i*1, the recognition specifying portion signal input from the recognition adjustment portion 23*i*2, and the speech digital signal input from at least one of the speech extraction portion 23*b* or the external speech extraction portion 202*b* are input to the external speech recognition portion 202*c*. The external speech recognition portion 202*c* recognizes at least one of the internal speech digital signal or the external speech digital signal based on these signals. The external speech recognition portion 202*c* outputs the text signal to the result adjustment portion 23*i*3. The external speech recognition portion 202*c* repeatedly executes the following external speech recognition processing (recognition processing) while the state information signal, the speech recognition information signal, the external microphone type identification signal, and the speech digital signal are input.

First, the external speech recognition portion 202*c* recognizes the following speech digital signals. In a case where the external speech digital signal is input and the recognition specifying portion signal indicates the external speech recognition portion 202*c* or indicates that there is no superiority in the performances, the external speech recognition portion 202*c* recognizes the external speech digital signal. In a case where the internal speech digital signal is input and the recognition specifying portion signal indicates the external speech recognition portion 202*c* or indicates that there is no superiority in the performances, the external speech recognition portion 202*c* recognizes the internal speech digital signal. In a case where the external speech digital signal is input and the recognition specifying portion signal indicates that the performances are the same, the external speech recognition portion 202*c* recognizes only the external speech digital signal. Note that, in a case where the recognition specifying portion signal indicates the speech recognition portion 23*c*, the external speech recognition portion 202*c* does not recognize the speech digital signal. Hereinafter, the external acoustic model setting portion 202*d* and the external word dictionary setting portion 202*e* will be described.

First, the external acoustic model setting portion 202*d* is similar to the acoustic model setting portion 23*d* in the above description if the acoustic model setting portion 23*d* is the external acoustic model setting portion 202*d* and the storage portion 21 is the external storage portion 201.

Next, the external speech recognition portion 202*c* converts the speech digital signal into "phonemes" in a speech recognition engine using the acoustic model suitable for the speech digital signal. The external speech recognition portion 202*c* lists word candidates by associating an arrangement order of the phonemes with a word dictionary (pronunciation dictionary) stored in advance. As for the external word dictionary setting portion 202*e*, the external word dictionary setting portion 202*e* is similar to the word dictionary setting portion 23*e* in the above description if the word dictionary setting portion 23*e* is the external word dictionary setting portion 202*e* and the storage portion 21 is the external storage portion 201. In addition, a statistical evaluation value is attached to the word candidates similarly to the sentence candidates.

Next, similarly to the speech recognition portion 23*c*, the external speech recognition portion 202*c* lists sentence candidates that are correct sentences from the word candidates by using the language model.

Next, the external speech recognition portion 202*c* selects a sentence having the highest statistical evaluation value among the sentence candidates. Then, the external speech recognition portion 202*c* outputs the selected sentence (recognition result) to the result adjustment portion 23*i*3 as the text signal (text data). Note that the "statistical evaluation value" is an evaluation value indicating the accuracy of the recognition result at the time of speech recognition, similarly to the speech recognition portion 23*c*. Furthermore, in a case where one word is output from phonemes, the listing of the sentence candidates and the sentence selection are omitted, and the external speech recognition portion 202*c* outputs the word (recognition result) output from the phonemes to the result adjustment portion 23*i*3 as the text signal (text data). In the first place, in a case where the sound digital signal subjected to the sound processing includes an environmental sound but does not include a speech, or in a case where a speech is not recognized, the external speech recognition portion 202*c* outputs the sound digital signal to the result adjustment portion 23*i*3 as a non-text signal (a type of text signal).

Next, the result adjustment portion 23*i*3 will be described.

The result adjustment portion 23*i*3 determines the text signal (output recognition result) to be output to the command output portion 24 among text signals input from at least one of the recognition specifying portions including the speech recognition portion 23*c* and the external speech recognition portion 202*c*. The speech recognition information signal input from the microphone adjustment portion 23*i*1, the recognition specifying portion signal input from the recognition adjustment portion 23*i*2, and one or more text signals input from at least one of the speech recognition portion 23*c* or the external speech recognition portion 202*c* are input to the result adjustment portion 23*i*3. Specifically, the result adjustment portion 23*i*3 repeatedly executes the following result adjustment processing while various signals are input. A configuration of output recognition result control processing will be described with reference to FIGS. 21 and 22. The processing of FIG. 21 starts when it is determined that the speech recognition information signal and the recognition specifying portion signal have been input to the result adjustment portion 23*i*3. Each step of FIG. 21 will be described below.

In step S11, following the start, the result adjustment portion 23*i*3 determines the number of input text signals based on the speech recognition information signal and the recognition specifying portion signal, and proceeds to step S13. As illustrated in FIG. 22, the input text signal is determined based on the speech recognition information signal and the recognition specifying portion signal.

Here, the "speech recognition information signal" is information indicating that at least one of the microphone 14 or the external microphone 19 is set for speech recognition. That is, it can also be said that the speech recognition information signal is obtained by setting a speech (a speech for speech recognition) input from at least one of the microphone 14 or the external microphone 19 that is set for speech recognition, and used to generate the text signal. The "recognition specifying portion signal" is information indicating at least one of the speech recognition portion 23*c* or the external speech recognition portion 202*c* that is set as the recognition specifying portion. In other words, the recognition specifying portion signal indicates the recognition specifying portion specified as having the speech recognition function of generating the text signal from the speech for speech recognition. The "number of input text signals" is a number determined by a combination of the speech recognition information signal and the recognition specifying portion signal. The combination and the number of text signals are not limited to those in the present embodiment, and are set in advance. The combination and the number of text signals are appropriately set by a combination or the like of the imaging apparatus to be used and the connected device.

Note that, in FIG. 22, in a case where the speech recognition information signal indicates both of the microphone 14 and the external microphone 19, and the recognition specifying portion signal indicates both of the speech recognition portion 23*c* and the external speech recognition portion 202*c* (the performances are the same), the speech recognition portion 23*c* recognizes only the internal speech digital signal, and the external speech recognition portion 202*c* recognizes only the external speech digital signal. That is, since the speech recognition performances of the speech recognition portion 23*c* and the external speech recognition portion 202*c* are the same, the recognition processing can be separately executed That is, the recognition processing can be executed in parallel. For this reason, the time for which all the text signals are input to the result adjustment portion 23*i*3 is shortened in a case of separately executing the recognition processing as compared with a case of executing the recognition processing of the speech digital signal only by one.

In step S13, following the determination of the number of text signals in step S11 or the determination in step S13 that there is no input, the result adjustment portion 23*i*3 determines whether or not one or more text signals have been input. If YES (there is an input), the processing proceeds to step S15, and if NO (there is no input), step S13 is repeated.

In step S15, following the determination in step S13 that there is an input, the result adjustment portion 23*i*3 determines whether or not the number of text signals in step S11 is plural. If YES (a plurality of text signals), the processing proceeds to step S17, and if NO (only one text signal), the processing proceeds to step S47.

In step S17, following the determination of the plurality of text signals in step S15 or a timer count in step S21, the result adjustment portion 23*i*3 determines whether or not all the text signals of which the number is determined in step S11 have been input. If YES (all the text signals have been input), the processing proceeds to step S23, and if NO (there is no input), the processing proceeds to step S19.

In step S19, following the determination in step S17 that there is no input, the result adjustment portion 23*i*3 determines whether or not a timer indicating an input time of the text signals considered to have been uttered at the same time is a predetermined time or more. If YES (timer≥predetermined time (predetermined time has elapsed)), the processing proceeds to step S43, and if NO (timer<predetermined time (predetermined time has not elapsed)), the processing proceeds to step S21. Here, in a case where there are a plurality of text signals considered to have been uttered at the same time, a time difference occurs until all the text signals are input to the result adjustment portion 23*i*3. For this reason, the timer is provided, the previously input text signal is suspended for the predetermined time, and the input of the text signal considered to have been uttered at the same time is waited for the predetermined time, and the input of the plurality of text signals are waited. The predetermined time is set in advance by experiments, simulations, or the like while maintaining a response speed of speech recognition. The response speed of speech recognition is a speed at which speeches considered to have been uttered at the same time are output to command output portion 24 as text signals. For example, the predetermined time is set to "several ms".

In step S21, following the determination in step S19 that the predetermined time has not elapsed, the result adjustment portion 23*i*3 counts the timer and returns to step S17.

In step S23, following the determination in step S17 that all the text signals have been input or the determination in step S45 that a plurality of text signals have been input, the result adjustment portion 23*i*3 determines whether or not the plurality of input text signals match. If YES (text signals match), the processing proceeds to step S25, and if NO (text signals do not match), the processing proceeds to step S27. For example, a case where the text signals match is a case where all of the plurality of text signals are "shoot". In short, this is a case where the plurality of text signals completely match. For example, a case where the text signals do not match is a case where one of two text signals is "shoot" and the other text signal is "reproduce" or a non-text signal. In short, the plurality of text signals does not completely match.

In step S25, following the determination that the text signals match in step S23, the result adjustment portion 23*i*3 determines the matched text signal as an output recognition result signal, and ends the processing.

In step S27, following the determination in step S23 that the text signals do not match, the result adjustment portion 23*i*3 determines whether or not a non-text signal is included in the plurality of input text signals. If YES (there is a non-text signal), the processing proceeds to step S29, and if NO (there is no non-text signal), the processing proceeds to step S33.

In step S29, following the determination in step S27 that there is a non-text signal, the result adjustment portion 23*i*3 determines whether or not the remaining text signals excluding the non-text signal match. If YES (the remaining text signals match), the processing proceeds to step S31, and if NO (the remaining text signals do not match), the processing proceeds to step S33. For example, in a case where there is one remaining text signal, the result adjustment portion 23*i*3 determines that the remaining text signals match. For example, in a case where there is a plurality of remaining text signals and all the remaining text signals are "shoot", the result adjustment portion 23*i*3 determines that the remaining text signals match. In short, the plurality of remaining text signals completely match.

In step S31, following the determination that the remaining text signals match in step S29, the result adjustment portion 23*i*3 excludes the non-text signal and determines the remaining text signal as the output recognition result signal, and ends the processing.

In step S33, following the determination in step S27 that there is no non-text signal or the determination in step S29 that the remaining text signals do not match, the result adjustment portion 23*i*3 determines whether or not there is a difference in evaluation value between the text signals in step S27 or the remaining text signals in step S29. If YES (there is a difference), the processing proceeds to step S35, and if NO (there is no difference), the processing proceeds to step S41. For example, in a case where the evaluation value of one of two text signals is 90 points and the evaluation value of the other one is 80 points, the result adjustment portion 23*i*3 determines that there is a difference. For example, in a case where the evaluation values of the two text signals are the same, the result adjustment portion 23*i*3 determines that there is no difference.

In step S35, following the determination in step S33 that there is a difference, the result adjustment portion 23*i*3 determines whether or not the number of text signals having the highest evaluation value is one. If YES (one text signal having the highest evaluation value), the processing proceeds to step S37, and if NO (a plurality of text signals having the highest evaluation value), the processing proceeds to step S39. For example, in a case where one of two text signals is "shoot" and the evaluation value thereof is 90 points, and the other text signal is "reproduce" and the evaluation value there of is 80 points, "shoot" is the text signal having the highest evaluation value. Therefore, the result adjustment portion 23*i*3 determines that the number of text signals having the highest evaluation value is one. For example, in a case where one of four text signals is "shoot" and the evaluation value thereof is 80 points, one of the four text signals is "reproduce" and the evaluation value thereof is 80 points, one of the four text signals is "cheese!" and the evaluation value thereof is 70 points, and one of the four text signals is "shoot" and the evaluation value thereof is 60 points, the result adjustment portion **23*i*3** determines that the number of text signals having the highest evaluation values is plural.

In step S37, following the determination in step S35 that the number of text signals having the highest evaluation value is one or the determination in step S39 that a plurality of text signals are the same, the result adjustment portion **23*i*3** determines the text signal having the highest evaluation value as the output recognition result signal, and ends the processing.

In step S39, following the determination in step S35 that the number of text signals having the highest evaluation value is plural, the result adjustment portion **23*i*3 determines whether or not the plurality of text signals is the same. If YES (the text signals are the same), the processing proceeds to step S37, and if NO (the text signals are different), the processing proceeds to step S41. For example, in a case where one of four text signals is "shoot" and the evaluation value thereof is 80 points, one of the four text signals is "shoot" and the evaluation value thereof is 80 points, one of the four text signals is "cheese!" and the evaluation value thereof is 70 points, and one of the four text signals is "shoot" and the evaluation value thereof is 60 points, the result adjustment portion 23*i*3 determines that the number of text signals having the highest evaluation values is plural and the plurality of text signals are the same. For example, in a case where one of four text signals is "shoot" and the evaluation value thereof is 80 points, one of the four text signals is "reproduce" and the evaluation value thereof is 80 points, one of the four text signals is "cheese!" and the evaluation value thereof is 70 points, and one of the four text signals is "shoot" and the evaluation value thereof is 60 points, the result adjustment portion 23*i*3** determines that the number of text signals having the highest evaluation values is plural and the plurality of text signals are different.

In step S41, following the determination in step S33 that there is no difference or the determination in step S39 that the plurality of text signals are different, the result adjustment portion **23*i*3** does not determine the text signal as the output recognition result signal, and ends the processing.

In step S43, following the determination in step S19 that the predetermined time has elapsed, the result adjustment portion **23*i*3 resets the timer counted so far, and proceeds to step S45**.

In step S45, following the counter reset in step S43, the result adjustment portion **23*i*3 determines whether or not the number of input text signals is plural. If YES (input of a plurality of text signals), the processing proceeds to step S23, and if NO (input of one text signal), the processing proceeds to step S47**.

In step S47, following the determination in step S15 that there is only one text signal or the determination in step S45 that the number of input text signals is one, the result adjustment portion **23*i*3** determines the one text signal as the output recognition result signal and ends the processing.

The result adjustment portion **23*i*3 outputs the output recognition result signal determined from the above flowchart to the command output portion 24. In a case of not determining the text signal as the output recognition result signal, the result adjustment portion 23*i*3 does not output the output recognition result signal to the command output portion 24**.

Next, the command output portion 24 and the external command output portion 203 will be described.

Unlike the first embodiment and the like, the command output portion 24 outputs the operation signal (command signal) according to the text signal input by the output recognition result signal. Specifically, the command output portion 24 repeatedly executes the following command output processing (output processing) while the text signal is input by the output recognition result signal.

First, the command output portion 24 reads a command list of FIG. 7 stored in the storage portion 21. Next, the command output portion 24 determines (identifies) whether or not the text signal matches a word described in a word field of the read command list. In a case where the text signal matches the word, the command output portion 24 outputs an operation of the imaging apparatus 1E described in an operation field of the command list to the imaging apparatus 1E (for example, various actuators (not illustrated)) as the operation signal, and ends the processing. Then, various actuators and the like (not illustrated) are operated according to the input operation signal. On the other hand, in a case where the text signal does not match the word, the command output portion 24 ends the processing without outputting any operation signal. Specific examples of the actuator and the like are similar to those described in the command output portion 24 of the first embodiment.

In the present embodiment, the apparatus body 10E includes the command output portion 24, and therefore, the external command output portion 203 is not used.

Next, the actions and effects of the fifth embodiment will be described. First, the actions and effects of the speech recognition control of the imaging apparatus 1E will be described.

In the state acquisition portion 22, when various signals are input, the various signals are acquired by the state acquisition portion 22 (acquisition processing).

In the sound processing portion **23*a*, when a sound is input to the microphone 14, at the same time as or before or after the acquisition processing portion, the sound processing portion 23*a* converts the internal sound analog signal into the internal sound digital signal (sound processing). In the external sound processing portion 202*a*, when a sound is input to the external microphone 19, at the same time as or before or after the acquisition processing portion, the external sound processing portion 202*a*** converts the external sound analog signal into the external sound digital signal (external sound processing).

Next, in the microphone adjustment portion **23*i*1, when the state information signal is input, after the acquisition processing portion, the microphone adjustment portion 23*i*1 automatically identifies whether the external microphone 19 is a monaural microphone or a stereo microphone based on the state information signal (microphone adjustment processing). In addition, the type of the external microphone 19 is identified by the microphone adjustment portion 23*i*1 based on the state information signal (microphone adjustment processing). Further, the microphone adjustment portion 23*i*1 automatically sets one of the microphone 14 and the external microphone 19** for speech recognition based on the state information signal (microphone adjustment processing).

In the recognition adjustment portion **23*i*2, when the state information signal is input, after the acquisition processing portion, the recognition adjustment portion 23*i*2 sets at least one of the speech recognition portion 23*c* or the external speech recognition portion 202*c*** as the recognition specifying portion based on the state information signal (recognition adjustment processing).

Next, in the speech extraction portion **23*b*, when various signals are input, the speech extraction portion 23*b* sets the directivity based on the various signals in a case where the speech recognition information signal indicates the microphone 14 or both of the microphone 14 and the external microphone 19 (speech extraction processing). Thereafter, the speech extraction portion 23***b* extracts the internal speech digital signal from the internal sound digital signal as in the first embodiment (speech extraction processing). Next, the speech extraction portion 23*b* executes noise removal processing for the extracted internal speech digital signal (speech extraction processing). Next, the speech extraction portion 23*b* outputs the extracted internal speech digital signal based on the recognition specifying portion signal.

In the external speech extraction portion 202*b*, when various signals are input, after the microphone adjustment processing and the recognition adjustment processing, the external speech extraction portion 202*b* extracts the external sound digital signal as the external speech digital signal in a case where the speech recognition information signal indicates the external microphone 19 or both of the microphone 14 and the external microphone 19 (external speech extraction processing). Next, the external speech extraction portion 202*b* executes noise removal processing for the extracted external speech digital signal (external speech extraction processing). Next, the external speech extraction portion 202*b* outputs the extracted external speech digital signal based on the recognition specifying portion signal.

Next, in the speech recognition portion 23*c*, when the various signals are input, the acoustic model setting portion 23*d* sets the acoustic model based on the external microphone type identification signal and the speech recognition information signal (speech recognition processing and acoustic model setting processing). Thereafter, the word dictionary setting portion 23*e* sets the word in the word dictionary (speech recognition processing and word setting processing). Subsequently, the speech recognition portion 23*c* recognizes at least one of the internal speech digital signal or the external speech digital signal based on the recognition specifying portion signal. Specifically, a sentence or word is recognized by the speech recognition portion 23*c* (speech recognition processing). Note that the speech recognition portion 23*c* may not recognize the speech digital signal based on the recognition specifying portion signal.

In the external speech recognition portion 202*c*, when various signals are input, after the speech extraction processing and the external speech extraction processing, the external acoustic model setting portion 202*d* sets the acoustic model based on the external microphone type identification signal and the speech recognition information signal (external speech recognition processing and external acoustic model setting processing). Thereafter, the external word dictionary setting portion 202*e* sets the word in the word dictionary (external speech recognition processing and external word setting processing). Subsequently, the external speech recognition portion 202*c* recognizes at least one of the internal speech digital signal or the external speech digital signal based on the recognition specifying portion signal Specifically, a sentence or a word is recognized by the external speech recognition portion 202*c* (external speech recognition processing). Note that the external speech recognition portion 202*c* may not recognize the speech digital signal based on the recognition specifying portion signal.

Figure 21:
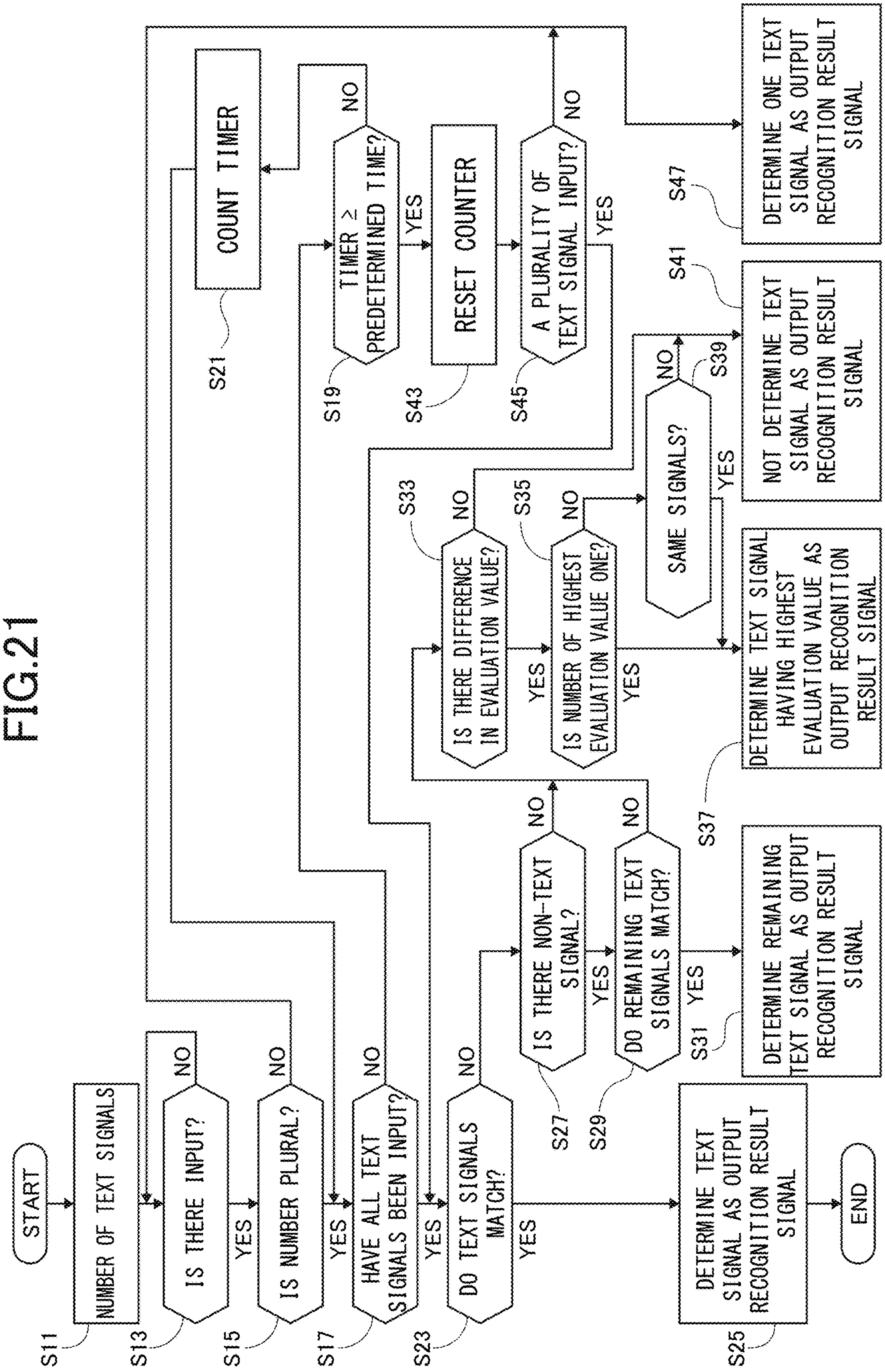
FIG. 21 is a flowchart illustrating a configuration of output recognition result control processing in a result adjustment portion according to the fifth embodiment.

Next, in the result adjustment portion 23*i*3, when the speech recognition information signal and the recognition specifying portion signal are input, the result adjustment portion 23*i*3 determines the output recognition result signal (text signal) to be output to the command output portion 24 among the input text signals according to the flowchart of FIG. 21 (result adjustment processing).

In a case where the result adjustment portion 23*i*3 determines that the number of text signals is only one in step S15, the processing of step S47 is executed (result adjustment processing). In a case where the result adjustment portion 23*i*3 determines that the number of text signals is plural in step S15, the following processing is executed (result adjustment processing). When two or more text signals are input within the predetermined time of step S19, the processing of step S25, step S31, step S37, or step S41 is executed by the result adjustment portion 23*i*3 (result adjustment processing). When only one text signal is input within the predetermined time of step S19, the processing of step S47 is executed by the result adjustment portion 23*i*3 (result adjustment processing).

Next, in the command output portion 24, when the text signal as the output recognition result signal is input, the operation signal is output according to the text signal from the command output portion 24 (command output processing). Then, for example, various actuators and the like are operated according to the input operation signal. In this manner, a speech uttered by the user can be recognized, and the operation signal can be output according to the output recognition result signal. As described above, the recognition control module 23 executes the processing of setting a control content for speech recognition based on the state information signal, and performing speech recognition (recognition control processing).

Next, the actions and effects of the imaging apparatus 1E will be described.

In the present embodiment, the speech is input from the microphone 14 provided in the imaging apparatus 1E. The connected device is the external microphone 19 to which at least one of a speech or an environmental sound is input. The external microphone 19 is connected to the recognition control module 23 and includes the external recognition control module 202 that recognizes a speech. The state acquisition portion 22 acquires the state information signal of the external microphone 19. The recognition control module 23 (microphone adjustment portion 23*i*1) sets at least one of the microphone 14 or the external microphone 19 for speech recognition based on the state information signal of the external microphone 19 acquired by the state acquisition portion 22. The recognition control module 23 (recognition adjustment portion 23*i*2) sets at least one of the recognition control module 23 (speech recognition portion 23*c*) or the external recognition control module 202 (external speech recognition portion 202*c*) as the recognition specifying portion (for speech recognition). Therefore, in the case where the external microphone 19 is added, it is possible to set one microphone to which a speech can be easily input (a speech recognition microphone setting action by the external microphone). In addition, in the case where the external microphone 19 is added, the recognition specifying portion that can easily recognize a speech can be set (a recognition specifying portion setting action by the external microphone and a speech recognition setting action by the external microphone).

In the present embodiment, the recognition control module 23 (recognition adjustment portion 23*i*2) sets the recognition specifying portion (for speech recognition) as follows based on the state information signal of the external microphone 19 acquired by the state acquisition portion 22. The recognition control module 23 (recognition adjustment portion 23*i*2) automatically sets, as the recognition specifying portion (for speech recognition), one of the recognition control module 23 (speech recognition portion 23*c*) and the external recognition control module 202 (external speech recognition portion 202*c*) that has a higher speech recognition performance for recognizing a speech. That is, in the case where the external microphone 19 is added, at least one is automatically set as the recognition specifying portion, and thus, it is not necessary for the user to set the recognition specifying portion. Therefore, in the case where the external microphone 19 is added, the user's trouble can be reduced (automatic recognition specifying portion setting action and automatic speech recognition setting action).

In the present embodiment, the recognition control module 23 (recognition adjustment portion 23*i*2) sets the recognition specifying portion (for speech recognition) as follows in a case where it is difficult to specify one having a higher speech recognition performance among the recognition control module 23 (speech recognition portion 23*c*) and the external recognition control module 202 (external speech recognition portion 202*c*). The recognition control module 23 (recognition adjustment portion 23*i*2) automatically sets both of the recognition control module 23 (speech recognition portion 23*c*) and the external recognition control module 202 (external speech recognition portion 202*c*) as the recognition specifying portion (for speech recognition). That is, in a case where the external microphone 19 is added and there is no superiority in the speech recognition performances, since both the speech recognition performances can be used, erroneous speech recognition is suppressed. Therefore, by using both the speech recognition performances, the accuracy of speech recognition can be improved (multiple speech recognition function use action). In addition, in the case where the external microphone 19 is added and there is no superiority in the speech recognition performances, both of the recognition control module 23 (speech recognition portion 23*c*) and the external recognition control module 202 (external speech recognition portion 202*c*) are automatically set as the recognition specifying portions, so that the user does not need to set the recognition specifying portion. Therefore, in the case where the external microphone 19 is added and there is no superiority in the speech recognition performances (it is indistinguishable which performance is better), it is possible to reduce the user's trouble (automatic indistinguishable recognition specifying portion setting action and automatic indistinguishable speech recognition setting action).

In the present embodiment, the recognition specifying portion (at least one of the speech recognition portion 23*c* or the external speech recognition portion 202*c* set for speech recognition) outputs a plurality of text signals to the recognition control module 23 (result adjustment portion 23*i*3). The recognition control module 23 (result adjustment portion 23*i*3) determines the output recognition result signal to be output to the command output portion 24 among the plurality of text signals output by the recognition specifying portion (at least one of the speech recognition portion 23*c* or the external speech recognition portion 202*c* set for speech recognition). Therefore, a more correct text signal can be selected by determining the output recognition result signal from the plurality of text signals (output recognition result determination action).

In the present embodiment, in a case where the plurality of text signals include a non-text signal in which a speech is not recognized, the recognition control module 23 (result adjustment portion 23*i*3) excludes the non-text signal and determines the output recognition result signal. That is, the output recognition result signal can be determined from text signals in which a speech is recognized. Therefore, a text signal in which a speech is recognized can be reliably determined as the output recognition result signal (output recognition result determination action by a text signal).

In the present embodiment, in the case of outputting a plurality of text signals to the recognition control module 23 (result adjustment portion 23*i*3), the recognition specifying portion (at least one of the speech recognition portion 23*c* or the external speech recognition portion 202*c* set for speech recognition) assigns the evaluation value to each of the plurality of text signals. The evaluation value is a value indicating the accuracy of the text signal at the time of speech recognition. In a case where the plurality of text signal output by the recognition specifying portion (at least one of the speech recognition portion 23*c* or the external speech recognition portion 202*c* set for speech recognition) are different, the recognition control module 23 (result adjustment portion 23*i*3) determines a text signal having the highest evaluation value as the output recognition result signal. That is, it is possible to determine the output recognition result signal having the highest speech recognition accuracy according to the evaluation value. Therefore, the accuracy of speech recognition can be improved by the evaluation value (an output recognition result determination action by an evaluation value). In the present embodiment, in the case where the plurality of text signals output by the recognition specifying portion (at least one of the speech recognition portion 23*c* or the external speech recognition portion 202*c* set for speech recognition) are different, the recognition control module 23 (result adjustment portion 23*i*3) does not determine the output recognition result signal and does not output anything to the command output portion 24. That is, in a case where the plurality of text signals is different, the reliability of the text signal may be relatively low, and thus nothing is output to the command output portion 24 without determining the output recognition result signal. Therefore, in the case where the plurality of text signals is different, it is possible to prevent the accuracy of speech recognition from deteriorating by not determining the output recognition result signal and not outputting anything to the command output portion 24 (speech recognition accuracy maintaining action).

In the present embodiment, in a case where there is a time difference in the output of the plurality of text signals by the recognition specifying portion (at least one of the speech recognition portion 23*c* or the external speech recognition portion 202*c* set for speech recognition), the recognition control module 23 (result adjustment portion 23*i*3) does not determine the output recognition result signal until the predetermined time elapses. That is, in a case where there are a plurality of text signals considered to have been uttered at the same time, a time difference may occur until all the text signals are input to the result adjustment portion 23*i*3 due to the processing speed. Therefore, for the predetermined time, the number of text signals can be increased to determine the output recognition result signal (a text signal number increasing action by a predetermined time).

In the present embodiment, the recognition control module 23 (result adjustment portion 23*i*3) determines the output recognition result signal from one or more text signals output by the recognition specifying portion (at least one of the speech recognition portion 23*c* or the external speech recognition portion 202*c* set for speech recognition) after the lapse of the predetermined time. That is, it is possible to determine the output recognition result signal from the text signals input from the recognition specifying portion to the result adjustment portion 23*i*3 while excluding a text signal that is not input from the recognition specifying portion to the result adjustment portion **23*i*3 during the predetermined time. Therefore, it is possible to determine the output recognition result signal from one or more text signals input to the result adjustment portion 23*i*3** during the predetermined time (an output recognition result determination action by a predetermined time).

Note that, in the present embodiment, the acoustic model setting action is achieved similarly to the fourth embodiment. Further, in the present embodiment, the recognition accuracy improvement action and the imaging apparatus operation action are achieved similarly to the first embodiment.

In the first embodiment described above, an example has been described in which the word dictionary setting portion **23*e* sets the word in the word dictionary as the control content to a word corresponding to the state information of the lens 11*a* based on the state information signal of the lens 11*a***, but the disclosure is not limited thereto. Specific examples will be described below as other examples.

First, a specific example of the movable portion will be described. When the apparatus body is in a sleep state, the word dictionary setting portion **23*e* sets the word in the word dictionary to a word corresponding to the state information (activation of the power switch) based on the state information indicating the state. In a state in which a pop-up EVF is activated, the word dictionary setting portion 23*e* sets the word in the word dictionary to a word corresponding to the state information (a brightness of the EVF or the like) based on the state information indicating the state. In a state in which a pop-up flash is activated, the word dictionary setting portion 23*e* sets the word in the word dictionary to a word corresponding to the state information (light emission such as forced light emission) based on the state information indicating the state. In addition, the word dictionary setting portion 23*e*** sets the word in the word dictionary to a word corresponding to the state information (opening and closing of the shutter) based on the state information indicating the state of a shutter mechanism.

Next, a specific example of the connected device will be described. Note that all the connected devices are assumed to be connected to the apparatus body of the imaging apparatus. In a state where an audio interface device (for example, an XLR adapter) is connected, the word dictionary setting portion **23*e* sets the word in the word dictionary to a word corresponding to the state information (for example, whether or not to use a microphone connected to the XLR adapter) based on the state information indicating the state. The XLR adapter is an adapter capable of connecting an external microphone to the apparatus body "XLR" is a standard name of an audio connector. In a case where the apparatus body enters the sleep state in a state where a tripod, a monopod, or a leg of a mini selfie grip is folded, the word dictionary setting portion 23*e* sets the word in the word dictionary to a word corresponding to the state information (activation of the power switch) based on the state information indicating the state. In a state where a gimbal is connected, the word dictionary setting portion 23*e* sets the word in the word dictionary to a word corresponding to the state information (moving image or the like) based on the state information indicating the state. The imaging apparatus is attached to the gimbal, and inclination and shaking of the imaging apparatus is reduced even when the gimbal itself is inclined or shaken. In a state where an external recorder is connected, the word dictionary setting portion 23*e* sets the word in the word dictionary to a word corresponding to the state information (moving image or the like) based on the state information indicating the state. In a state where a TV or an external monitor is connected, the word dictionary setting portion 23*e* sets the word in the word dictionary to a word corresponding to the state information (moving image (moving image reproduction volume or the like) or the like) based on the state information indicating the state. In a state where a personal computer or a smartphone is connected, the word dictionary setting portion 23*e* sets the word in the word dictionary to a word corresponding to the state information (a function (microphone muting, or the like) of a web camera (imaging apparatus)) based on the state information indicating the state. In a state where a speedlight (so-called strobe) is connected, the word dictionary setting portion 23*e* sets the word in the word dictionary to a word corresponding to the state information (light emission (test light emission, light emission cycle, or the like)) based on the state information indicating the state. In a state where an external EVF or an external OVF (optical finder) is connected, the word dictionary setting portion 23*e*** sets the word in the word dictionary to a word corresponding to the state information (the brightness of the EVF or the like) based on the state information indicating the state. The OVF optically guides a shot image to a finder. "OVF" stands for "optical view finder".

Note that, in a state of the following specific example, the speech recognition function may be disabled (OFF). It is assumed that the lens **11*a* is a retractable lens and is in a retracted state. It is assumed that the display 15 is an adjustable-angle type and the display 15 is housed in a state where the user cannot view the screen. Specifically, the display 15 is not opened to the left side, the display 15 is housed in the apparatus body 10**B, and the user cannot view the screen. It is assumed that the tripod, the monopod, or the leg of the mini selfie grip connected to the apparatus body of the imaging apparatus is folded.

In the second embodiment described above, an example in which the display 15 is of an adjustable-angle type has been described, but the display 15 may be of a tilt type. Even in a case where the display 15 is of the tilt type, the screen of the display is directed forward on the apparatus body, so that a selfie can be performed.

In the third embodiment described above, an example has been described in which, when the air-cooling fan 17 is driven, the microphone setting portion **23*f* sets the fourth microphone 14*d* for speech recognition since the fourth microphone 14*d* is disposed at the position farthest from the air-cooling fan 17. However, the present disclosure is not limited thereto. For example, when the air-cooling fan 17 is driven, in a selfie situation, the position of the fourth microphone 14*d* is opposite to the position of the user in the front-rear direction, so that it is difficult for a speech uttered by the user to be input. Therefore, when the air-cooling fan 17 is driven, the microphone setting portion 23*f* sets one microphone for speech recognition under the following conditions in a selfie situation. The microphone setting portion 23*f* sets, for speech recognition, one microphone disposed at a position farthest from the air-cooling fan 17 among the microphones 14 disposed at positions where a speech from the front side can be easily input. For example, in a case where the microphones 14 are disposed as in the third embodiment, the microphone setting portion 23*f* sets the third microphone 14*c* for speech recognition. In short, when the air-cooling fan 17 is driven, the microphone setting portion 23*f* may set the microphone 14 disposed at a position farthest from the air-cooling fan 17** for speech recognition in consideration of a shooting situation.

In the third embodiment described above, an example has been described in which, when the air-cooling fan 17 is driven, the microphone setting portion 23*f* sets one of the first to fourth microphones 14*a* to 14*d* for speech recognition, but the present disclosure is not limited thereto. For example, the imaging apparatus may include a microphone for voice messages. In this case, the microphone setting portion 23*f* may set one of the microphone 14 and the microphone for voice messages for speech recognition when the air-cooling fan 17 is driven.

In the third embodiment described above, an example has been described in which the microphone setting portion 23*f* sets one microphone (fourth microphone 14*d*) disposed at a position farthest from the air-cooling fan 17 for speech recognition based on the state information signal, but the present disclosure is not limited thereto. For example, the microphone setting portion 23*f* may set, based on the state information signal, the remaining three microphones for speech recognition except for one microphone disposed at a position closest to the air-cooling fan 17. Specifically, referring to FIGS. 1, 12, and the like, the microphone setting portion 23*f* sets, for speech recognition, the remaining first, third, and fourth microphones 14*a*, 14*c*, and 14*d* excluding the second microphone 14*b* disposed at the closest position based on the state information signal. In short, a microphone to be used for speech recognition may be set among the plurality of microphones 14 based on the state information signal of the air-cooling fan 17.

In Modified Example (3-1) described above, an example in which the fan rotation speed of the air-cooling fan 17 is acquired from the control unit 20 has been described, but it is not limited thereto. For example, the fan rotation speed can be acquired by the following method. As a premise, the fan rotation speed is controlled by a voltage change or a PWM signal output from an 1C (an element of an electronic circuit). Since the fan rotation speed is proportional to the duty of the voltage or the PWM signal, the fan rotation speed can be calculated from a value of the voltage or the like. In this manner, the fan rotation speed may be acquired by calculation. Furthermore, the pruning threshold setting portion 23*g* may set the pruning threshold based on the calculated fan rotation speed. Furthermore, the acoustic model setting portion 23*d* may set the acoustic model based on the calculated fan rotation speed. Note that “IC” stands for “integrated circuit”. The PWM signal is a signal that can set a pulse width, and “PWM” stands for “pulse width modulation”.

In Modified Example (3-1) described above, an example in which the pruning threshold setting portion 23*g* sets the pruning threshold based on the fan rotation speed has been described, but the present disclosure is not limited thereto. As described above, the pruning threshold is a threshold for thinning out the hypothesis processing at the time of speech recognition in the speech recognition portion 23*c*. Therefore, the setting of the pruning threshold is not limited to being performed based on the fan rotation speed and may also be performed based on the type of the microphone to which a speech is input, and the frequency characteristic of the sound to be input changes depending on the frequency characteristic and the response characteristic of the microphone. Therefore, for example, the pruning threshold setting portion 23*g* may set the pruning threshold based on the type (state information) of the microphone set for speech recognition. As a result, the accuracy of speech recognition can be improved.

In the third embodiment and Modified Example (3-1) described above, an example has been described in which the accuracy of speech recognition is improved by setting the microphone 14 or setting the pruning threshold for the noise of the air-cooling fan 17 mixed in the microphone 14. However, the present disclosure is not limited thereto. For example, the accuracy of speech recognition can be improved by the following setting. When the air-cooling fan 17 is driven, a specific trigger word is set for the control unit 20 to start control to operate the imaging apparatus 1C with an input speech. Then, when the specific trigger word is detected while the air cooling fan 17 is driven, the control unit 20 temporarily stops the air-cooling fan 17 and operates the imaging apparatus 1C with the input speech. The “specific trigger word” is a pre-registered word for preventing unintended speech recognition control. In other words, the specific trigger word can also be said to be a switch for the control unit 20 to start control of operating the imaging apparatus 1C with an input speech. Hereinafter, a specific description will be given. It is assumed that the control unit 20 controls the air-cooling fan 17.

First, as described above, a change in state information of the air-cooling fan 17 affects the recognition of a speech input to the microphone 14. Therefore, it is necessary to set the control content for speech recognition according to a change in state information of the air-cooling fan 17. Here, the control content is the setting of the specific trigger word. Then, the recognition control module 23 sets the specific trigger word based on the state information signal of the air-cooling fan 17. It is sufficient if the state information is driving information indicating that the air-cooling fan 17 is driven, and thus, the state information is, for example, the fan rotation speed or the driving information of the air-cooling fan 17. The recognition control module 23 sets the specific trigger word based on the fan rotation speed. In other words, the recognition control module 23 sets the specific trigger word when the air-cooling fan 17 is driven. If the air-cooling fan 17 is not driven, the recognition control module 23 does not set the specific trigger word and recognizes an input speech.

Then, after setting the specific trigger word, when the recognition control module 23 recognizes a speech of the specific trigger word, for example, the control unit 20 temporarily stops the air-cooling fan 17. Here, when a speech of the specific trigger word is input, even if the air-cooling fan 17 is driven, the recognition control module 23 waits for only the specific trigger word Therefore, even in a case where the amount of mixed noise of the air-cooling fan 17 is relatively large, the recognition rate for the speech of the specific trigger word is relatively high. As a result, it is possible to recognize a speech of the specific trigger word even in a noise environment Next, when the air-cooling fan 17 is stopped, the recognition control module 23 recognizes the input speech. The control unit 20 drives the air-cooling fan 17 again after the speech recognition by the recognition control module 23 ends and a predetermined time elapses. The predetermined time here is a time assuming a case where the user continuously uses the speech recognition function, and is set in advance based on an experiment, a simulation, or the like.

As described above, when the recognition control module 23 recognizes the speech of the specific trigger word, the control unit 20 temporarily stops the air-cooling fan 17. That is, the noise of the air-cooling fan 17 mixed in the microphone 14 is eliminated by temporarily stopping the air-cooling fan 17. Therefore, since an influence on the speech recognition performance is prevented, a clearer speech is input to the microphone 14 than when the air-cooling fan 17 is driven Therefore, the accuracy of speech recognition can be improved by setting the specific trigger word and stopping the air-cooling fan 17. In addition, the recognition control module 23 may set the specific trigger word based on information other than the state information signal of the air-cooling fan 17. That is, the specific trigger word may be set for the control unit 20 to start control of operating the imaging apparatuses 1A to 1E with an input speech. Then, when the specific trigger word is detected, the control unit 20 operates the imaging apparatuses 1A to 1E with an input speech.

In the example described above, the air-cooling fan 17 is temporarily stopped, but the present disclosure is not limited thereto. For example, the fan rotation speed of the air-cooling fan 17 may be temporarily decreased. As a result, the amount of noise of the air-cooling fan 17 mixed in the microphone 14 also decreases. Therefore, since the influence on the speech recognition performance is suppressed, a clearer speech is input to the microphone 14 than when the fan rotation speed is not decreased. Therefore, the accuracy of speech recognition can be improved by setting the specific trigger word and decreasing the fan rotation speed. Note that the fan rotation speed is decreased enough to suppress the influence on the speech recognition performance, and the decrease in fan rotation speed is set in advance based on an experiment, a simulation, or the like.

The above-described control of temporarily stopping the air-cooling fan 17 or decreasing the fan rotation speed may be set based on the sound pressure of the specific trigger word. Then, the control unit 20 controls the temporary stop of the air-cooling fan 17 or the decrease in fan rotation speed based on the sound pressure of the specific trigger word. As a result, the accuracy of speech recognition can be improved. Note that the control of the stop or the decrease in fan rotation speed is set in advance according to the sound pressure of the specific trigger word based on an experiment, a simulation, or the like. In this example, the recognition control module 23 controls the air-cooling fan 17 based on the sound pressure of the specific trigger word, but the present disclosure is not limited thereto. Instead, the control unit 20 may control the temporary stop of the air-cooling fan 17 or the decrease in fan rotation speed based on the sound pressure of a sound other than the specific trigger word without setting the specific trigger word. Furthermore, the control unit 20 may control the temporary stop of the air-cooling fan 17 or the decrease in fan rotation speed by recognizing a speech other than the trigger word.

In the above-described fourth embodiment, an example has been described in which the microphone identification portion 23*h* automatically identifies the external microphone 19, and the microphone setting portion 23*f* automatically sets one of the microphone 14 and the external microphone 19 for speech recognition and the other for moving images based on the obtained identification result signal. Furthermore, an example in which the microphone setting portion 23*f* sets the external microphone 19 for speech recognition and for moving images based on the identification result signal has been described. However, the present disclosure is not limited thereto. For example, identification of whether the external microphone 19 is a monaural microphone or a stereo microphone and identification of the type of the external microphone 19 may be performed manually by the user himself/herself instead of being performed automatically. Furthermore, for example, one of the microphone 14 and the external microphone 19 may be manually set for speech recognition and the other may be manually set for moving images. Furthermore, the external microphone 19 may be manually set for speech recognition and for moving images. As a result, since the user himself/herself can set microphones for speech recognition and for moving images, the degree of freedom in setting the microphone can be increased. As another example, the user may determine in advance whether to set the external microphone 19 for speech recognition or for moving images in a case where the external microphone 19 is connected. It is sufficient if the microphone setting portion 23*f* automatically sets one of the microphone 14 and the external microphone 19 for speech recognition and the other for moving images based on this setting. As a result, the automatic speech recognition microphone setting action is achieved.

In the fifth embodiment described above, an example has been described in which the microphone adjustment portion 23*i*1 automatically identifies the external microphone 19 and automatically sets one of the microphone 14 and the external microphone 19 for speech recognition based on the obtained identification result signal. However, the present disclosure is not limited thereto. For example, the identification of the external microphone 19 may be manually performed by the user himself/herself in the same manner as described above. Furthermore, for example, similarly to the above, one of the microphone 14 and the external microphone 19 may be manually set for speech recognition. As a result, since the user himself/herself can set microphones for speech recognition, the degree of freedom in setting the microphone can be increased. As another example, as described above, the user may determine in advance whether to set the external microphone 19 for speech recognition or for moving images in a case where the external microphone 19 is connected. As a result, the automatic speech recognition microphone setting action is achieved.

In the fifth embodiment described above, an example has been described in which the microphone adjustment portion 23*i*1 automatically sets at least one of the microphone 14 or the external microphone 19 for speech recognition based on the identification result signal, but the present disclosure is not limited thereto. Specific examples will be described below.

As an example, the microphone adjustment portion 23*i*1 may automatically set at least one of the microphone 14 or the external microphone 19 for speech recognition by using the internal sound digital signal of the sound processing portion 23*a* and the external sound digital signal of the external sound processing portion 202*a*. Specifically, the microphone adjustment portion 23*i*1 automatically sets at least one of the microphone 14 or the external microphone 19 for speech recognition according to the level of the sound pressure (sound pressure level) of the sound digital signal. To reduce sound components other than a speech for speech recognition, the sound pressure levels of the internal sound digital signal and the external sound digital signal are compared with each other by, for example, a sound pressure level reduced to a voice band of 200 Hz to 8 kHz. Then, the microphone adjustment portion 23*i*1 automatically sets a microphone of the higher sound pressure out of the internal sound digital signal and the external sound digital signal for speech recognition. As a result, the automatic speech recognition microphone setting action is achieved. However, in a case where sound distortion is included (in a case where clipping occurs at or above 0 dBFS), the speech is not correctly digitized, and thus is not set for speech recognition.

As another example, when the external microphone 19 is connected to the apparatus body 10E, the microphone adjustment portion 23*i*1 notifies the user that a speech for speech recognition (a word or predetermined phrase) is to be uttered, by the notification portion such as the display 15 in an actual use state. In a case where it can be confirmed that the speech uttered by the user has been input, the following processing is executed. First, the internal speech digital signal is extracted by the sound processing and speech extraction processing, and the external speech digital signal is extracted by the external sound processing and external speech extraction processing. Next, the speech recognition processing or external speech recognition processing is executed for the speech digital signal. Then, a microphone of any one of the internal speech digital signal and the external speech digital signal from which the text signal is output is automatically set for speech recognition. As a result, the automatic speech recognition microphone setting action is achieved.

In the fifth embodiment described above, an example has been described in which the recognition adjustment portion 23*i*2 automatically sets at least one of the speech recognition portion 23*c* or the external speech recognition portion 202*c* as the recognition specifying portion. However, the present disclosure is not limited thereto. One or both of the speech recognition portion 23*c* and the external speech recognition portion 202*c* may be manually set as the recognition specifying portion by the user, instead of being set automatically. As a result, since the recognition specifying portion can be set by the user himself/herself, the degree of freedom in setting the recognition specifying portion can be increased.

In the fifth embodiment described above, a case where both of the recognition control module 23 and the external recognition control module 202 are set has been described, but the present disclosure is not limited thereto. Only one of the recognition control module 23 and the external recognition control module 202 may be set. In this case, since there is no room for setting the recognition specifying portion, the recognition adjustment portion 23*i*2 is unnecessary.

In the fifth embodiment described above, an example has been described in which both the speech recognition portion 23*c* and the external speech recognition portion 202*c* execute the recognition processing regardless of the order in a case where the recognition specifying portion signal indicates that there is no superiority in the performances, but the present disclosure is not limited thereto. For example, in the case where the recognition specifying portion signal indicates that there is no superiority in the performances, first, one of the speech recognition portion 23*c* and the external speech recognition portion 202*c* executes the recognition processing Next, in a case where the speech has been recognized, the other one of the speech recognition portion 23*c* and the external speech recognition portion 202*c* does not execute the recognition processing and outputs the text signal to the result adjustment portion 23*i*3. In a case where the speech cannot be recognized, the other one of the speech recognition portion 23*c* and the external speech recognition portion 202*c* executes the recognition processing. In this manner, the speech recognition portion 23*c* and the external speech recognition portion 202*c* may sequentially execute the recognition processing. In the fifth embodiment described above, an example has been described in which the result adjustment portion 23*i*3 determines the remaining text signal as the output recognition result signal in step S31. In the example described above, the result adjustment portion 23*i*3 determines the text signal having the highest evaluation value as the output recognition result signal in step S37. However, the present disclosure is not limited thereto. In both step S31 and step S37, the result adjustment portion 23*i*3 has determined that the plurality of text signals do not match (the text signals do not match) in step S23. Therefore, after the determination in step S23 that the text signals do not match, the result adjustment portion 23*i*3 does not have to determine the text signal as the output recognition result signal similarly to step S41. As a result, the speech recognition accuracy maintaining action is achieved.

In the fifth embodiment described above, an example has been described in which the result adjustment portion 23*i*3 does not determine the text signal as the output recognition result signal in step S41. Also in the above example, an example has been described in which, after the determination in step S23 that the text signals do not match, the result adjustment portion 23*i*3 does not determine the text signal as the output recognition result signal similarly to step S41. However, the present disclosure is not limited thereto. The result adjustment portion 23*i*3 may determine a non-text signal as the output recognition result signal instead of "not determining the text signal as the output recognition result signal". In this case, the result adjustment portion 23*i*3 outputs the non-text signal to the command output portion 24 as the output recognition result signal. Even if the processing is executed in this manner, no operation signal is output by the command output portion 24, and thus the example is similar to an example in which the text signal is not determined as the output recognition result signal as a result. That is, the command output portion 24 determines that the non-text signal does not match the word, and ends the processing without outputting any operation signal. As a result, the speech recognition accuracy maintaining action is achieved.

In the fifth embodiment described above, an example in which the result adjustment portion 23*i*3 outputs the output recognition result signal to the command output portion 24 has been described, but the present disclosure is not limited thereto. The result adjustment portion 23*i*3 may output the output recognition result signal to the external command output portion 203. Similarly to the command output portion 24 of the fifth embodiment, the external command output portion 203 outputs the operation signal (command signal) according to the output recognition result signal input from the result adjustment portion 23*i*3. Specifically, the external command output portion 203 repeatedly executes the following command output processing (output processing) while the output recognition result signal is input from the result adjustment portion 23*i*3.

First, the external command output portion 203 reads the command list of FIG. 7 that is also stored in the external storage portion 201 and is similar to that in the storage portion 21. Next, the external command output portion 203 determines (identifies) whether or not the text signal matches a word described in a word field of the read command list. In a case where the text signal matches the word, the external command output portion 203 outputs an operation of the imaging apparatus 1E described in an operation field of the command list to the imaging apparatus 1E (for example, various actuators (not illustrated) as the operation signal, and ends the processing. Note that the external command output portion 203 outputs the operation signal to the imaging apparatus 1E (for example, various actuators (not illustrated) and the like) via the control unit 20 or the like. Then, various actuators and the like (not illustrated) are operated according to the input operation signal. On the other hand, in a case where the text signal does not match the word, the external command output portion 203 ends the processing without outputting any operation signal. Specific examples of the actuator and the like are similar to those described in the command output portion 24.

In the fourth embodiment and the fifth embodiment described above, an example has been described in which the apparatus bodies 10D and 10E have the external microphone 19 separately. That is, an example in which the external microphone 19 alone is connected to the apparatus bodies 10D and 10E has been described, but the present disclosure is not limited thereto. The external microphone 19 may be a part of a connected device connected to the apparatus bodies 10D and 10E. That is, the external microphone 19 may be provided (mounted) on the mini selfie grip, the battery grip, or the battery pack. For example, the external microphone 19 may be a microphone for voice messages provided on the mini selfie grip. Furthermore, in the fifth embodiment, an example has been described in which the external microphone 19 itself includes the external control unit 200, but the mini selfie grip, the battery grip, or the battery pack described above may similarly include the external control unit.

In the fourth embodiment and the fifth embodiment described above, an example in which the wireless microphone 19 includes two portions, the microphone body 19*a* and the receiver 19*b*, has been described, but the present disclosure is not limited thereto. For example, the receiver 19*b* of the fourth embodiment may be built in the imaging apparatus 1D. Therefore, the wireless microphone 19 wirelessly transmits a sound input to the microphone body 19*a* to the receiver built in the imaging apparatus 1D. This eliminates the need for a connection between the apparatus-side connector 18 and the external-side connector 19*c*. The receiver 19*b* of the fifth embodiment may be built in the external control unit 200 instead of being separated from the external control unit 200.

In the embodiments and the example described above, an example has been described in which each processing is executed after the sound analog signal is converted into the sound digital signal, but the present disclosure is not limited thereto. For example, the present disclosure may be implemented by an analog electrical and electronic circuit capable of executing similar processing.

In the embodiments and the example described above, an example has been described in which the microphone 14 converts a sound into a sound analog signal (sound analog data) which is an analog signal, but the present disclosure is not limited thereto. For example, the microphone 14 may convert a sound into a sound digital signal (sound digital data) which is a digital signal. As a result, the processing of converting the sound analog signal into the sound digital signal in the sound processing portion 23*a* becomes unnecessary.

In the fourth embodiment described above, an example has been described in which the moving image sound control processing is executed by the environmental sound extraction portion 23*l* and the encoding portion 232. This example may be applied to the above-described embodiments and the example. In the first to third embodiments and Modified Example (3-1), if the speech digital signal is suppressed in the sound digital signal by using the time signal, the environmental sound digital signal is extracted. Note that the processing for conversion into Ambisonics, the noise removal processing, and the encoding processing are similar to those in the fourth embodiment. In the fifth embodiment, similarly to the microphone setting portion 23*f* of the fourth embodiment, it is sufficient if the microphone adjustment portion 23*i*1 automatically sets one of the microphone 14 and the external microphone 19 as a microphone for moving images based on the identification result signal. The subsequent extraction of the environmental sound digital signal and the like may be performed in the same manner as in the fourth embodiment.

In the embodiments and the example described above, an example in which the noise removal processing is executed in the sound processing, the speech extraction processing, and the environmental sound extraction processing has been described, but the present disclosure is not limited thereto. In short, the noise removal processing may be executed at any timing after the sound analog signal is converted into the sound digital signal.

In the fourth embodiment and the example described above, an example in which the environmental sound extraction processing is executed in real time after the sound processing and before the encoding processing has been described, but the present disclosure is not limited thereto. For example, if there is no need to extract the environmental sound digital signal from the sound digital signal, the environmental sound extraction processing does not have to be executed in real time and may be executed as post-processing. In the case of the post-processing, after the sound processing, the sound digital signal is converted into a file as it is, and is encoded as a moving image file in synchronization with video data. Then, the moving image file is recorded in the storage portion 21 or the external storage portion 201. In addition, the speech digital signal is recorded as data in the storage portion 21 or the external storage portion 201. However, the time of the sound digital signal and the time of the speech digital signal are tagged. As a result, the post-processing can be easily executed.

In the first and third to fifth embodiments and Modified Example (3-1) described above, an example in which the number of microphones 14 is four has been described, but the present disclosure is not limited thereto. For example, it is sufficient if the directivity can be set, and thus, the number of microphones 14 may be three. It is assumed that three microphones are arranged on the same plane, and one microphone is not arranged on a straight line connecting the remaining two microphones. In the arrangement relationship among the three microphones, assuming that the three microphones are points, the three microphones are arranged at positions where a triangle can be formed when the three points are connected by line segments. Thus, a microphone array is configured. In the second embodiment, in a case where the display 15 is movable only forward or rearward on the apparatus body 10B, the number of microphones 14 may be three as described above.

Here, the "microphone array" is an apparatus that can obtain a sound in a specific direction in a horizontal direction (plane) by arranging a plurality of microphones on a plane and processing a sound input to each microphone (specifically, a space (sound field) in the plane where a sound wave exists). Then, the sound in the specific direction can be enhanced or reduced by known beamforming for controlling the directivity by using the microphone array. Basically, since there is a distance between the plurality of microphones, a phase difference occurs between the sound waves from a sound source to each microphone. One sound wave input to the microphone close to the sound source is delayed by the sound wave phase difference. Then, by adding or subtracting one sound wave and the other sound wave, it is possible to intensify or cancel the sound in the specific direction depending on the frequency of the sound by the wave superposition principle. As a result, the directivity can be formed. Note that the directivity depends on the frequency. In this case, the speech extraction portion 23*b* extracts the (internal) speech digital signal from the (internal) sound digital signal by the above-described directivity control (known beamforming).

In the embodiments and the example described above, an example in which the number of microphones 14 is three or more has been described, but the present disclosure is not limited thereto. In short, the number of microphones 14 may be increased. As the number of microphones is increased, the accuracy in recognizing the speech of the user and the accuracy in extracting a moving image sound can be improved. Furthermore, as the number of microphones increases, the frequency sampling accuracy increases spatially, the sound direction detection accuracy is improved, and the directivity can be strongly formed.

In the first, fourth, and fifth embodiments and Modified Example (3-1) described above, an example in which the number of microphones 14 is three or four has been described, but the present disclosure is not limited thereto. In short, the number of microphones 14 may be one. In this case, the speech extraction portion 23*b* extracts the sound digital signal input to the microphone 14 as it is as the speech digital signal.

In the third embodiment and the example described above, an example in which the number of microphones 14 is three or more has been described, but the present disclosure is not limited thereto. In short, the number of microphones 14 may be plural (two or more). In this case, the speech extraction portion 23*b* extracts the sound digital signal input to the microphone 14 as it is as the speech digital signal. In a case where the microphone information signal is the "information regarding one microphone set for speech recognition", the speech extraction portion 23*b* extracts the speech digital signal similarly to the third embodiment.

In the embodiments and the example described above, an example in which the microphone 14 is disposed at each place has been described, but the present disclosure is not limited thereto. For example, considering a selfie situation, it is preferable to arrange all the microphones on the front surfaces of the apparatus bodies 10A to 10E (for example, positions around the imaging optical system 11). Note that, in a case where four microphones are provided, Ambisonics can be applied as long as the microphones are arranged at positions where a triangular pyramid (an example) can be formed as in the above-described embodiments and the like. Note that, in the case where four microphones are provided, it is sufficient if the microphones are arranged at any positions where Ambisonics can be applied. Here, to arrange the microphones 14 at the respective positions to achieve the respective actions described above, the microphones 14 may be disposed at any positions as long as the microphones 14 are disposed at positions where the respective actions are achieved.

In the embodiments and the example described above, an example in which the microphone 14 has non-directivity has been described, but the present disclosure is not limited thereto. For example, the directivity of the microphone 14 may be a single directivity (for example, an angle of 180 degrees) that captures a sound in a specific direction. In short, the directivity of the microphone 14 may be determined based on an attachment position, an input sound, and a sound to be extracted.

In the embodiments and the example described above, an example in which the control program is stored in the storage portion 21 has been described. In the fifth embodiment and the example described above, an example in which the external control program is stored in the external storage portion 201 has been described. However, the present disclosure is not limited thereto. For example, the control program and the external control program may be stored in an external storage medium. Examples of the storage medium include a digital versatile disc (DVD), a universal serial bus (USB) external storage device, and a memory card. The DVD or the like is connected to the control unit 20 or the external control unit 200 by using an optical disk drive or the like. Then, the control program may be read into the control unit 20 and the external control program may be read into the external control unit 200 from the DVD or the like in which the control program and the external control program are stored, and the read programs are executed in the respective RAMs. The storage medium may be a server apparatus on the Internet. Then, the control program may be read into the control unit 20 and the external control program may be read into the external control unit 200 from the inside of the server apparatus in which the control program and the external control program are stored through the communication portion 26, and the read programs may be executed in the respective RAMs. In a case where the external control program is read into the external control unit 200 from the inside of the server apparatus, the external control unit 200 includes an external communication portion.

In the embodiments and the example described above, an example in which the teaching data and the acoustic model are stored in the storage portion 21 or the external storage portion 201 has been described. However, the present disclosure is not limited thereto. Note that, hereinafter, the teaching data and the acoustic model are collectively referred to as "acoustic model and the like". For example, the acoustic model and the like may be stored in an external storage medium. Examples of the storage medium include a digital versatile disc (DVD), a universal serial bus (USB) external storage device, and a memory card. The DVD or the like is connected to, for example, the control unit 20 or the external control unit 200 by using an optical disk drive or the like. Then, the acoustic model and the like may be read into the control unit 20 or the external control unit 200 from the DVD or the like in which the acoustic model and the like are stored. The storage medium may be a server apparatus on the Internet. Then, the acoustic model and the like may be read from the inside of the server apparatus in which the acoustic model and the like are stored in the control unit 20 and the external control unit 200 through the communication portion 26. Note that, in a case where the acoustic model and the like are read into the external control unit 200 from the inside of the server apparatus, the external control unit 200 includes an external communication portion.

In the embodiments and the example described above, an example has been described in which the control content is setting of the word in the word dictionary, extraction of the specific-direction speech, setting of the microphone 14, setting of the pruning threshold, setting of the microphone 14 and the external microphone 19 for speech recognition and for moving images, setting of the recognition specifying portion, or setting of the acoustic model. In the embodiments and the example described above, an example has been described in which the recognition control module 23 sets each control content based on each state information. However, the present disclosure is not limited thereto. For example, the control contents may be the setting of the word in the word dictionary, extraction of the specific-direction speech, and setting of the acoustic model, and the recognition control module 23 may set the control contents based on a plurality of pieces of state information. In short, the number of control contents may be one or plural as long as the control contents are for recognizing a speech Therefore, the number of pieces of state information acquired by the state acquisition portion 22 is not limited to one, and may be plural. Then, the recognition control module 23 may set the control content for speech recognition based on the state information. Here, in the imaging apparatuses 1A to 1E, not only the number of items of the control content is relatively larger than that of other products, but also a plurality of control contents are frequently set for each shooting when shooting one subject. Even during the moving image shooting, for example, the screen angle of the display 15 may be changed, so that the extraction of the specific-direction speech is changed. Therefore, in particular, in the imaging apparatuses 1A to 1E, the recognition control module 23 relatively often sets the control contents based on a plurality of pieces of state information.

In the fifth embodiment described above, an example in which the recognition control module 23 includes the adjustment control portion 23*i* has been described, but a connected device connected to the apparatus body 10E may include the adjustment control portion 23*i*. For example, the external recognition control module 202 may include the adjustment control portion 23*i*.

In the embodiments and the example described above, an example has been described in which the speech recognition apparatus, the speech recognition method, the speech recognition program, and the imaging apparatus of the present disclosure are applied to the imaging apparatuses 1A to 1E, but the present disclosure is not limited thereto. For example, the speech recognition apparatus, the speech recognition method, and the speech recognition program of the present disclosure can be applied to an electronic computer (for example, a target device such as a smartphone) or the like. The electronic computer or the like includes at least the state acquisition portion 22, the recognition control module 23, and the command output portion 24. Furthermore, as long as the electronic computer or the like includes the imaging optical system 11 and the finder 12, the imaging apparatus of the present disclosure may be applied. Note that, in the embodiments and the example described above, an example has been described in which the speech recognition apparatus, the speech recognition method, the speech recognition program, and the imaging apparatus of the present embodiment are applied to the imaging apparatuses 1A to 1E including the finder 12 above the upper surfaces of the apparatus bodies 10A to 10E, but the present disclosure is not limited thereto. For example, the speech recognition apparatus, the speech recognition method, the speech recognition program, and the imaging apparatus of the present embodiment may be applied to an imaging apparatus such as a range finder type that does not include the finder 12 on the upper surfaces of the apparatus bodies 10A to 10E. In the case of the range finder type, for example, three microphones including the second to fourth microphones 14*b* to 14*d* can be disposed on the upper surfaces of the apparatus bodies 10A to 10E. Note that the eye sensor 13 does not have to be provided.

The speech recognition apparatus, the speech recognition method, and the speech recognition program of the present disclosure can be applied to an external device (for example, a target device such as an external server or an electronic computer). The external device includes at least the state acquisition portion 22, the recognition control module 23, and the command output portion 24. For example, the imaging apparatuses 1A to 1E include the microphone 14 and the external microphone 19, and transmit the sound analog signal and the sound digital signal to the external device (for example, an external server) through the communication portion 26. Next, the external device executes processing such as the acquisition processing in the state acquisition portion 22, the speech recognition processing (recognition processing) in the recognition control module 23, and the command output processing (output processing) in the command output portion 24. Next, the external device transmits the operation signal to one or more imaging apparatuses 1A to JE. Next, for example, various actuators and the like of the imaging apparatuses 1A to 1E are operated according to the operation signal received by the communication portion 26. As described above, even when the speech recognition apparatus, the speech recognition method, and the speech recognition program of the present embodiment are applied to the external device (for example, a target device such as an external server or an electronic computer), at least the recognition accuracy improvement action is achieved Note that a part of the speech recognition processing and the command output processing may be executed by the recognition control module 23 of the apparatus bodies 10A to 10E, and the remaining part of the speech recognition processing and the command output processing may be executed by the recognition control module of the external device.

LIST OF REFERENCE SIGN

- 1A, 1B, 1C, 1D, 1E Imaging apparatus (target device)
- 10A, 10B, 10C, 10D, 10E Apparatus body (body)
- 11 Imaging optical system
- 11*a* Lens (movable portion, single focus lens, zoom lens, electric zoom lens, or retractable lens)
- 14 Microphone (input portion, sound input portion, or built-in microphone)
- 14*a* First microphone (input portion, sound input portion, or built-in microphone)
- 14*b* Second microphone (input portion, sound input portion, or built-in microphone)
- 14*c* Third microphone (input portion, sound input portion, or built-in microphone)
- 14*d* Fourth microphone (input portion, sound input portion, or built-in microphone)
- 15 Display (movable portion or display)
- 15*a* Screen angle sensor (sensor)
- 17 Air-cooling fan (movable portion or connected device)
- 19 External microphone (connected device or wireless microphone)
- 19*a* Microphone body
- 19*b* Receiver
- 20 Control unit (speech recognition apparatus)
- 21 Storage portion
- 22 State acquisition portion (acquisition portion)
- 23 Recognition control module (recognition control portion)
- 23*a* Sound processing portion (recognition control portion)
- 23*b* Speech extraction portion (recognition control portion)
- 23*c* Speech recognition portion (recognition control portion or recognition specifying portion)
- 23*d* Acoustic model setting portion (recognition control portion)
- 23*e* Word dictionary setting portion (recognition control portion)
- 23*f* Microphone setting portion (recognition control portion)
- 23*g* Pruning threshold setting portion (recognition control portion)
- 23*h* Microphone identification portion (recognition control portion)

**23*i*** Adjustment control portion (recognition control portion)
**23*i*1** Microphone adjustment portion (recognition control portion)
**23*i*2** Recognition adjustment portion (recognition control portion)
**23*i*3** Result adjustment portion (recognition control portion)
24 Command output portion (output portion)
27 Gyro sensor (inclination sensor)
200 External control unit
201 External storage portion
202 External recognition control module (external recognition control portion)
**202*a*** External sound processing portion (external recognition control portion)
**202*b*** External speech extraction portion (external recognition control portion)
**202*c*** External speech recognition portion (external recognition control portion or recognition specifying portion)
**202*d*** External acoustic model setting portion (external recognition control portion)
**202*e*** External word dictionary setting portion (external recognition control portion)
203 External command output portion (output portion)

What is claimed is:

1. An imaging apparatus comprising a speech recognition apparatus having a processor programmed to:

acquire state information regarding an imaging optical system attached in a replaceable manner to a body of the imaging apparatus, the body being configured so that a plurality of types of interchangeable imaging optical systems can be attached thereto;

set a word dictionary as control content for recognizing speech input to the imaging apparatus based on the acquired state information and recognize the speech; and output a command signal for operating the imaging apparatus body according to a recognition result of the speech, wherein the processor is further programmed to limit, based on the acquired state information, a word in the word dictionary to a word corresponding to the state information regarding the imaging optical system attached in a replaceable manner to the body of the imaging apparatus.

2. The imaging apparatus according claim 1, wherein the speech is input from an input portion of a plurality of input portions provided in the imaging apparatus body.

3. The imaging apparatus according to claim 1, wherein the speech is input from a built-in microphone in the imaging apparatus body, the processor is programmed to acquire state information regarding an external microphone to which at least one of the speech or an environmental sound around a user is input, and the processor is programmed to set one of the built-in microphone and the external microphone for speech recognition based on the acquired state information regarding the external microphone.

4. The imaging apparatus according to claim 3, wherein the processor is programmed to automatically identify the external microphone based on the acquired state information regarding the external microphone and to automatically set one of the built-in microphone and the external microphone for speech recognition based on an obtained identification result.

5. The imaging apparatus according to claim 3, wherein the speech and the environmental sound around the user are input to the built-in microphone and the external microphone, and the processor is programmed to set another one of the built-in microphone and the external microphone for moving images.

6. The imaging apparatus according to claim 1, wherein the speech is input from a built-in microphone in the imaging apparatus body, the processor is programmed to acquire state information regarding an external microphone to which at least one of the speech or an environmental sound around a user is input, and the processor is programmed to set at least one of the built-in microphone or the external microphone for speech recognition and to set at least one of the speech recognition apparatus or an external recognition control portion of the external microphone for speech recognition based on the acquired state information regarding the external microphone.

7. The imaging apparatus according to claim 6, wherein the processor is programmed to automatically set, for speech recognition, one of the built-in microphone and the external microphone to which the speech having a higher sound pressure is input.

8. The imaging apparatus according to claim 6, wherein the processor is programmed to automatically set, for speech recognition, one of the speech recognition apparatus and the external recognition control portion that has higher speech recognition performance for recognizing the speech, based on the acquired state information regarding the external microphone.

9. The imaging apparatus according to claim 8, wherein the processor is programmed to automatically set both the speech recognition apparatus and the external recognition control portion for speech recognition in a case where one of the speech recognition apparatus and the external recognition control portion that has higher speech recognition performance is not specified.

10. The imaging apparatus according to claim 6, wherein the at least one of the speech recognition apparatus or the external recognition control portion set for speech recognition is configured to output a plurality of recognition results, and the processor is programmed to determine an output recognition result among the plurality of recognition results.

11. The imaging apparatus according to claim 10, wherein the processor is programmed to exclude a non-applicable recognition result and determine the output recognition result in a case where the plurality of recognition results comprises the non-applicable recognition result in which the speech is not recognized.

12. The imaging apparatus according to claim 10, wherein the at least one of the speech recognition apparatus or the external recognition control portion set for speech recognition is configured to assign an evaluation value indicating accuracy at a time of speech recognition to each of the plurality of recognition results in a case of outputting the plurality of recognition results, and the processor is programmed to determine a recognition result of the plurality of recognition results having a highest evaluation value as the output recognition result in a case where the plurality of recognition results are different.

13. The imaging apparatus according to claim 10, wherein the processor is programmed (i) not to determine the output recognition result and not to output anything or (ii) to determine a non-applicable recognition result in which the speech is not recognized as the output recognition result in a case where the plurality of recognition results are different.

14. The imaging apparatus according to claim 10, wherein the processor is programmed not to determine the output recognition result until a predetermined time elapses in a case where a time difference occurs in outputs of the plurality of recognition results.

15. The imaging apparatus according to claim 14, wherein the processor is programmed to determine the output recognition result from one or more of the plurality of recognition results after the predetermined time elapses.

16. The imaging apparatus according to claim 1, wherein the processor is programmed to set an acoustic model that converts the speech into phonemes based on the acquired state information.

17. The imaging apparatus according to claim 1, wherein a lens of the imaging optical system comprises a single focus lens, a zoom lens, or a retractable lens, the acquired state information is regarding the lens, and the processor is programmed to limit the word in the word dictionary to a word corresponding to the acquired state information regarding the lens based on the acquired state information regarding the lens.

18. The imaging apparatus according to claim 1, wherein a lens of the imaging optical system comprises a single focus lens or a zoom lens.

19. The imaging apparatus according to claim 1, wherein the acquired state information comprises at least one of a model number of the imaging optical system, a type of the imaging optical system, an aperture value, a focal length in a case that a lens of the imaging optical system is a zoom lens, and product information of the lens.

20. A speech recognition apparatus comprising a processor programmed to:

acquire state information regarding at least one of (i) a movable portion in a target device operated according to an input speech or (ii) a connected device connected to the target device;

set a control content for recognizing the speech based on the acquired state information and recognize the speech; and output a command signal for operating the target device to the target device according to a recognition result of the speech, wherein the speech is input from an input portion of a plurality of input portions provided in the target device, the movable portion or the connected device is an air-cooling fan that cools the target device, the acquired state information is regarding the air-cooling fan, and the processor is further programmed to set, among the plurality of input portions, the input portion to be used for speech recognition based on the acquired state information regarding the air-cooling fan.

21. The speech recognition apparatus according to claim 20, wherein the processor is programmed to set a pruning threshold for thinning out hypothesis processing when recognizing the speech based on the acquired state information regarding the air-cooling fan.

22. A speech recognition apparatus comprising a processor programmed to:

acquire state information regarding at least one of (i) a movable portion in a target device operated according to an input speech or (ii) a connected device connected to the target device;

set a control content for recognizing the speech based on the acquired state information and recognize the speech; and output a command signal for operating the target device to the target device according to a recognition result of the speech, wherein the speech is input from a built-in microphone in the target device, the connected device is an external microphone to which the speech and an environmental sound around a user are input, the acquired state information is regarding the external microphone, the processor is programmed to set one of the built-in microphone and the external microphone for speech recognition based on the acquired state information regarding the external microphone, and the processor is further programmed to invalidate an input from the built-in microphone based on the acquired state information regarding the external microphone and to set the external microphone for speech recognition and for moving images.

23. A speech recognition method executed by a speech recognition apparatus of an imaging apparatus, the method comprising:

acquiring state information regarding an imaging optical system attached in a replaceable manner to a body of the imaging apparatus, the body being configured so that a plurality of types of interchangeable imaging optical systems can be attached thereto;

setting, when speech is input to the imaging apparatus, a word dictionary as control content for recognizing the speech based on the acquired state information and recognizing the speech; and outputting a command signal for operating the imaging apparatus body according to a recognition result of the speech, wherein the method further comprises limiting, based on the acquired state Information, a word in the word dictionary to a word corresponding to the state information regarding the imaging optical system attached in a replaceable manner to the body of the imaging apparatus.

* * * * *